US012720598B2

(12) United States Patent
Erkucuk et al.

(10) Patent No.: US 12,720,598 B2
(45) Date of Patent: Aug. 25, 2026

(54) TRANSMISSION OPPORTUNITY (TXOP) RETURN

(71) Applicant: Ofinno, LLC, Reston, VA (US)

(72) Inventors: Serhat Erkucuk, Reston, VA (US); Leonardo Alisasis Lanante, Reston, VA (US); Esmael Hejazi Dinan, McLean, VA (US); Jeongki Kim, Fairfax, VA (US); Tuncer Baykas, Reston, VA (US); Jiayi Zhang, Rockville, MD (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 19/449,976

(22) Filed: Jan. 15, 2026

(65) Prior Publication Data

US 2026/0150131 A1 May 28, 2026

Related U.S. Application Data

(63) Continuation of application No. PCT/US2025/030539, filed on May 22, 2025.

(60) Provisional application No. 63/743,256, filed on Jan. 9, 2025, provisional application No. 63/651,075, filed on May 23, 2024.

(51) Int. Cl.
*H04W 74/0816* (2024.01)

(52) U.S. Cl.
CPC ............................... *H04W 74/0816* (2013.01)

(58) Field of Classification Search
CPC ................................................ H04W 74/0816
See application file for complete search history.

(56) References Cited

U.S. PATENT DOCUMENTS 10,863,539 B2 12/2020 Tian et al.
11,864,165 B2 1/2024 Kim et al.
12,445,261 B2 10/2025 Ajami et al.
(Continued)

FOREIGN PATENT DOCUMENTS

WO 2021228085 A1 11/2021
WO 2024005512 A1 1/2024
(Continued)

OTHER PUBLICATIONS

IEEE 802.11-24/0512r0; Apr. 2024; Considerations for Coordinated TDMA; Date: Apr. 8, 2024; Rubayet Shafin et al.
(Continued)

*Primary Examiner* — Fred A Casca
(74) *Attorney, Agent, or Firm* — James Bender; Kavon Nasabzadeh; Yasser Mourtada

(57) ABSTRACT

A first access point (AP) receives, from a second AP during a transmission opportunity (TXOP) obtained by the second AP, first frames comprising: a first indication of a portion, of the TXOP, allocated to the first AP, and a second indication of whether the first AP is to return the allocated portion when the first AP finishes communicating before an end of the allocated portion. The first AP transmits, to the second AP, a TXOP return frame based on: the second indication indicating that the first AP is to return the allocated portion when the first AP finishes communicating before the end of the allocated portion, the first AP finishing communicating before the end of the allocated portion, and a remaining time of the allocated portion being greater than a threshold.

20 Claims, 25 Drawing Sheets

2200

(56) References Cited

U.S. PATENT DOCUMENTS

| | | | | |
|---|---|---|---|---|
| 2017/0347370 | A1 | 11/2017 | Kneckt et al. | |
| 2021/0120548 | A1 | 4/2021 | Chen et al. | |
| 2021/0282161 | A1 | 9/2021 | Sun et al. | |
| 2023/0057502 | A1 | 2/2023 | Nayak et al. | |
| 2023/0262766 | A1 | 8/2023 | Kim et al. | |
| 2024/0049304 | A1 | 2/2024 | Ko et al. | |
| 2024/0056968 | A1 | 2/2024 | Ryu et al. | |
| 2024/0057164 | A1 | 2/2024 | Li et al. | |
| 2024/0063995 | A1 | 2/2024 | Ajami et al. | |
| 2024/0080910 | A1 | 3/2024 | Wentink | |
| 2024/0381418 | A1 | 11/2024 | Ajami et al. | |
| 2024/0381419 | A1 | 11/2024 | Ajami et al. | |
| 2024/0422764 | A1 | 12/2024 | Sun et al. | |
| 2025/0301519 | A1 | 9/2025 | Naik et al. | |
| 2025/0331021 | A1 | 10/2025 | Kalamkar et al. | |
| 2025/0351121 | A1* | 11/2025 | Naik | H04W 72/04 |
| 2025/0351170 | A1* | 11/2025 | Patil | H04W 72/27 |

FOREIGN PATENT DOCUMENTS

| | | | |
|---|---|---|---|
| WO | 2024005793 | A1 | 1/2024 |
| WO | 2024233063 | A1 | 11/2024 |
| WO | 2025143794 | A1 | 7/2025 |
| WO | 2025176815 | A1 | 8/2025 |
| WO | 2025183827 | A1 | 9/2025 |
| WO | 2025221427 | A1 | 10/2025 |
| WO | 2025221438 | A1 | 10/2025 |

OTHER PUBLICATIONS

IEEE 802.11-24/0423r0; Mar. 2024; NAV Rules in C-TDMA; Date: Mar. 5, 2024; Sanket Kalamkar et al.

IEEE 802.11-24/411r0; Mar. 2024; TXOP Return in C-TDMA; Date: Mar. 11, 2024; Geonhwan Kim et al.

IEEE 802.11-23/93r2; Jan. 2024; C-TDMA Follow-up; Date: Jan. 13, 2024; Dibakar Das et al.

IEEE 802.11-23/1895r2; Nov. 2023; Coordinated TDMA (C-TDMA) Follow-up; Date: Nov. 3, 2023; Abhishek Patil et al.

IEEE 802.11-23/1327r0; Aug. 2023; Considerations on Return TXOP between multiple APs; Date: Aug. 7, 2023; Si-Chan Noh et al.

International Search Report and Written Opinion of the International Searching Authority mailed Sep. 9, 2025, in International Application No. PCT/US2025/030539.

IEEE 802.11-24/0843r0; Jul. 2024; Some details on TXOP sharing in C-TDMA; Date: Jul. 15, 2024; Geonhwan Kim et al.

* cited by examiner 100
108
Portal
140
130
150
102
110-1
104-1
106-1
110-2
104-2
106-2
106-3
112-1
106-4
106-5
106-6
112-2
106-7
106-8

200

300

700

800

900

1400

2400

2410

2500

2510

TRANSMIT, BY A FIRST ACCESS POINT (AP) TO A SECOND AP, DURING A TRANSMISSION OPPORTUNITY (TXOP) OBTAINED BY THE FIRST AP, ONE OR MORE FIRST FRAMES COMPRISING:

A FIRST INDICATION OF A PORTION, OF THE TXOP, ALLOCATED TO THE SECOND AP; AND

A SECOND INDICATION OF WHETHER THE SECOND AP IS TO RETURN THE ALLOCATED PORTION OF THE TXOP WHEN THE SECOND AP FINISHES COMMUNICATING BEFORE AN END OF THE ALLOCATED PORTION OF THE TXOP

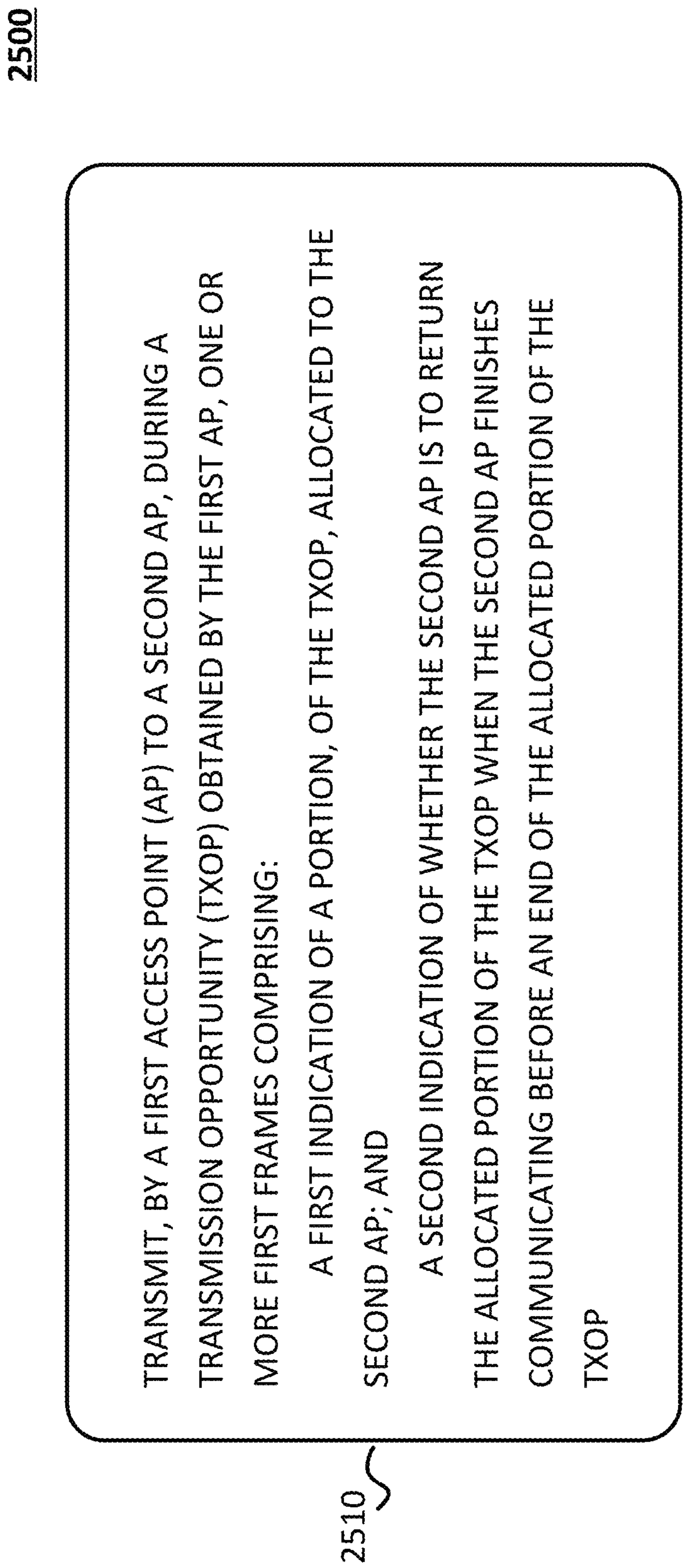

FIG. 25

TRANSMISSION OPPORTUNITY (TXOP) RETURN

CROSS-REFERENCE TO RELATED APPLICATIONS

This application is a continuation of International Application No. PCT/US2025/030539, filed May 22, 2025, which claims the benefit of U.S. Provisional Application No. 63/651,075, filed May 23, 2024, and U.S. Provisional Application No. 63/743,256, filed Jan. 9, 2025, all of which are hereby incorporated by reference in their entireties.

BRIEF DESCRIPTION OF THE DRAWINGS

Examples of several of the various embodiments of the present disclosure are described herein with reference to the drawings.

FIG. 25 illustrates another example process according to an embodiment.

DETAILED DESCRIPTION

Figure 1:
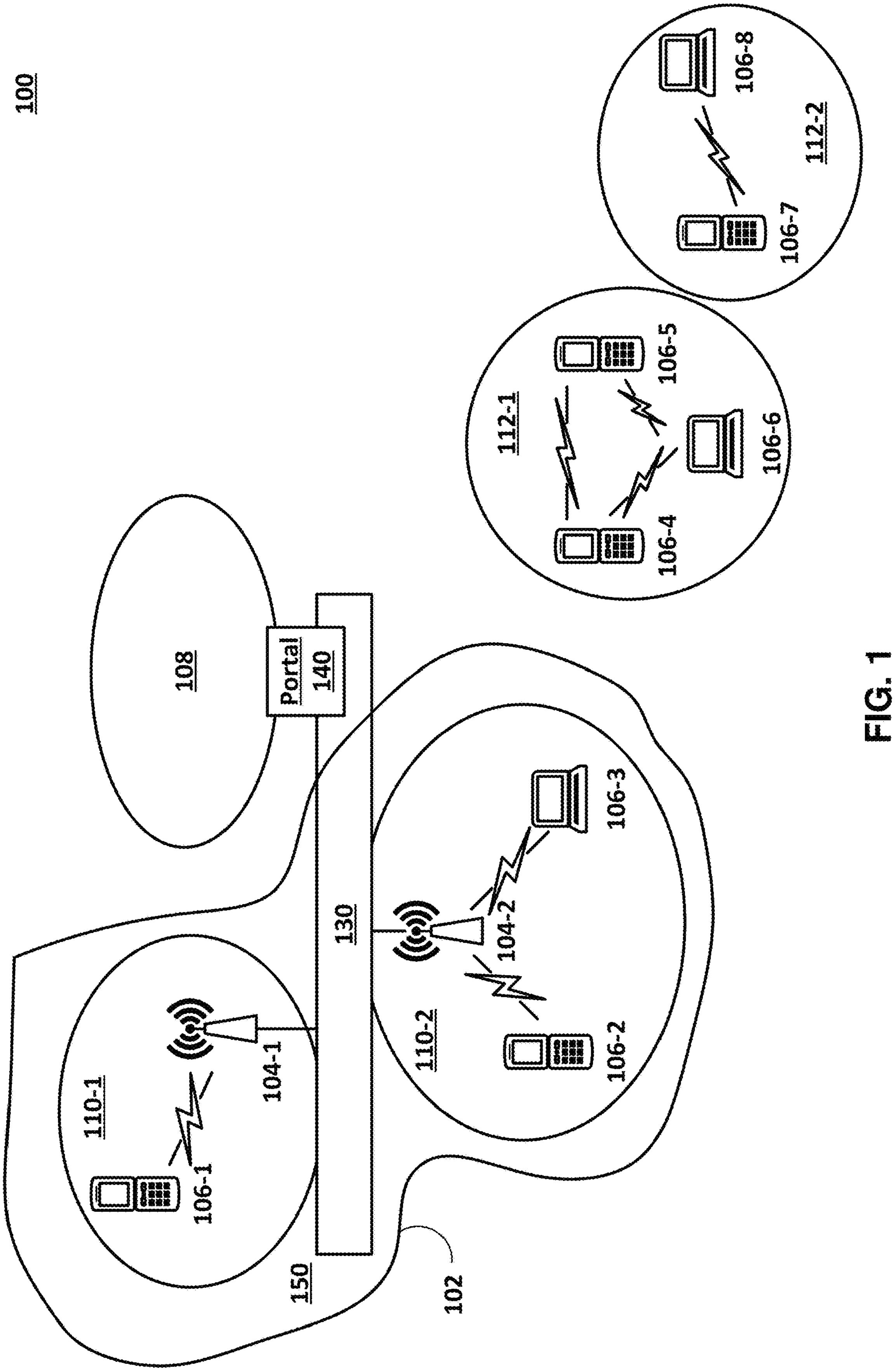
FIG. 1 illustrates example wireless communication networks in which embodiments of the present disclosure may be implemented.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. After reading the description, it will be apparent to one skilled in the relevant art how to implement alternative embodiments. The present embodiments may not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a station, an access point, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, may be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={STA1, STA2} are: {STA1}, {STA2}, and {STA1, STA2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages/frames comprise a plurality of parameters, it implies that a parameter in the plurality of parameters is in at least one of the one or more messages/frames but does not have to be in each of the one or more messages/frames.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g., hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise computers, microcontrollers, microprocessors, application-specific integrated circuits (ASICs); field programmable gate arrays (FPGAs); and complex programmable logic devices (CPLDs). Computers, microcontrollers, and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1 illustrates example wireless communication networks 100 in which embodiments of the present disclosure may be implemented.

As shown in FIG. 1, the example wireless communication networks 100 may include an Institute of Electrical and Electronic Engineers (IEEE) 802.11 (WLAN) infra-structure network 102. WLAN infra-structure network 102 may include one or more basic service sets (BSSs) 110 and 120 and a distribution system (DS) 130.

BSS 110-1 and 110-2 each includes a set of an access point (AP or AP STA) and at least one station (STA or non-AP STA). For example, BSS 110-1 includes an AP 104-1 and a STA 106-1, and BSS 110-2 includes an AP 104-2 and STAs 106-2 and 106-3. The AP and the at least one STA in a BSS perform an association procedure to communicate with each other.

DS 130 may be configured to connect BSS 110-1 and BSS 110-2. As such, DS 130 may enable an extended service set (ESS) 150. Within ESS 150, APs 104-1 and 104-2 are connected via DS 130 and may have the same service set identification (SSID).

WLAN infra-structure network 102 may be coupled to one or more external networks. For example, as shown in FIG. 1, WLAN infra-structure network 102 may be connected to another network 108 (e.g., 802.X) via a portal 140. Portal 140 may function as a bridge connecting DS 130 of WLAN infra-structure network 102 with the other network 108.

The example wireless communication networks illustrated in FIG. 1 may further include one or more ad-hoc networks or independent BSSs (IBSSs). An ad-hoc network or IBSS is a network that includes a plurality of STAs that are within communication range of each other. The plurality of STAs are configured so that they may communicate with each other using direct peer-to-peer communication (i.e., not via an AP).

For example, in FIG. 1, STAs 106-4, 106-5, and 106-6 may be configured to form a first IBSS 112-1. Similarly, STAs 106-7 and 106-8 may be configured to form a second IBSS 112-2. Since an IBSS does not include an AP, it does not include a centralized management entity. Rather, STAs within an IBSS are managed in a distributed manner. STAs forming an IBSS may be fixed or mobile.

A STA as a predetermined functional medium may include a medium access control (MAC) layer that complies with an IEEE 802.11 standard. A physical layer interface for a radio medium may be used among the APs and the non-AP stations (STAs). The STA may also be referred to using various other terms, including mobile terminal, wireless device, wireless transmit/receive unit (WTRU), user equipment (UE), mobile station (MS), mobile subscriber unit, or user. For example, the term "user" may be used to denote a STA participating in uplink Multi-user Multiple Input, Multiple Output (MU MIMO) and/or uplink Orthogonal Frequency Division Multiple Access (OFDMA) transmission.

A physical layer (PHY) protocol data unit (PPDU) may be a composite structure that includes a PHY preamble and a payload in the form of a PLCP service data unit (PSDU). For example, the PSDU may include a PHY Convergence Protocol (PLCP) preamble and header and/or one or more MAC protocol data units (MPDUs). The information provided in the PHY preamble may be used by a receiving device to decode the subsequent data in the PSDU. In instances in which PPDUs are transmitted over a bonded channel (channel formed through channel bonding), the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

A frequency band may include one or more sub-bands or frequency channels. For example, PPDUs conforming to the IEEE 802.11n, 802.11ac, 802.11ax and/or 802.11be standard amendments may be transmitted over the 2.4 GHZ, 5 GHZ, and/or 6 GHz bands, each of which may be divided into multiple 20 MHz channels. The PPDUs may be transmitted over a physical channel having a minimum bandwidth of 20 MHz. Larger channels may be formed through channel bonding. For example, PPDUs may be transmitted over physical channels having bandwidths of 40 MHz, 80 MHz, 160 MHz, or 520 MHz by bonding together multiple 20 MHz channels.

Figure 2:
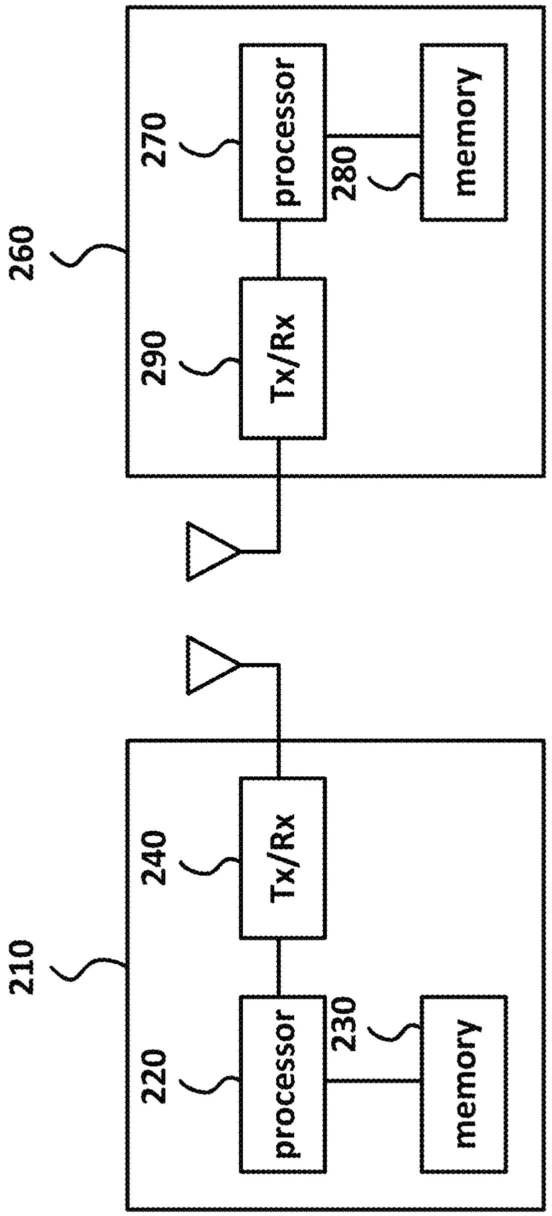
FIG. 2 is a block diagram illustrating example implementations of a station (STA) and an access point (AP).

FIG. 2 is a block diagram 200 illustrating example implementations of a STA 210 and an AP 260. As shown in FIG. 2, STA 210 may include at least one processor 220, a memory 230, and at least one transceiver 240. AP 260 may include at least one processor 270, a memory 280, and at least one transceiver 290. Processor 220/270 may be operatively connected to memory 230/280 and/or to transceiver 240/290.

Processor 220/270 may implement functions of the PHY layer, the MAC layer, and/or the logical link control (LLC) layer of the corresponding device (STA 210 or AP 260). Processor 220/270 may include one or more processors and/or one or more controllers. The one or more processors and/or one or more controllers may comprise, for example, a general-purpose processor, a digital signal processor (DSP), a microcontroller, an application specific integrated circuit (ASIC), a field programmable gate array (FPGA), a logic circuit, or a chipset, for example.

Memory 230/280 may include a read-only memory (ROM), a random-access memory (RAM), a flash memory, a memory card, a storage medium, and/or other storage unit. Memory 230/280 may comprise one or more non-transitory computer readable mediums. Memory 230/280 may store computer program instructions or code that may be executed by processor 220/270 to carry out one or more of the operations/embodiments discussed in the present application. Memory 230/280 may be implemented (or positioned) within processor 220/270 or external to processor 220/270. Memory 230/280 may be operatively connected to processor 220/270 via various means known in the art.

Transceiver 240/290 may be configured to transmit/receive radio signals. In an example, transceiver 240/290 may implement a PHY layer of the corresponding device (STA 210 or AP 260). In an example, STA 210 and/or AP 260 may be a multi-link device (MLD), that is a device capable of operating over multiple links as defined by the IEEE 802.11 standard. As such, STA 210 and/or AP 260 may each implement multiple PHY layers. The multiple PHY layers may be implemented using one or more of transceivers 240/290.

Figure 3:
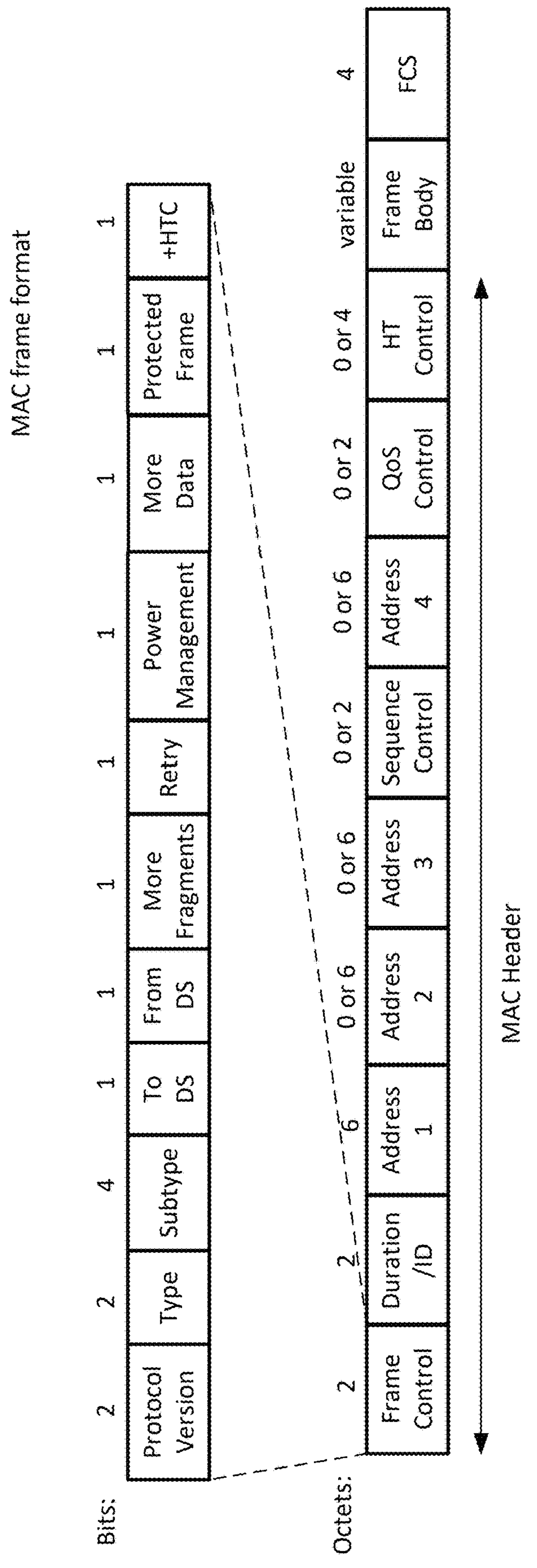
FIG. 3 illustrates an example Medium Access Control (MAC) frame format.

FIG. 3 illustrates an example format of a MAC frame 300. In operation, a STA may construct a subset of MAC frames for transmission and may decode a subset of received MAC frames upon validation. The particular subsets of frames that a STA may construct and/or decode may be determined by the functions supported by the STA. A STA may validate a received MAC frame using the frame check sequence (FCS) contained in the frame and may interpret certain fields from the MAC headers of all frames.

As shown in FIG. 3, MAC frame 300 includes a MAC header, a variable length frame body, and a frame check sequence (FCS).

The MAC header includes a frame control field, an optional duration/ID field (not in PS-Poll frames), address fields, an optional sequence control field, an optional QoS control field (only in QoS Data frames), and an optional high throughput (HT) control field (only in +HTC frames).

The frame control field includes the following subfields: protocol version, type, subtype, To DS, From DS, more fragments, retry, power management, more data, protected frame, and high throughput control (+HTC).

The protocol version subfield is invariant in size and placement across all revisions of the IEEE 802.11 standard. The value of the protocol version subfield is 0 for MAC frames.

The type and subtype subfields together identify the function of the MAC frame. There are three frame types: control, data, and management. Each of the frame types has several defined subtypes. Bits within the subtype subfield are used to indicate a specific modification of the basic data frame (subtype 0). For example, in data frames, the most significant bit (MSB) of the subtype subfield, bit 7 (B7) of the frame control field, is defined as the QoS subfield. When the QoS subfield is set to 1, it indicates a QoS subtype data frame, which is a data frame that contains a QoS control field in its MAC header. The second MSB of the subtype field, bit 6 (B6) of the frame control field, when set to 1 in data subtypes, indicates a data frame that contains no frame body field.

The To DS subfield indicates whether a data frame is destined to the DS. The From DS subfield indicates whether a data frame originates from the DS.

The more fragments subfield is set to 1 in all data or management frames that have another fragment to follow of the MAC service data unit (MSDU) or MAC management protocol data unit (MMPDU) carried by the MAC frame. It is set to 0 in all other frames in which the more fragments subfield is present.

The retry subfield is set to 1 in any data or management frame that is a retransmission of an earlier frame. It is set to 0 in all other frames in which the retry subfield is present. A receiving STA uses this indication to aid it in the process of eliminating duplicate frames. These rules do not apply for frames sent by a STA under a block agreement.

The power management subfield is used to indicate the power management mode of a STA.

The More Data subfield indicates to a STA in power save (PS) mode that bufferable units (BUs) are buffered for that STA at the AP. The more data subfield is valid in individually addressed data or management frames transmitted by an AP to a STA in PS mode. The more data subfield is set to 1 to indicate that at least one additional buffered BU is present for the STA.

The protected frame subfield is set to 1 if the frame body field contains information that has been processed by a cryptographic encapsulation algorithm.

The +HTC subfield indicates that MAC frame 300 contains an HT control field. A frame that contains the HT Control field is referred to as a +HTC frame. A Control Wrapper frame is a +HTC frame.

The duration/ID field of the MAC header indicates various contents depending on frame type and subtype and the QoS capabilities of the sending STA. For example, in control frames of the power save poll (PS-Poll) subtype, the duration/ID field carries an association identifier (AID) of the STA that transmitted the frame in the 14 least significant bits (LSB), and the 2 most significant bits (MSB) are both set to 1. In other frames sent by STAs, the duration/ID field contains a duration value (in microseconds) which is used by a recipient to update a network allocation vector (NAV). The NAV is a counter that indicates to a STA an amount of time during which it must defer from accessing the shared medium.

There can be up to four address fields in the format of MAC frame 300. These fields are used to indicate the basic service set identifier (BSSID), source address (SA), destination address (DA), transmitter address (TA), and receiver address (RA). Certain frames might not contain some of the address fields. Certain address field usage may be specified by the relative position of the address field (1-4) within the MAC header, independent of the type of address present in that field. Specifically, the address 1 field always identifies the intended receiver(s) of the frame, and the address 2 field, where present, always identifies the transmitter of the frame.

The sequence control field includes two subfields, a sequence number subfield and a fragment number subfield. The sequence number subfield in data frames indicates the sequence number of the MSDU (if not in an Aggregated MSDU (A-MSDU)) or A-MSDU. The sequence number subfield in management frames indicates the sequence number of the frame. The fragment number subfield indicates the number of each fragment of an MSDU or MMPDU. The fragment number is set to 0 in the first or only fragment of an MSDU or MMPDU and is incremented by one for each successive fragment of that MSDU or MMPDU. The fragment number is set to 0 in a MAC protocol data unit (MPDU) containing an A-MSDU, or in an MPDU containing an MSDU or MMPDU that is not fragmented. The fragment number remains constant in all retransmissions of the fragment.

The QoS control field identifies the traffic category (TC) or traffic stream (TS) to which MAC frame 300 belongs. The QoS control field may also indicate various other QoS related, A-MSDU related, and mesh-related information about the frame. This information can vary by frame type, frame subtype, and type of transmitting STA. The QoS control field is present in all data frames in which the QoS subfield of the subtype subfield is equal to 1.

The HT control field is present in QoS data, QoS null, and management frames as determined by the +HTC subfield of the frame control field. The control frame subtype for which HT control field is present is the control wrapper frame. A control frame that is described as +HTC (e.g., a request to send (RTS)+HTC, clear to send (CTS)+HTC, block acknowledgment (BlockAck)+HTC or block acknowledgment request (BlockAckReq)+HTC frame) implies the use of the control wrapper frame to carry that control frame.

The frame body field is a variable length field that contains information specific to individual frame types and subtypes. It may include one or more MSDUs or MMPDUs. The minimum length of the frame body is 0 octets.

The FCS field contains a 32-bit Cyclic Redundancy Check (CRC) code. The FCS field value is calculated over all of the fields of the MAC header and the frame body field.

Figure 4:
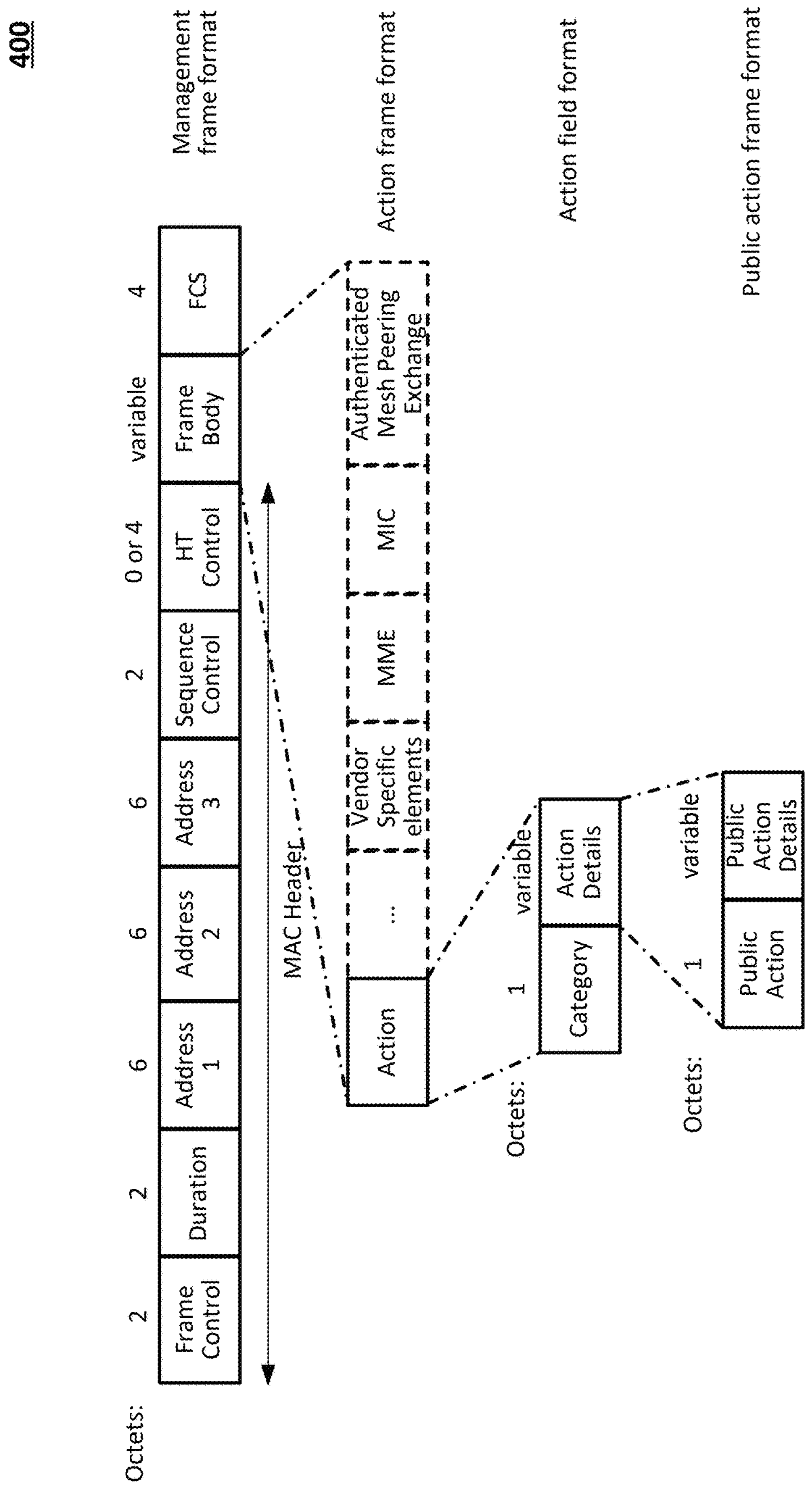
FIG. 4 illustrates an example management frame which may be used as an action frame.

FIG. 4 illustrates an example management frame 400 which may be used as an action frame. In an example, management frame 400 includes a MAC header, a variable length frame body, and a frame check sequence (FCS). The MAC header includes a frame control field, a duration field, an address 1 field, an address 2 field, an address 3 field, a sequence control field, and an optional HT control field. The presence of the HT control field is determined by the setting of a +HTC subfield of the frame control field.

As shown in FIG. 4, when used as an action frame, the frame body of management frame includes an action field, vendor specific elements, management message integrity code element (MME), message integrity code (MIC), and an authenticated mesh peering exchange element.

The action field includes a category field and an action details field. The action field provides a mechanism for specifying extended management actions. The category field indicates a category of the action frame. The action details field contains the details of the action requested by the action frame. For example, the action frame may be a public action frame. As shown in FIG. 4, in the public action frame format, the action details field includes a public action field, in the octet immediately after the category field, followed by a variable length public action details field.

One or more vendor specific elements are optionally present. These elements are absent when the category subfield of the Action field is vendor-specific.

The MME is present when management frame protection is negotiated, the frame is a group addressed robust Action frame, and (MBSS only) the category of the action frame does not support group addressed privacy as indicated by category values; otherwise not present.

The MIC element is present in a self-protected action frame if a shared pairwise master key (PMK) exists between the sender and recipient of this frame; otherwise not present.

The authenticated mesh peering exchange element is present in a self-protected action frame if a shared PMK exists between the sender and recipient of this frame; otherwise not present.

Figure 5:
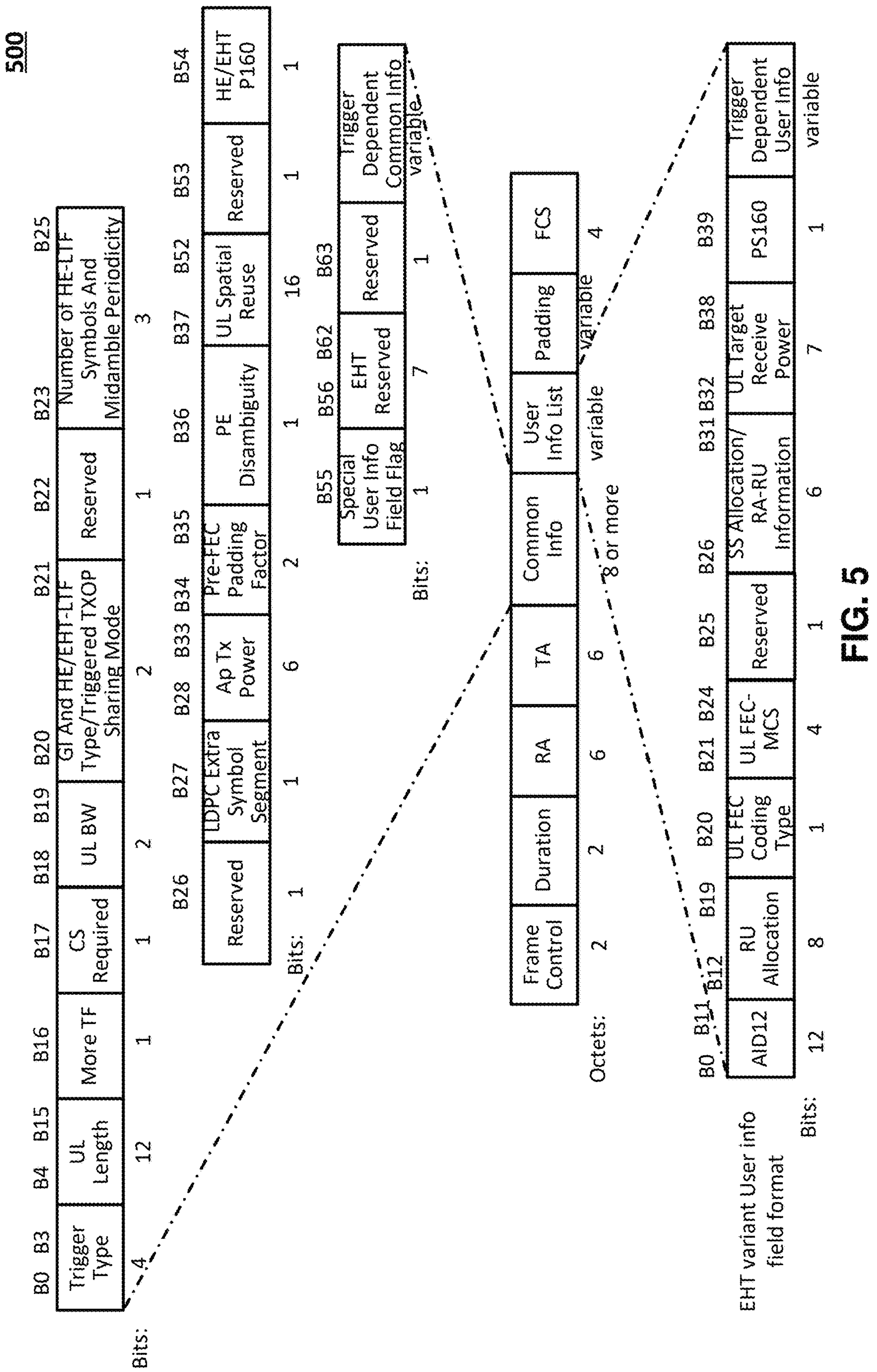
FIG. 5 illustrates an example control frame which may be used as a trigger frame.

FIG. 5 illustrates an example format of a trigger frame 500. Trigger frame 500 may be used by an AP to allocate resources for and solicit one or more TB PPDU transmissions from one or more STAs. Trigger frame 500 may also carry other information required by a responding STA to transmit a TB PPDU to the AP.

As shown in FIG. 5, trigger frame 500 includes a Frame Control field, a Duration field, a receiver address (RA) field, a transmitter address (TA) field, a Common Info field, a User Info List field, a Padding field, and an FCS field.

The Frame Control field includes the following subfields: protocol version, type, subtype, To DS, From DS, more fragments, retry, power management, more data, protected frame, and +HTC.

The Duration field indicates various contents depending on frame type and subtype and the QoS capabilities of the sending STA. For example, in control frames of the power save poll (PS-Poll) subtype, the Duration field carries an association identifier (AID) of the STA that transmitted the frame in the 14 least significant bits (LSB), and the 2 most significant bits (MSB) are both set to 1. In other frames sent by STAs, the Duration field contains a duration value (in microseconds) which is used by a recipient to update a network allocation vector (NAV).

The RA field is the address of the STA that is intended to receive the incoming transmission from the transmitting station. The TA field is the address of the STA transmitting trigger frame 500 if trigger frame 500 is addressed to STAs that belong to a single BSS. The TA field is the transmitted BSSID if trigger frame 500 is addressed to STAs from at least two different BSSs of the multiple BSSID set.

The Common Info field specifies a trigger frame type of trigger frame 500, a transmit power of trigger frame 500 in dBm, and several key parameters of a TB PPDU that is transmitted by a STA in response to trigger frame 500. The trigger frame type of a trigger frame used by an AP to receive QoS data using UL MU operation is referred to as a basic trigger frame. A non-EHT non-AP HE STA interprets the Common Info field as HE variant. A non-AP EHT STA interprets the Common Info field as HE variant if B54 and B55 in the Common Info field are equal to 1; and interprets the Common Info field as EHT variant otherwise. The HE variant Common Info field and the EHT variant Common Info field use the same encoding method for the Trigger Type, UL Length, More TF, CS Required, LDPC Extra Symbol Segment, AP TX Power, Pre-FEC Padding Factor, PE Disambiguity, and Trigger Dependent Common Info subfields.

The User Info List field contains zero or more User Info fields. There are three variants for the User Info field, which are the Special User Info field, the EHT variant User Info field, and the HE variant User Info field.

The Special User Info field is a User Info field that does not carry the user specific information but carries the extended common information not provided in the Common Info field. If the Special User Info field is included in the Trigger frame, then the Special User Info Field Flag subfield of the EHT variant Common Info field is set to 0, otherwise it is set to 1. The Special User Info field is identified by an AID12 value of 2007 and is optionally present in a Trigger frame that is generated by an EHT AP. The Special User Info field, if present, is located immediately after the Common Info field of the Trigger frame and carries information for the U-SIG field of a solicited EHT TB PPDU. The PHY Version Identifier subfield indicates the PHY version of the solicited TB PPDU that is not an HE TB PPDU. The PHY Version Identifier subfield is set to 0 for EHT. Other values from 1 to 7 are reserved. The UL Bandwidth (BW) Extension subfield, together with the UL BW subfield in the Common Info field, indicates the bandwidth of the solicited TB PPDU from the addressed EHT STA (i.e., the bandwidth in the U-SIG field of the EHT TB PPDU). The EHT Spatial Reuse n subfield carries the values to be included in the corresponding Spatial Reuse n subfield in the U-SIG field of the EHT TB PPDU. The U-SIG Disregard And Validate subfield carries the values to be included in the Disregard and Validate subfields of the U-SIG field of the solicited EHT TB PPDUs. The presence and length of the Trigger Dependent User Info subfield in the Special User Info field depends on the variant of the Trigger frame.

The EHT variant User Info field contains a User Info field per STA addressed in trigger frame 500. The per STA User Info field includes, among others, an AID12 subfield, an RU Allocation subfield, a UL FEC Coding Type subfield, a UL EHT-MCS subfield, a Reserved subfield, a Spatial Stream (SS) Allocation/RA-RU information subfield, a UL Target Receive Power subfield, and a Power Save (PS) 160 subfield to be used by a STA in a TB PPDU transmitted in response to trigger frame 500, and a Trigger Dependent User Info subfield. The RU Allocation subfield in an EHT variant User Info field in a Trigger frame that is not an MU-RTS Trigger frame, along with the UL BW subfield in the Common Info field, the UL BW Extension subfield in the Special User Info field, and the PS160 subfield in the EHT variant User Info field, identifies the size and the location of the RU or MRU. The values of PS160 subfield and B0 of RU Allocation subfield indicate the 80 MHz frequency subblock in which the RU or MRU is located for 26-tone RU, 52-tone RU, 106-tone RU, 242-tone RU, 484-tone RU, 996-tone RU, 52+26-tone RU, and 106+26-tone RU. The values of PS160 subfield indicates the 160 MHz segment in which the RU or MRU is located for 2□996-tone RU, 996+484-tone MRU, and 996+484+242-tone MRU. The UL FEC Coding Type subfield of the User Info field indicates the code type of the solicited EHT TB PPDU. The UL FEC Coding Type subfield is set to 0 to indicate BCC and set to 1 to indicate LDPC. The UL EHT-MCS subfield of the User Info field indicates the EHT-MCS of the solicited EHT TB PPDU. The SS Allocation subfield of the EHT variant User Info field indicates the spatial streams of the solicited EHT TB PPDU. The UL Target Receive Power subfield indicates the expected receive signal power, measured at the AP's antenna connector and averaged over the antennas, for the EHT portion of the EHT TB PPDU transmitted on the assigned RU. The Trigger Dependent User Info subfield can be used by an AP to specify a preferred access category (AC) per STA. The preferred AC sets the minimum priority AC traffic that can be sent by a participating STA. The AP determines the list of participating STAs, along with the BW, MCS, RU allocation, SS allocation, Tx power, preferred AC, and maximum duration of the TB PPDU per participating STA. The RA-RU Information subfield is reserved in the EHT variant User Info field.

The Padding field is optionally present in trigger frame 400 to extend the frame length to give recipient STAs enough time to prepare a response for transmission one SIFS after the frame is received. The Padding field, if present, is at least two octets in length and is set to all 1s.

The FCS field is used by a STA to validate a received frame and to interpret certain fields from the MAC headers of a frame.

Figure 6:
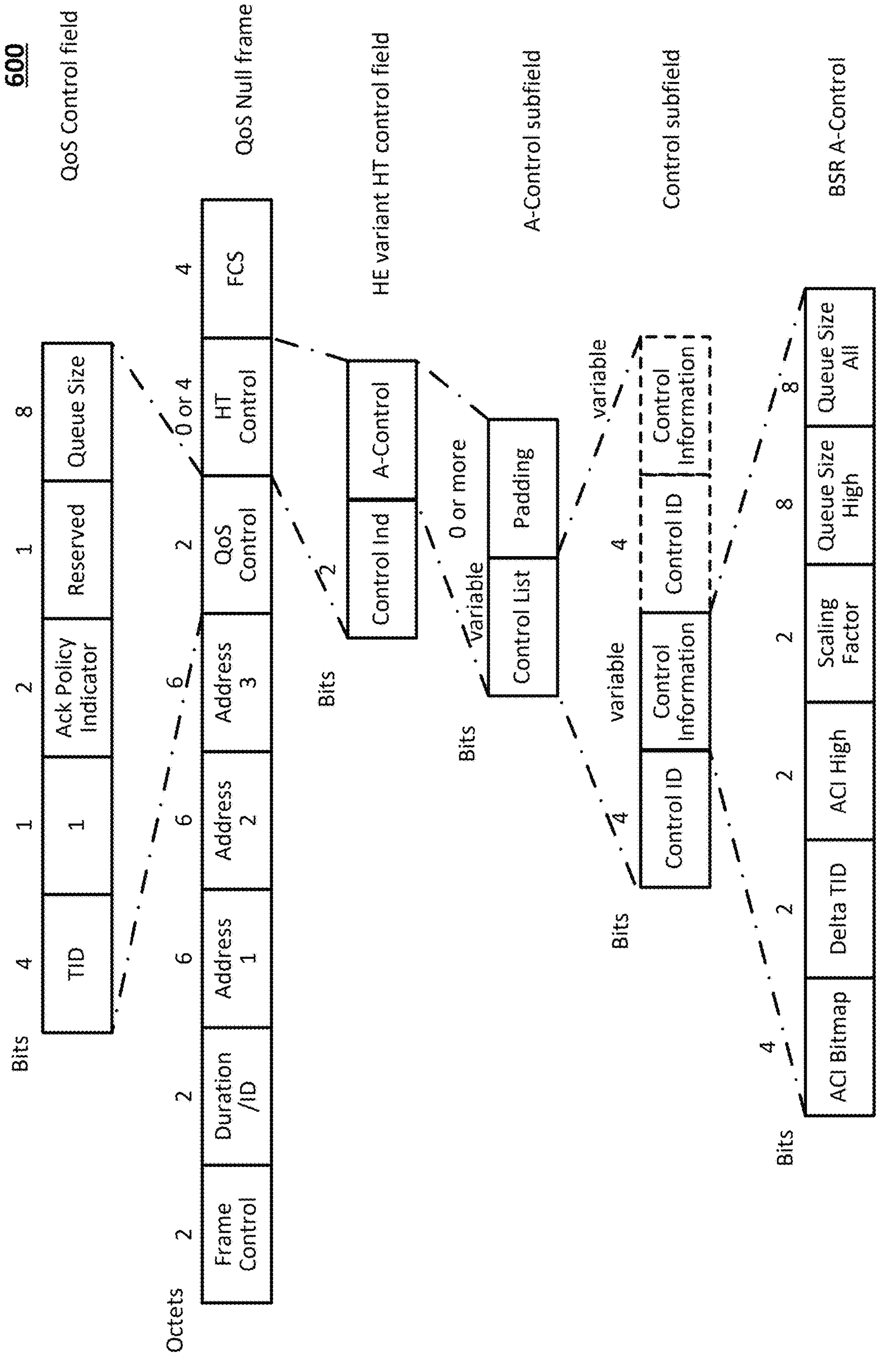
FIG. 6 illustrates an example data frame which may be used as a Quality of Service (QoS) null frame.

FIG. 6 illustrates an example data frame 600 which may be used as a QoS null frame. A QoS null frame refers to a QoS data frame with an empty frame body. QoS null frame includes a QoS control field and an optional HT control field which may contain a buffer status report (BSR) control subfield. A QoS null frame indicating buffer status information may be transmitted by a STA to an AP.

The QoS control field may include a traffic identifier (TID) subfield, an acknowledgment (Ack) policy indicator subfield, and a queue size subfield (or a transmission opportunity (TXOP) duration requested subfield).

The TID subfield identifies the TC or TS of traffic for which a TXOP is being requested, through the setting of the TXOP duration requested or queue size subfield. The encoding of the TID subfield depends on the access policy (e.g., Allowed value 0 to 7 for enhanced distributed channel access (EDCA) access policy to identify user priority for either TC or TS).

The ack policy indicator subfield, together with other information, identifies the Ack policy followed upon delivery of the MPDU (e.g., normal Ack, implicit block Ack request, no Ack, block Ack, etc.)

The queue size subfield is an 8-bit field that indicates the amount of buffered traffic for a given TC or TS at the STA for transmission to the AP identified by the receiver address of the frame containing the subfield. The queue size subfield is present in QoS null frames sent by a STA when bit 4 of the QoS control field is set to 1. The AP may use information contained in the queue size subfield to determine the TXOP duration assigned to the STA or to determine the uplink (UL) resources assigned to the STA.

In a frame sent by or to a non-high efficiency (non-HE) STA, the following rules may apply to the queue size value:

- The queue size value is the approximate total size, rounded up to the nearest multiple of 256 octets and expressed in units of 256 octets, of all MSDUs and A-MSDUs buffered at the STA (excluding the MSDU or A-MSDU contained in the present QoS Data frame) in the delivery queue used for MSDUs and A-MSDUs with TID values equal to the value indicated in the TID subfield of the QoS Control field.
- A queue size value of 0 is used solely to indicate the absence of any buffered traffic in the queue used for the specified TID.
- A queue size value of 254 is used for all sizes greater than 64 768 octets.
- A queue size value of 255 is used to indicate an unspecified or unknown size.

In a frame sent by an HE STA to an HE AP, the following rules may apply to the queue size value.

The queue size value, QS, is the approximate total size in octets, of all MSDUs and A-MSDUs buffered at the STA (including the MSDUs or A-MSDUs contained in the same PSDU as the frame containing the queue size subfield) in the delivery queue used for MSDUs and A-MSDUs with TID values equal to the value indicated in the TID subfield of the QoS control field.

The queue size subfield includes a scaling factor subfield in bits B14-B15 of the QoS control field and an unscaled value, UV, in bits B8-B13 of the QoS control field. The scaling factor subfield provides the scaling factor, SF.

A STA obtains the queue size, QS, from a received QoS control field, which contains a scaling factor, SF, and an unscaled value, UV, as follows:

$$QS = 16 \times UV, \text{ if } SF \text{ is equal to 0;}$$

$$1024 + 256 \times UV, \text{ if } SF \text{ is equal to 1;}$$

$$17\ 408 + 2048 \times UV, \text{ if } SF \text{ is equal to 2;}$$

$$148\ 480 + 32\ 768 \times UV, \text{ if } SF \text{ is equal to 3 and } UV \text{ is less than 62;}$$

$$> 2\ 147\ 328, \text{ if } SF \text{ equal to is 3 and } UV \text{ is equal to 62;}$$

Unspecified or Unknown, if SF is equal to 3 and UV is equal to 63.

The TXOP duration requested subfield, which may be included instead of the queue size subfield, indicates the duration, in units of 32 microseconds (us), that the sending STA determines it needs for its next TXOP for the specified TID. The TXOP duration requested subfield is set to 0 to indicate that no TXOP is requested for the specified TID in the current service period (SP). The TXOP duration requested subfield is set to a nonzero value to indicate a requested TXOP duration in the range of 32 us to 8160 us in increments of 32 us.

The HT control field may include an aggregated control (A-Control) subfield. The A-Control subfield may include a control list subfield including one or more control subfields.

The control subfield may be a BSR control subfield, which may contain buffer status information used for UL MU operation. The BSR control subfield may be formed from an access category index (ACI) bitmap subfield, a delta TID subfield, an ACI high subfield, a scaling factor subfield, a queue size high subfield, and a queue size all subfield of the HT control field.

The ACI bitmap subfield indicates the access categories for which buffer status is reported (e.g., B0: best effort (AC_BE), B1: background (AC_BK), B2: video (AC_VI), B3: voice (AC_VO), etc.). Each bit of the ACI bitmap subfield is set to 1 to indicate that the buffer status of the corresponding AC is included in the queue size all subfield, and set to 0 otherwise, except that if the ACI bitmap subfield is 0 and the delta TID subfield is 3, then the buffer status of all 8 TIDs is included.

The delta TID subfield, together with the values of the ACI bitmap subfield, indicate the number of TIDs for which the STA is reporting the buffer status.

The ACI high subfield indicates the ACI of the AC for which the BSR is indicated in the queue size high subfield. The ACI to AC mapping is defined as ACI value 0 mapping to AC_BE, ACI value 1 mapping to AC_BK, ACI value 2 mapping to AC_VI, and ACI value 3 mapping to AC_VO.

The scaling factor subfield indicates the unit SF, in octets, of the queue size high and queue size all subfields.

The queue size high subfield indicates the amount of buffered traffic, in units of SF octets, for the AC identified by the ACI high subfield, that is intended for the STA identified by the receiver address of the frame containing the BSR control subfield.

The queue size all subfield indicates the amount of buffered traffic, in units of SF octets, for all ACs identified by the ACI Bitmap subfield, that is intended for the STA identified by the receiver address of the frame containing the BSR control subfield.

The queue size values in the queue size high and queue size all subfields are the total sizes, rounded up to the nearest multiple of SF octets, of all MSDUs and A-MSDUs buffered at the STA (including the MSDUs or A-MSDUs contained in the same PSDU as the frame containing the BSR control subfield) in delivery queues used for MSDUs and A-MSDUs associated with AC(s) that are specified in the ACI high and ACI bitmap subfields, respectively.

A queue size value of 254 in the queue size high and queue size all subfields indicates that the amount of buffered traffic is greater than 254×SF octets. A queue size value of 255 in the queue size high and queue size all subfields indicates that the amount of buffered traffic is an unspecified or unknown size. The queue size value of QoS data frames containing fragments may remain constant even if the amount of queued traffic changes as successive fragments are transmitted.

MAC service provides peer entities with the ability to exchange MSDUs. To support this service, a local MAC uses the underlying PHY-level service to transport the MSDUs to a peer MAC entity. Such asynchronous MSDU transport is performed on a connectionless basis.

Figure 7:
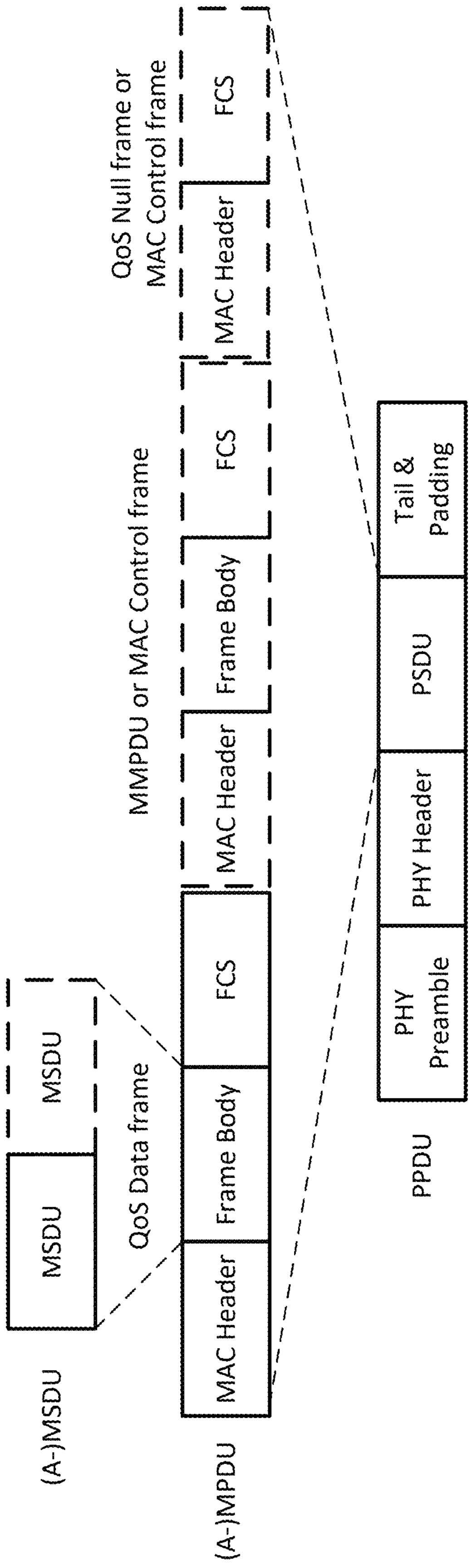
FIG. 7 illustrates an example format of a physical layer (PHY) protocol data unit (PPDU).

FIG. 7 illustrates an example format of a PPDU 700. As shown, PPDU 700 may include a PHY preamble, a PHY header, a PSDU, and tail and padding bits.

The PSDU may include one or more MPDUs, such as a QoS data frame, an MMPDU, a MAC control frame, or a QoS null frame. In the case of an MPDU carrying a QoS data frame, the frame body of the MPDU may include a MSDU or an A-MSDU.

By default, MSDU transport is on a best-effort basis. That is, there is no guarantee that a transmitted MSDU will be delivered successfully. However, the QoS facility uses a traffic identifier (TID) to specify differentiated services on a per-MSDU basis.

A STA may differentiate MSDU delivery according to designated traffic category (TC) or traffic stream (TS) of individual MSDUs. The MAC sublayer entities determine a user priority (UP) for an MSDU based on a TID value provided with the MSDU. The QoS facility supports eight UP values. The UP values range from 0 to 7 and form an ordered sequence of priorities, with 1 being the lowest value, 7 the highest value, and 0 falling between 2 and 3.

An MSDU with a particular UP is said to belong to a traffic category with that UP. The UP may be provided with each MSDU at the medium access control service access point (MAC SAP) directly in an UP parameter. An A-MPDU may include MPDUs with different TID values.

A STA may deliver buffer status reports (BSRs) to assist an AP in allocating UL MU resources. The STA may either implicitly deliver BSRs in the QoS control field or BSR control subfield of any frame transmitted to the AP (unsolicited BSR) or explicitly deliver BSRs in a frame sent to the AP in response to a BSRP Trigger frame (solicited BSR).

The buffer status reported in the QoS control field includes a queue size value for a given TID. The buffer status reported in the BSR control field includes an ACI bitmap, delta TID, a high priority AC, and two queue sizes.

A STA may report buffer status to the AP, in the QoS control field, of transmitted QoS null frames and QoS data frames and, in the BSR control subfield (if present), of transmitted QoS null frames, QoS data frames, and management frames as defined below.

The STA may report the queue size for a given TID in the queue size subfield of the QoS control field of transmitted QoS data frames or QoS null frames; the STA may set the queue size subfield to 255 to indicate an unknown/unspecified queue size for that TID. The STA may aggregate multiple QoS data frames or QoS null frames in an A-MPDU to report the queue size for different TIDs.

The STA may report buffer status in the BSR control subfield of transmitted frames if the AP has indicated its support for receiving the BSR control subfield.

A High-Efficiency (HE) STA may report the queue size for a preferred AC, indicated by the ACI high subfield, in the queue size high subfield of the BSR control subfield. The STA may set the queue size high subfield to 255 to indicate an unknown/unspecified queue size for that AC.

A HE STA may report the queue size for ACs indicated by the ACI bitmap subfield in the queue size all subfield of the BSR control subfield. The STA may set the queue size all subfield to 255 to indicate an unknown/unspecified BSR for those ACs.

A multi-link device (MLD) is an entity capable of managing communication over multiple links. The MLD may be a logical entity and may have more than one affiliated station (STA). An MLD may be an access point MLD (AP MLD) where a STA affiliated with the MLD is an AP STA (or an AP). An MLD may be a non-access point MLD (non-AP MLD) where a STA affiliated with the MLD is a non-AP STA (or an STA).

Communication across different frequency bands/channels may occur simultaneously, or not, depending on the capabilities of both the communicating AP MLD and non-AP MLD.

An MLD may have a single MAC service access point (MAC-SAP) to the LLC layer, which includes a MAC data service. The MLD may support multiple MAC sublayers, coordinated by a sublayer management entity (SME). Each AP STA (or non-AP STA) affiliated with an AP MLD (or non-AP MLD) has a different MAC address within the MLD.

The SME is responsible for coordinating the MAC sublayer management entities (MLMEs) of the affiliated STAs of the MLD to maintain a single robust security network association (RSNA) key management entity as well as a single IEEE 802.1X Authenticator or Supplicant for multi-link operation (MLO).

Multi-link operation (MLO) procedures allow a pair of MLDs to discover, synchronize, (de) authenticate, (re) associate, disassociate, and manage resources with each other on any common bands or channels that are supported by both MLDs. The Authenticator and the MAC-SAP of an AP MLD may be identified by the same AP MLD MAC address. The Supplicant and the MAC-SAP of a non-AP MLD may be identified by the same non-AP MLD MAC address.

Figure 8:
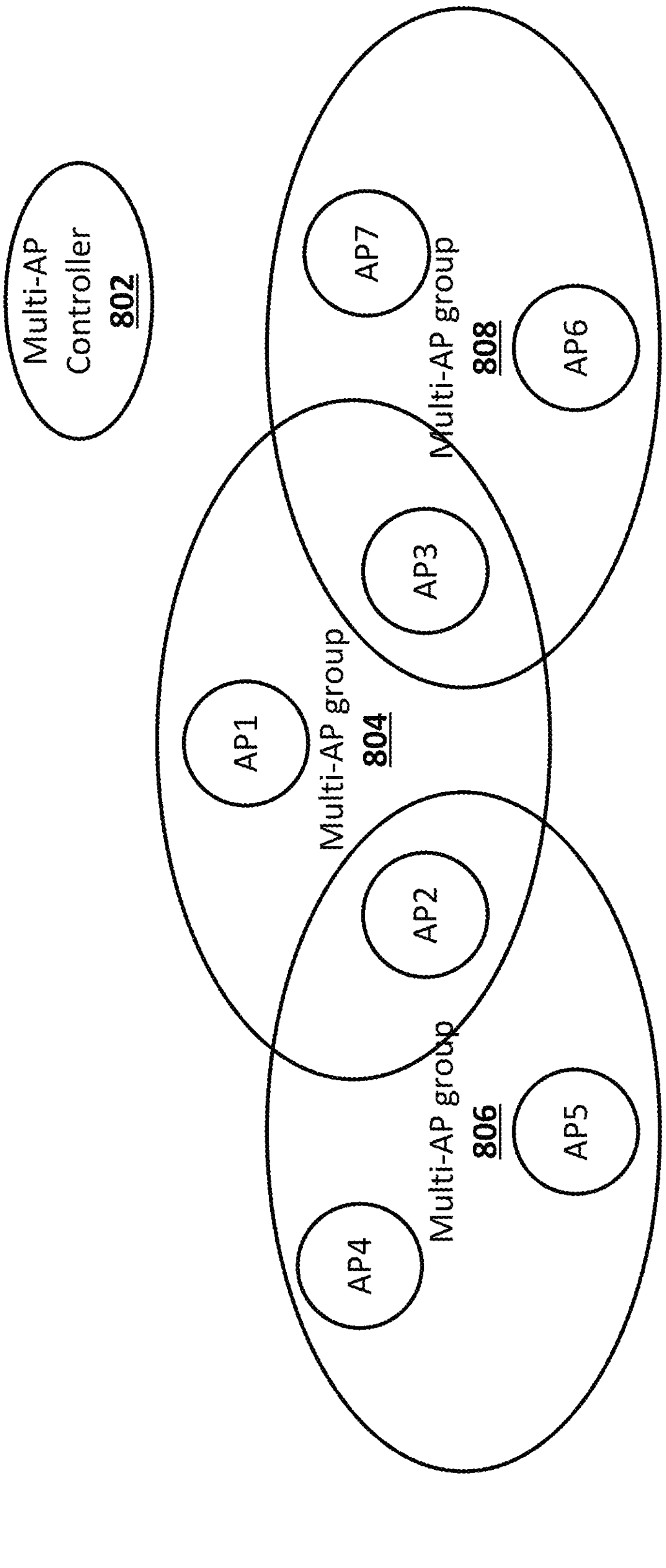
FIG. 8 illustrates an example multi-AP network.

FIG. 8 illustrates an example multi-AP network 800. Example multi-AP network 800 may be a multi-AP network in accordance with the Wi-Fi Alliance standard specification for multi-AP networks. As shown in FIG. 8, multi-AP network 800 may include a multi-AP controller 802 and a plurality of multi-AP groups (or multi-AP sets, or AP candidate sets), including multi-AP group 804, multi-AP group 806, and multi-AP group 808.

Multi-AP controller 802 may be a logical entity that implements logic for controlling the APs in multi-AP network 800. Multi-AP controller 802 may receive capability information and measurements from the APs and may trigger AP control commands and operations on the APs. Multi-AP controller 802 may also provide onboarding functionality to onboard and provision APs onto multi-AP network 800.

Multi-AP group 804, multi-AP group 806, and multi-AP group 808 may each include a plurality of APs. APs in a multi-AP group are in communication range of each other. However, the APs in a multi-AP group are not required to have the same primary channel. As used herein, the primary channel for an AP refers to a default channel that the AP monitors for management frames and/or uses to transmit beacon frames. For a STA associated with an AP, the primary channel refers to the primary channel of the AP, which is advertised through the AP's beacon frames.

In one approach, one of the APs in a multi-AP group may be designated as a master AP. The designation of the master AP may be done by multi-AP controller 802 or by the APs of the multi-AP group. The master AP of a multi-AP group may be fixed or may change over time between the APs of the multi-AP group. An AP that is not the master AP of the multi-AP group is known as a slave AP.

In one approach, a multi-AP group or an AP candidate set is a set of APs that can initiate or participate in multi-AP coordination. An AP in a multi-AP group can participate as a slave AP in multi-AP coordination initiated by a master AP in the same multi-AP group. At least one AP in a multi-AP group shall be capable of being a master AP.

In one approach, APs in a multi-AP group may coordinate with each other, including coordinating transmissions within the multi-AP group. One aspect of coordination may include coordination to perform multi-AP transmissions within the multi-AP group. As used herein, a multi-AP transmission is a transmission event in which multiple APs (of a multi-AP group or a multi-AP network) transmit simultaneously over a period. The period of simultaneous AP transmission may be a continuous period.

Multi-AP group coordination may be enabled by the multi-AP controller and/or by the master AP of the multi-AP group. In one approach, the multi-AP controller and/or the master AP may control time and/or frequency sharing in a TXOP. For example, when one of the APs (e.g., the master AP) in the multi-AP group obtains a TXOP, the multi-AP controller and/or the master AP may control how time/frequency resources of the TXOP are to be shared with other APs of the multi-AP group. In an implementation, the AP of the multi-AP group that obtains a TXOP becomes the master AP of the multi-AP group. The master AP may then share a portion of its obtained TXOP (which may be the entire TXOP) with one or more other APs of the multi-AP group.

Multi-AP operation may be enabled by at least two APs that support multi-AP coordination within one or more multi-AP groups. The APs may support multi-AP transmission schemes in a multi-AP network. A master AP may coordinate with slave AP(s) to enable multi-AP coordination and to support a multi-AP transmission. Slave AP(s) may participate in a multi-AP transmission. The master AP may select the slave AP(s) which are suitable for the multi-AP transmission. Slave APs may be candidates for a multi-AP transmission before being designated by the master AP.

Multi-AP transmission schemes may include transmission schemes such as coordinated OFDMA, coordinated time division multiple access (TDMA), coordinated spatial reuse, coordinated beamforming, joint transmission or reception (JT/JR), or a combination of two or more of the aforementioned schemes.

Coordinated OFDMA (COFDMA) and coordinated TDMA (CTDMA) may be categorized as coordinated TXOP, in which frequency or time resources of a TXOP may be used to coordinate the interference. Coordinated spatial reuse (CSR) may provide reuse of spatial domain of neighboring BSSs by adjusting the transmit powers of coordinated APs. Coordinated beamforming (CBF) may provide dedicated null steering with spatial radiation based on channel state information (CSI) feedback from coordinated APs with the aid of multiple antennas to suppress the interference. JT/JR may use distributed MIMO precoding or detection, via shared CSI, for data streams among multiple APs.

Figure 9:
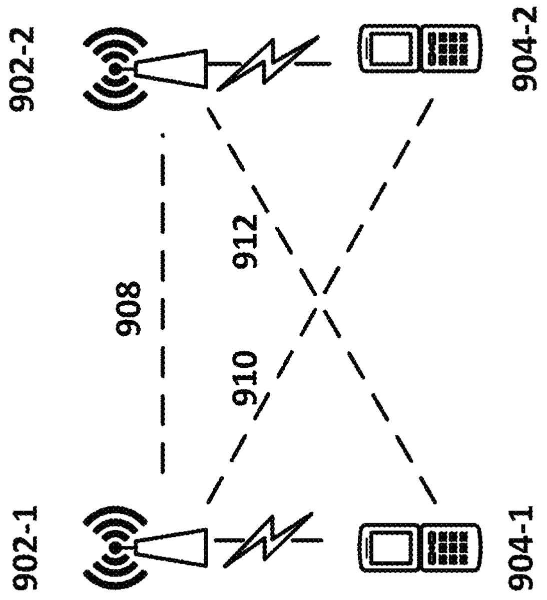
FIG. 9 illustrates an example network that includes a coordinated AP set.

FIG. 9 illustrates an example network 900 that includes a coordinated AP set. As shown in FIG. 9, the coordinated AP set may include AP 902-1 and AP 902-2. The coordinated AP set may be a subset of an established multi-AP group. At least one STA may be associated with each of APs 902-1 and 902-2. For example, a STA 904-1 may be associated with AP 902-1, and a STA 904-2 may be associated with AP 902-2.

APs 902-1 and 902-2 may belong to the same ESS as described above in FIG. 1. In such a case, APs 902-1 and 902-2 may be connected by a DS to support ESS features. In addition, as part of a coordinated AP set, APs 902-1 and 902-2 may be connected by a backhaul. The backhaul is used to share information quickly between APs to support coordinated transmissions. The shared information may be channel state information or data to be sent to associated STAs. The backhaul may be a wired backhaul or a wireless backhaul. A wired backhaul is preferred for high-capacity information transfer without burdening the main radios of the APs. However, a wired backhaul may require a higher deployment cost and may place greater constraints on AP placement. A wireless backhaul is preferred for its lower deployment cost and flexibility regarding AP placement. However, because a wireless backhaul relies on the main radios of the APs to transfer information, the APs cannot transmit or receive any data while the wireless backhaul is being used.

Typically, one of APs 902-1 and 902-2 may act as a Master AP and the other as a Slave AP. The Master AP is the AP that is the owner of the TXOP. The Master AP shares frequency resources during the TXOP with the Slave AP. When there are more than two APs in the coordinated set, a Master AP may share its TXOP with only a subset of the coordinated AP set. The role of the Master AP may change over time. For example, the Master AP role may be assigned to a specific AP for a duration of time. Similarly, the Slave AP role may be chosen by the Master AP dynamically or can be pre-assigned for a duration of time.

Depending on the capability of APs in a coordinated AP set, the APs may only do certain type of coordinated transmissions. For example, in FIG. 9, if AP 902-1 supports JT and CSR while AP 902-2 supports CSR and CBF, both APs may only perform CSR as a coordinated transmission scheme. An AP may also prefer to perform single AP transmissions for a duration of time if the benefit of coordinated transmission does not outweigh some disadvantages with coordinated transmission such as reduced flexibility and increased computational power required.

CSR is one type of multi-AP coordination that may be supported by AP 902-1 and AP 902-2 as shown in FIG. 9. Spatial reuse using CSR can be more stable than non-AP coordinated spatial reuse schemes such as overlapping basic service set (OBSS) packet detect (PD)-based SR and PSR-based SR. For example, in an example network 900, APs 902-1 and 902-2 may perform a joint sounding operation in order to measure path loss (PL) on paths of network 900. For example, the joint sounding operation may result in the measurement of PL 908 for the path between APs 902-1 and 902-2, path loss 910 for the path between AP 902-1 and STA 904-2, and path loss 912 for the path between AP 902-2 and STA 904-1. The measured path loss information may then be shared between APs 902-1 and 902-2 (e.g., using the backhaul) to allow for simultaneous transmissions by APs 902-1 and 902-2 to their associated STAs 904-1 and 904-2 respectively. Specifically, one of APs 902-1 and 902-2 obtains a TXOP to become the Master AP. The Master AP may then send a CSR announcement frame to the other AP(s). In an example, the Master AP may perform a polling operation, before sending the CSR announcement frame, to poll Slave APs regarding packet availability for transmission. If at least one Slave AP responds indicating packet availability, the Master AP may proceed with sending the CSR announcement frame. In the CSR announcement, the Master AP may limit the transmit power of a Slave AP in order to protect its own transmission to its target STA. The Slave AP may similarly protect its own transmission to its target STA by choosing a modulation scheme that enables a high enough Signal to Interference Ratio (SIR) margin to support the interference due to the transmission of the Master AP to its target STA.

Figure 10:
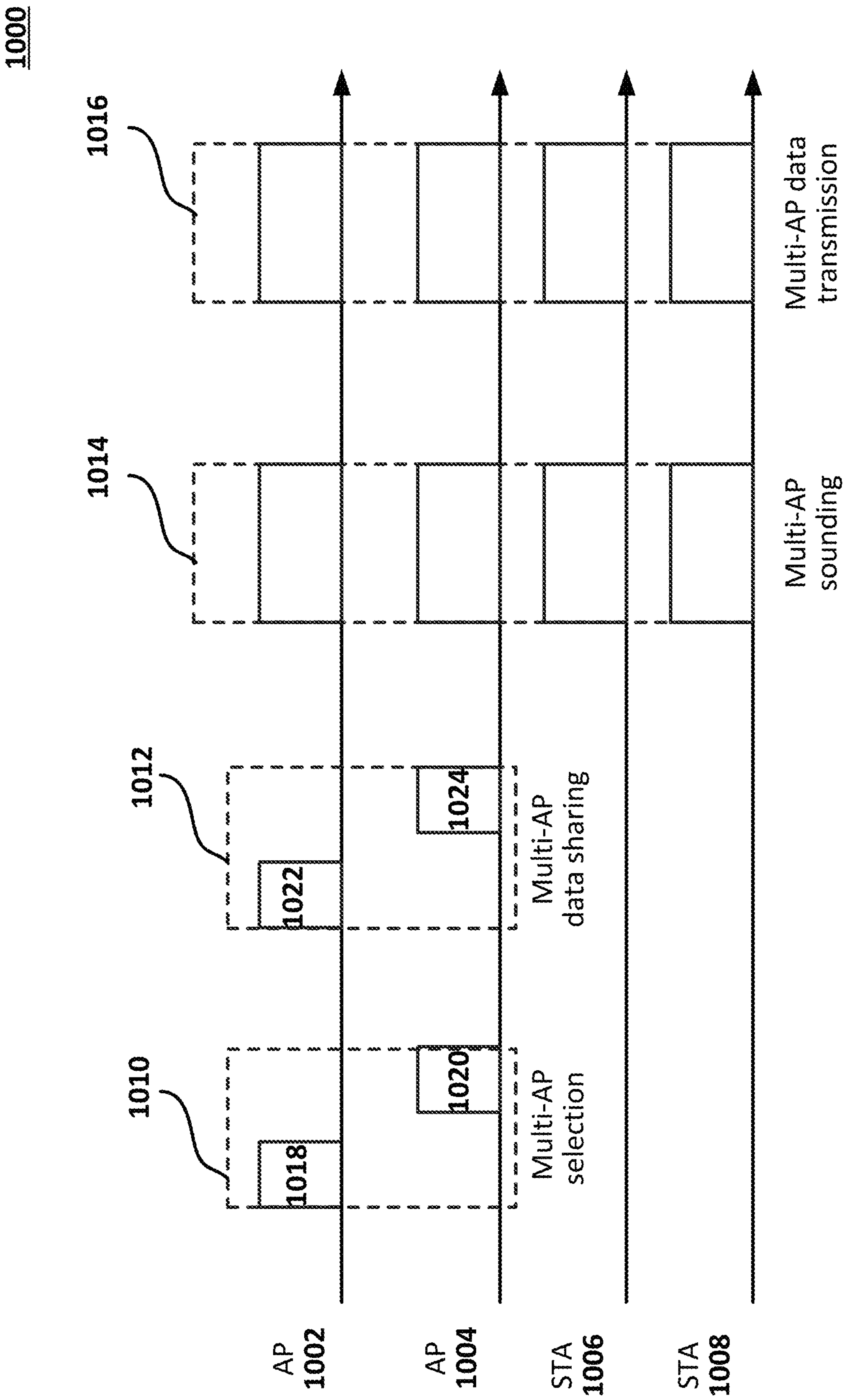
FIG. 10 illustrates an example multi-AP operation procedure.

FIG. 10 illustrates an example 1000 of a multi-AP operation procedure. In example 1000, the multi-AP operation procedure is illustrated with respect to a multi-AP network that includes APs 1002 and 1004 and STAs 1006 and 1008. In an example, APs 1002 and 1004 may form a multi-AP group. AP 1002 may be the master AP and AP 1004 may be a slave AP of the multi-AP group. For example, AP 1002 may obtain a TXOP making it the master AP of the multi-AP group. Alternatively, AP 1002 may be designated as the master AP by a multi-AP controller.

As shown in FIG. 10, the multi-AP operation procedure may include a series of phases in time, each of which may contain a plurality of frame exchanges within the multi-AP network. Specifically, the multi-AP operation procedure may include a multi-AP selection phase 1010, a multi-AP data sharing phase 1012, a multi-AP sounding phase 1014, and a multi-AP data transmission phase 1016.

A multi-AP network may carry out a multi-AP operation based on a specific multi-AP transmission scheme. The multi-AP transmission scheme may be chosen by the master AP based on the capabilities of the slave APs in a multi-AP group. Prior to a multi-AP operation, a slave AP may inform the master AP of capability information related to the slave AP, including the capabilities of supporting one or more multi-AP transmission schemes. The slave AP may also inform the master AP of BSS information of the BSS of the slave AP and of link quality information for STAs associated with the slave AP. The master AP may receive information related to all available slave APs. The information related to slave APs may include capability information, BSS information, and link quality information. Based on the information provided by available slave APs, the master AP may determine during a multi-AP selection phase the slave APs to be designated for a multi-AP transmission and a specific multi-AP transmission scheme to be used during the multi-AP transmission.

Multi-AP selection phase 1010 may include procedures for soliciting, selecting, or designating slave AP(s) for a multi-AP group by a master AP. As seen in FIG. 10, the multi-AP selection phase may include transmissions of frame 1018 from AP 1002 and frame 1020 from AP 1004. AP 1002 may transmit frame 1018 to solicit information regarding the buffer status of AP 1004. In response, AP 1004 may transmit frame 1020 to inform AP 1002 of its and its associated STAs buffer status and/or whether it intends to join multi-AP operation. Multi-AP selection phase 1010 may also be used to exchange information related to multi-AP operation, including BSS information of APs and link quality information between each AP and its associated STAs, for example. The BSS information of an AP may include a BSS ID of the BSS of the AP, identifiers and/or capabilities of STAs belonging to the BSS, information regarding sounding capabilities of the STAs, information regarding MIMO capabilities of the AP, etc. Link quality information may include received signal strength indicator (RSSI), signal-to-noise ratio (SNR), signal-to-interference-plus-noise-ratio (SINR), channel state information (CSI), channel quality indicator (CQI).

Multi-AP data sharing phase 1012 may include procedures for sharing data frames to be transmitted by APs to associated STAs among the master AP and selected slave AP(s) via direct connections between APs. Phase 1012 may be optional for some multi-AP data transmission schemes. For example, phase 1012 may be required for JT/JR as data frames may be exchanged between APs before or after multi-AP data transmission phase 1016.

Multi-AP data sharing phase 1012 may be performed using a wired backhaul, an in-channel wireless backhaul, or an off-channel wireless backhaul. In some cases, multi-AP data sharing phase 1012 may be performed over an in-channel backhaul, e.g., using the same wireless channel used to transmit/receive data to/from STAs. For example, as shown in FIG. 10, in phase 1012, AP 1002 may transmit a frame 1022, which may be received by AP 1004. Frame 1022 may include MPDUs that AP 1002 wishes to transmit to associated STAs using a multi-AP operation. Similarly, AP 1004 may transmit a frame 1024, which may be received by AP 1002. Frame 1024 may include MPDUs that AP 1004 wishes to transmit to associated STAs using a multi-AP operation.

Multi-AP sounding phase 1014 may include procedures for multi-AP channel sounding, including channel estimation and feedback of channel estimates among the master AP, candidate slave AP(s), and associated STAs. Phase 1014 may be optional for some multi-AP transmission schemes, such as COFDMA, CDTMA, and CSR. For example, phase 1014 may be performed by the master AP to aid in resource unit allocation when orchestrating a COFDMA transmission.

Multi-AP data transmission phase 1016 may include exchange of data frames between the master AP, slave AP(s), and their associated STAs based on multi-AP transmission scheme(s) determined by the master AP. Depending on the multi-AP transmission scheme(s) to be used, phase 1016 may include optional synchronization between APs of the multi-AP group, before exchange of data frames between APs and STAs within the multi-AP group.

The order of phases 1010, 1012, 1014 and 1016 may be different than shown in FIG. 10. For example, in COFDMA, phase 1016 may occur immediately after phase 1010, whereas, in JT/JR, phase 1012 may occur after phase 1010. Further, as mentioned above, some phases may be optional and may or may not be present. For example, phase 1014 may not be required for COFDMA but may be required for JT/JR.

Figure 11:
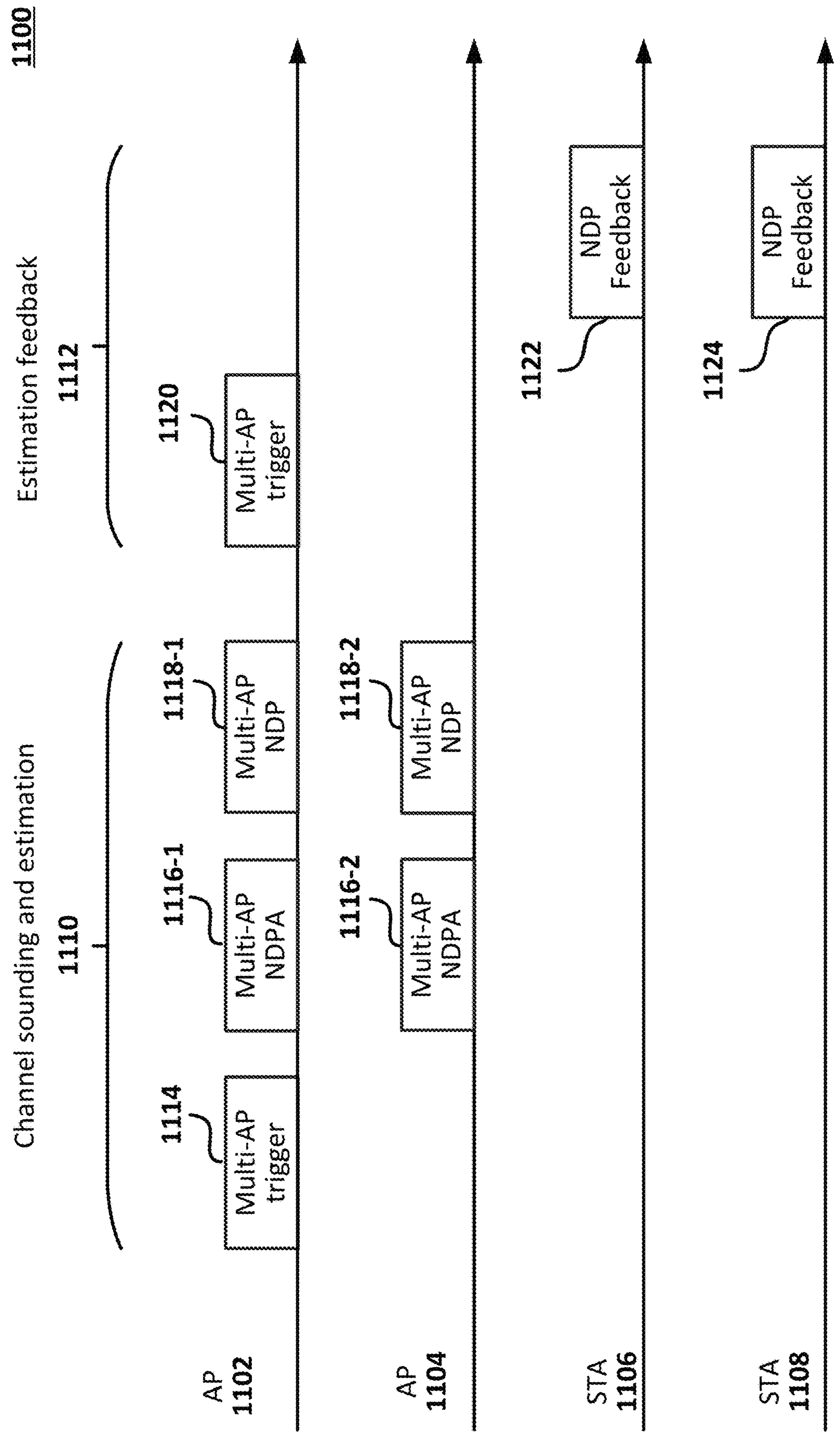
FIG. 11 illustrates an example multi-AP sounding phase.

FIG. 11 illustrates an example 1100 of a multi-AP sounding phase. This multi-AP sounding phase may be an example of multi-AP sounding phase 1014. As shown in FIG. 11, example 1100 may include a master AP 1102 and a slave AP 1104 of a multi-AP group. Example 1100 may further include a STA 1106 associated with AP 1102 and a STA 1108 associated with AP 1104.

As shown in FIG. 11, example 1100 of a multi-AP sounding phase may include frame exchanges to allow AP 1102 (the master AP) to acquire channel state information (CSI) of channels in the multi-AP group. In an implementation, example 1100 of a multi-AP sounding phase may include a first subphase 1110 and a second subphase 1112.

During the first subphase 1110, APs may initiate channel sounding and STAs may estimate CSI. For example, AP 1102 may transmit a frame 1114 to AP 1104 (the slave AP) to trigger multi-AP sounding. Frame 1114 may comprise a multi-AP trigger frame. Subsequently, APs 1102 and 1104 may transmit respectively announcement frames 1116-1 and 1116-2 to their respective associated STAs 1106 and 1108 to announce the transmission of sounding frames. Frames 1116-1 and 1116-2 may comprise multi-AP null data PPDU announcement (NDPA) frames. Frames 1116-1 and 1116-2 may be transmitted simultaneously. Next, APs 1102 and 1104 may transmit respectively frames 1118-1 and 1118-2 to STAs 1106 and 1108, respectively. Frames 1118-1 and 1118-2 may comprise multi-AP null data PPDU (NDP) frames. STAs 1106 and 1108 receive frames 1118-1 and 1118-2 respectively and perform channel estimation of the channels from AP 1102 to STA 1106 and from AP 1104 to STA 1108, respectively.

During the second subphase 1112, APs may initiate a procedure for STAs to feed back channel estimates to the APs. For example, AP 1102 may transmit a frame 1120 to trigger STAs 1106 and 1108 to transmit their channel estimates to APs 1102 and 1104, respectively. Frame 1120 may comprise a multi-AP trigger frame. In response, STAs 1106 and 1108 may transmit respectively frames 1122 and 1124 including feedback of channel estimates to APs 1102 and 1104, respectively. Frames 1122 and 1124 may comprise NDP feedback frames. The feedback of channel estimates may include NDP feedback, CSI-related information, a beamforming report (BFR), or a channel quality indication (CQI) report.

Figure 12:
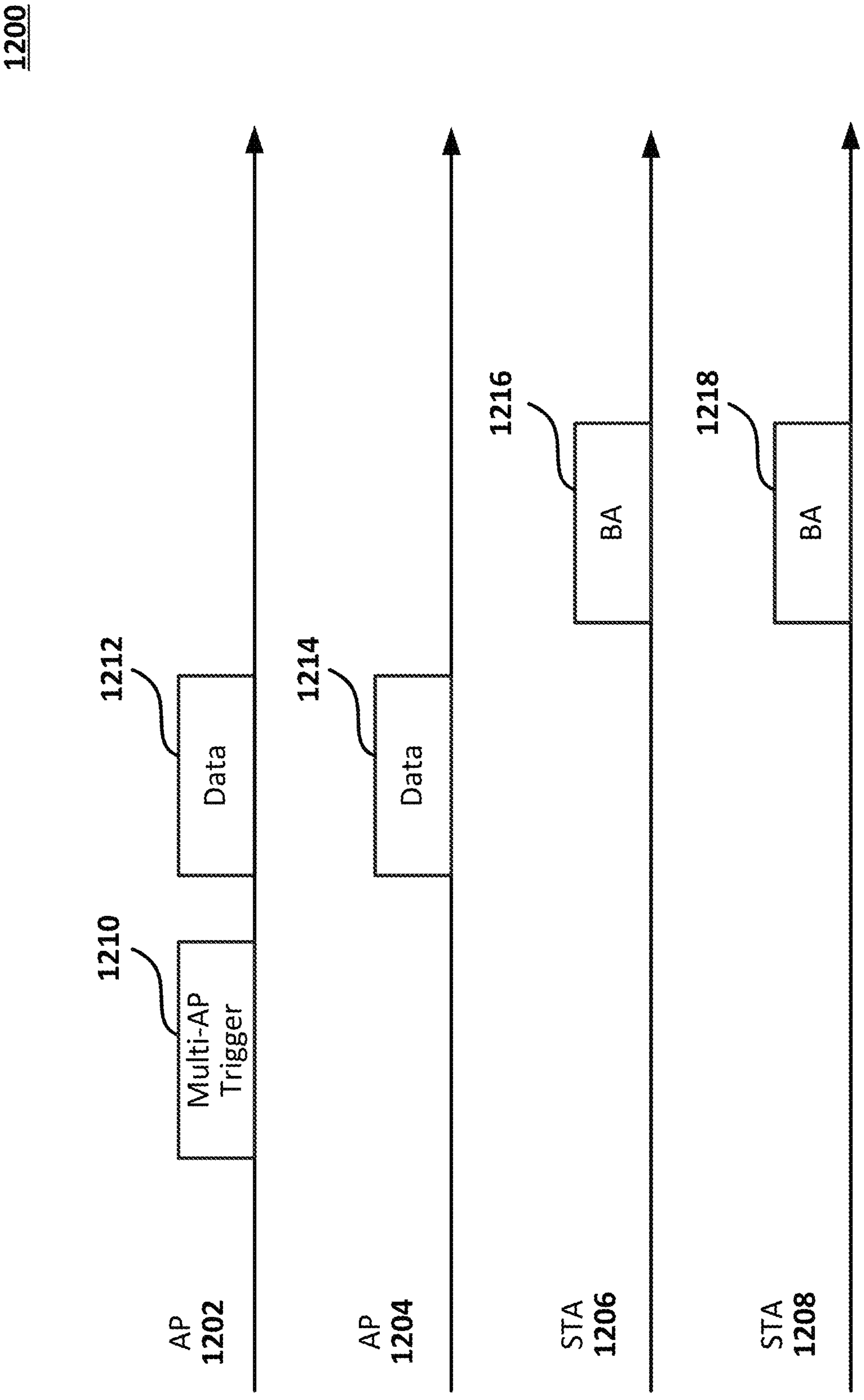
FIG. 12 illustrates an example multi-AP downlink data transmission phase.

FIG. 12 illustrates an example 1200 of a multi-AP downlink data transmission phase. This multi-AP downlink data transmission phase may be an example of multi-AP data transmission phase 1016. As shown in FIG. 12, example 1200 may include a master AP 1202 and a slave AP 1204 of a multi-AP group. Example 1200 may further include a STA 1206 associated with AP 1202, and a STA 1208 associated with AP 1204.

As shown in FIG. 12, example 1200 of a multi-AP downlink data transmission phase may include frame exchanges to enable master AP 1202 to coordinate with slave AP 1204 to perform specific multi-AP transmission schemes with their associated STAs 1206 and 1208, respectively. The multi-AP transmission schemes may include COFDMA, CTDMA, CSR, CBF, JT/JR, or a combination of two or more of the aforementioned schemes.

As shown in FIG. 12, master AP 1202 may begin example 1200 of a multi-AP downlink transmission phase by transmitting a frame 1210 to AP 1204. Frame 1210 may include information related to AP 1204 (e.g., an identifier of AP 1204), synchronization information, information related to a specific multi-AP transmission scheme to be used, and/or information related to a resource unit (RU) for use by AP 1204 to acknowledge frame 1210. Frame 1210 may comprise a control frame. For example, frame 1210 may comprise a multi-AP trigger frame.

Slave AP 1204 may receive frame 1210 and may use the synchronization information to synchronize with master AP 1202. Subsequently, APs 1202 and 1204 may perform data transmission to their associated STAs 1206 and 1208, respectively. Specifically, AP 1202 may transmit a data frame 1212 to its associated STA 1206, and AP 1204 may transmit a data frame 1214 to its associated STA 1208. Depending on the multi-AP transmission scheme being used, APs 1202 and 1204 may transmit frames 1212 and 1214 respectively to STAs in different BSSs. For example, when the multi-AP transmission scheme is JT/JR, AP 1202 may also transmit frame 1212 to STA 1208 associated with slave AP 1204, and AP 1204 may also transmit frame 1214 to STA 1208 associated with AP 1204. The resources for transmitting and receiving frames 1212 and 1214 may depend on the specific multi-AP transmission scheme adopted.

STAs 1206 and 1208 may acknowledge frames 1212 and 1214, respectively. For example, STA 1206 may transmit a frame 1216 to AP 1202, and STA 1208 may transmit a frame 1218 to AP 1204. Frames 1216 and 1218 may comprise block ack (BA) frames. STAs 1206 and 1208 may also transmit frames 1216 and 1218 to APs in different BSSs, when required by the used multi-AP transmission scheme. For example, when the multi-AP transmission scheme is JT/JR, STA 1206 may also transmit frame 1216 to AP 1204, and STA 1208 may also transmit frame 1218 to AP 1202. The resources for transmitting and receiving frames 1216 and 1218 may depend on the specific multi-AP transmission scheme adopted.

Figure 13:
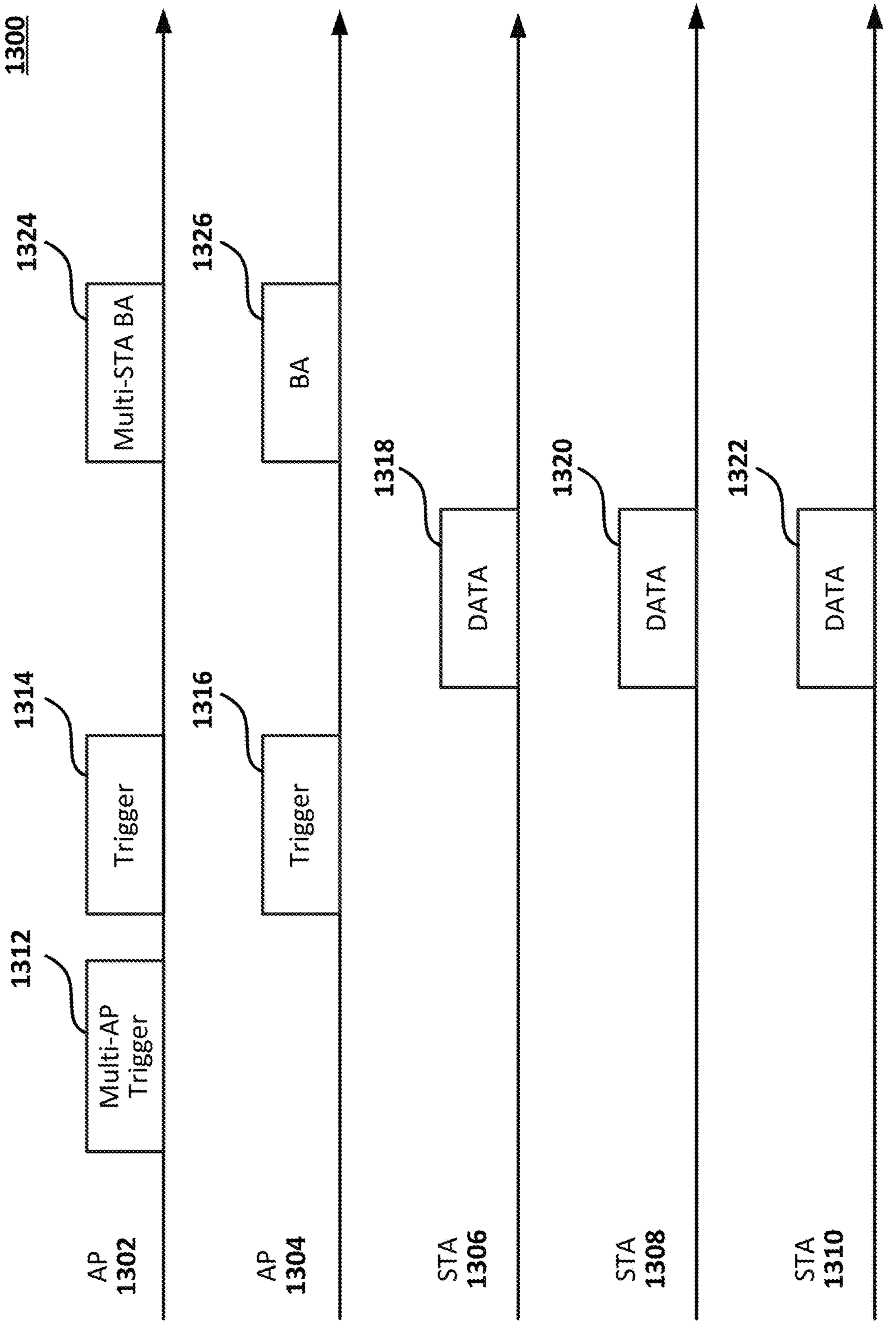
FIG. 13 illustrates an example multi-AP uplink data transmission phase.

FIG. 13 illustrates an example 1300 of a multi-AP uplink data transmission phase. This multi-AP uplink data transmission phase may be an example of multi-AP data transmission phase 1016. As shown in FIG. 13, example 1300 may include a master AP 1302 and a slave AP 1304 of a multi-AP group. Example 1300 may further include STAs 1306 and 1308 associated with AP 1302, and a STA 1310 associated with AP 1304.

As shown in FIG. 13, example 1300 of a multi-AP uplink data transmission phase may include frame exchanges to enable master AP 1302 to coordinate with slave AP 1304 to perform specific multi-AP transmission schemes with STAs 1306, 1308, and 1310. The multi-AP transmission schemes may include COFDMA, CTDMA, CSR, CBF, JT/JR, or a combination of two or more of the aforementioned schemes.

As shown in FIG. 13, master AP 1302 may begin example 1300 of a multi-AP uplink data transmission phase by transmitting a frame 1312 to AP 1304. Frame 1312 may include information related to AP 1304 (e.g., an identifier of AP 1304), synchronization information, information related to a specific multi-AP transmission scheme to be used, and/or information related to an RU for use by AP 1304 to acknowledge frame 1312. Frame 1312 may comprise a control frame. For example, frame 1312 may comprise a multi-AP trigger frame.

Slave AP 1304 may receive frame 1312 and may use the synchronization information to synchronize with master AP 1302. Subsequently, APs 1302 and 1304 may solicit uplink data transmissions from their associated STAs 1306, 1308 and 1310 using trigger frames. Specifically, AP 1302 may transmit a trigger frame 1314 to its associated STAs 1306 and 1308, and AP 1304 may transmit a trigger frame 1316 to its associated STA 1310. Depending on the multi-AP transmission scheme being used, APs 1302 and 1304 may also transmit frames 1314 and 1316 respectively to STAs in different BSSs. For example, when the multi-AP transmission scheme is JT/JR, AP 1302 may also transmit frame 1314 to STA 1310 associated with slave AP 1304, and AP 1304 may also transmit frame 1316 to STAs 1306 and 1308 associated with AP 1302. The resources for transmitting and receiving frames 1314 and 1316 may depend on the specific multi-AP transmission scheme adopted.

STAs 1306 and 1308 may respond to frame 1314, STA 1310 may respond to frame 1316. For example, STAs 1306 and 1308 may transmit frames 1318 and 1320 respectively to AP 1302, while STA 1310 may transmit a frame 1322 to AP 1304. Frames 1318, 1320, and/or 1322 may be transmitted simultaneously. Frames 1318, 1320, and 1322 may comprise data frames or null data frames. STAs 1306, 1308, and 1310 may also transmit frames 1318, 1320, and 1322 respectively to APs in different BSSs, when required by the used multi-AP transmission scheme. For example, when the multi-AP transmission scheme is JT/JR, STAs 1306 and 1308 may also transmit respective frames 1318 and 1320 to AP 1304, and STA 1310 may also transmit frame 1322 to AP 1302. The resources for transmitting and receiving frames 1318, 1320, and 1322 may depend on the specific multi-AP transmission scheme adopted. AP 1302 may acknowledge frames 1318 and 1320 by transmitting a multi-STA BA frame 1324 to STAs 1306 and 1308. AP 1304 may acknowledge frame 1322 by transmitting a BA frame 1326 to STA 1310.

Figure 14:
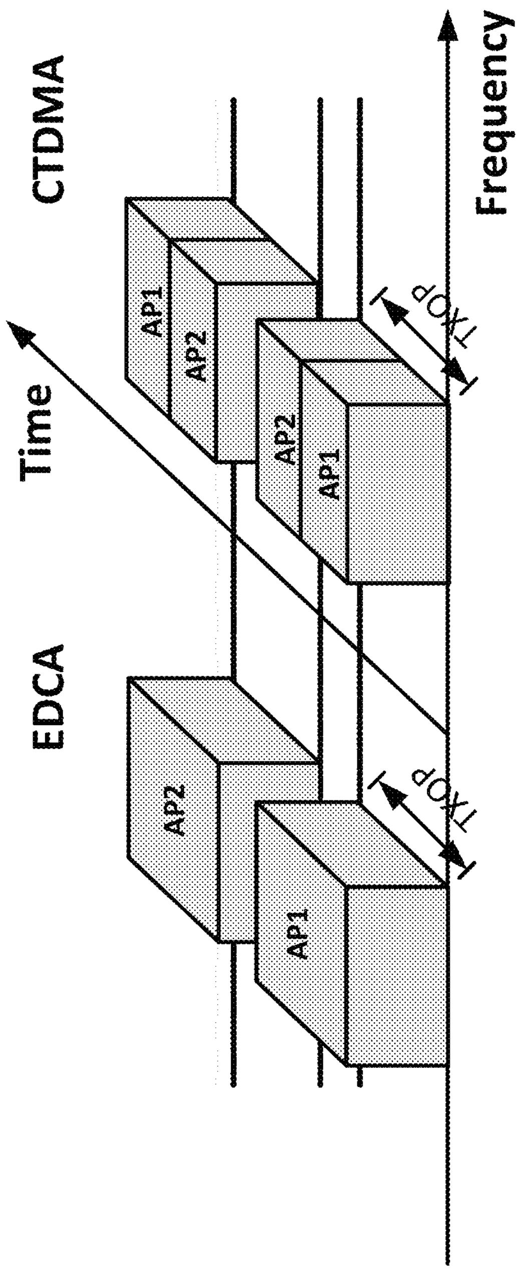
FIG. 14 illustrates an example Enhanced Distributed Channel Access (EDCA) and Coordinated Time Division Multiple Access (CTDMA).

FIG. 14 illustrates an example 1400 Enhanced Distributed Channel Access (EDCA) and Coordinated Time Division Multiple Access (CTDMA). In CTDMA, an AP (generally referred to as a master AP or a sharing AP) may share a portion of its TXOP with one or more APs (generally referred to as slave APs or shared APs). Specifically, the sharing AP may assign/allocate each of the one or more APs a respective time period within the TXOP of the sharing AP. A shared AP may use its allocated time period to communicate with one or more STA. CTDMA is illustrated in FIG. 14 as a multi-AP channel access scheme, compared with Enhanced Distributed Channel Access (EDCA). As shown in FIG. 14, in EDCA, channel access by multiple APs (e.g., AP1, AP2) may occur in consecutive time periods (e.g., TXOPs), where each AP has its own TXOP. During a given channel access, the channel in its entirety may be used by a single AP for the duration of the TXOP. In contrast, in CTDMA, access by multiple APs may take place in a same TXOP over consecutive time periods. For example, as shown in FIG. 14, a TXOP may be divided into two non-overlapping time periods, each assigned to a respective AP of the multiple APs. The multiple APs may transmit in a coordinated manner in the same TXOP consecutively. In an example, as shown in FIG. 14, a master/sharing AP (e.g., AP1) may use itself a first portion of a first TXOP and may share a second portion of the first TXOP with a slave/shared AP (e.g., AP2). In another example, the master/shared AP (e.g., AP1) may share a first portion of a second TXOP with a slave/shared AP (e.g., AP2) and may use itself a second portion of the second TXOP.

Triggered TXOP sharing (TXS) is a technique introduced in the IEEE 802.11be standard amendment. TXS allows an AP to allocate a time duration within an obtained TXOP to a STA for transmitting one or more non-trigger-based (non-TB) PPDUs. For the TXS procedure, the AP may transmit a multi-user request-to-send (MU-RTS) trigger frame with a triggered TXOP sharing mode subfield set to a non-zero value. The MU-RTS trigger frame is a trigger frame for triggering CTS frame(s) from multiple users. An MU-RTS trigger frame with the triggered TXOP sharing mode subfield set to a non-zero value is called an MU-RTS TXS trigger (MRTT) frame.

In an example, when the triggered TXOP sharing mode subfield is set to 1, the STA may transmit the one or more non-TB PPDUs to the AP during the allocated time duration. In an example, when the triggered TXOP sharing mode subfield is set to 2, the STA may transmit the one or more non-TB PPDUs to the AP or a peer STA during the allocated time duration. The peer STA may be a STA with a connection for peer-to-peer (P2P) communication or direct communication with the STA. In an example, the direct wireless link is established according to the tunneled direct link setup (TDLS) protocol.

Figure 15:
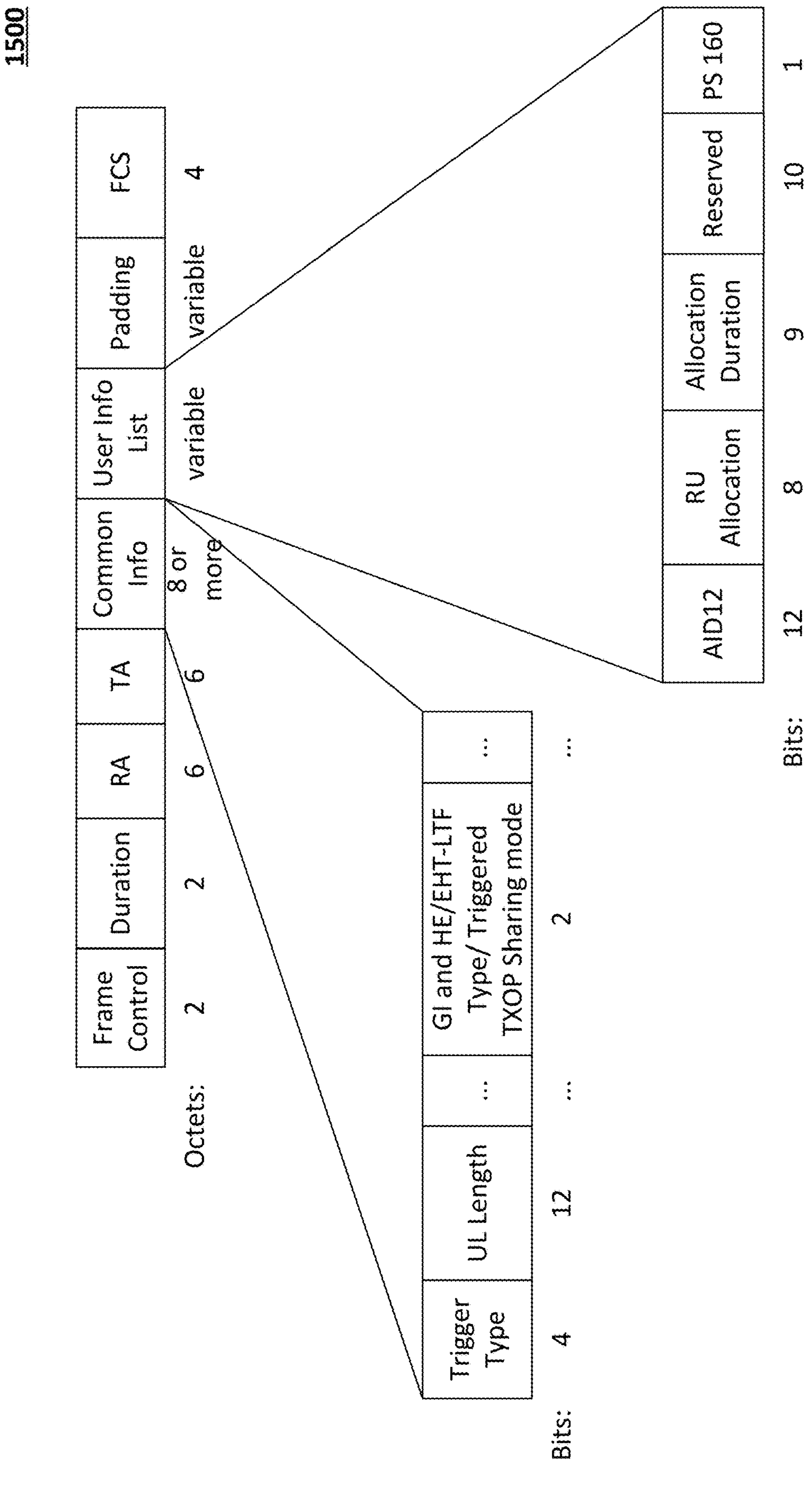
FIG. 15 illustrates an example of a Multi-User Request-to-Send (MU-RTS) trigger frame which may be used in a triggered Transmission Opportunity (TXOP) sharing (TXS) procedure.

FIG. 15 illustrates an example of a MRTT frame 1500 which may be used in a TXS procedure. As shown in FIG. 15, example MRTT frame 1500 may comprise a frame control field, a duration field, a receiver address (RA) field, a transmitter address (TA) field, a common info field, a user info list field, a padding field, and/or frame check sequence (FCS) field.

In an example, the common info field may be a high-efficiency (HE) variant common info field or an extremely high throughput (EHT) variant common info field. An EHT variant common info field may comprise, as shown in FIG. 15, one or more of the following subfields: trigger type, UL length, more TF, CS required, UL BW, GI and HE/EHT-LTF Type/Triggered TXOP sharing mode, number of HE/EHT-LTF symbols, LDPC extra symbol segment, AP Tx Power, Pre-FEC padding factor, PE disambiguity, UL spatial reuse, HE/EHT P160, special user info field flag, EHT reserved, reserved, or trigger dependent common info.

The trigger type subfield indicates that frame 1500 is an MRTT frame.

The GI and HE/EHT-LTF Type/Triggered TXOP sharing mode subfield may include a triggered TXOP sharing mode subfield. In an example, the triggered TXOP sharing mode subfield may be set to a non-zero value (e.g., 1 or 2). In an example, the triggered TXOP sharing mode subfield may be set to 1. As such, the triggered TXOP sharing mode subfield may indicate that a STA indicated by an AID12 subfield of a user info field (of the user info list field) may transmit one or more non-TB PPDUs to the AP during a time indicated in the allocation duration subfield of the user info field. In another example, the triggered TXOP sharing mode subfield may be set to 2. As such, the triggered TXOP sharing mode subfield may indicate that a STA indicated by an AID12 subfield of a user info field (of the user info list field) may transmit one or more non-TB PPDUs to the AP or to a peer STA during the time indicated by the allocation duration subfield of the user info field. In an example, the peer STA may be a STA with a connection for P2P communication or direct communication with the STA.

The user info list field may include one or more user info fields. In an example, an EHT variant user info field may comprise, as shown in FIG. 15, one or more of the following subfields: AID12, RU allocation, allocation duration, reserved, or PS160.

The AID12 subfield may indicate an association identifier (AID) of a STA that may use a time indicated by the allocation duration subfield.

The RU allocation subfield may indicate the location and size of the RU allocated for a STA indicated by the AID12 subfield.

The allocation duration subfield may indicate a time allocated by an AP transmitting MRTT frame 1500. The allocated time may be a portion a TXOP obtained by the AP. In an example, the allocation duration subfield may indicate a first time period.

Figure 16:
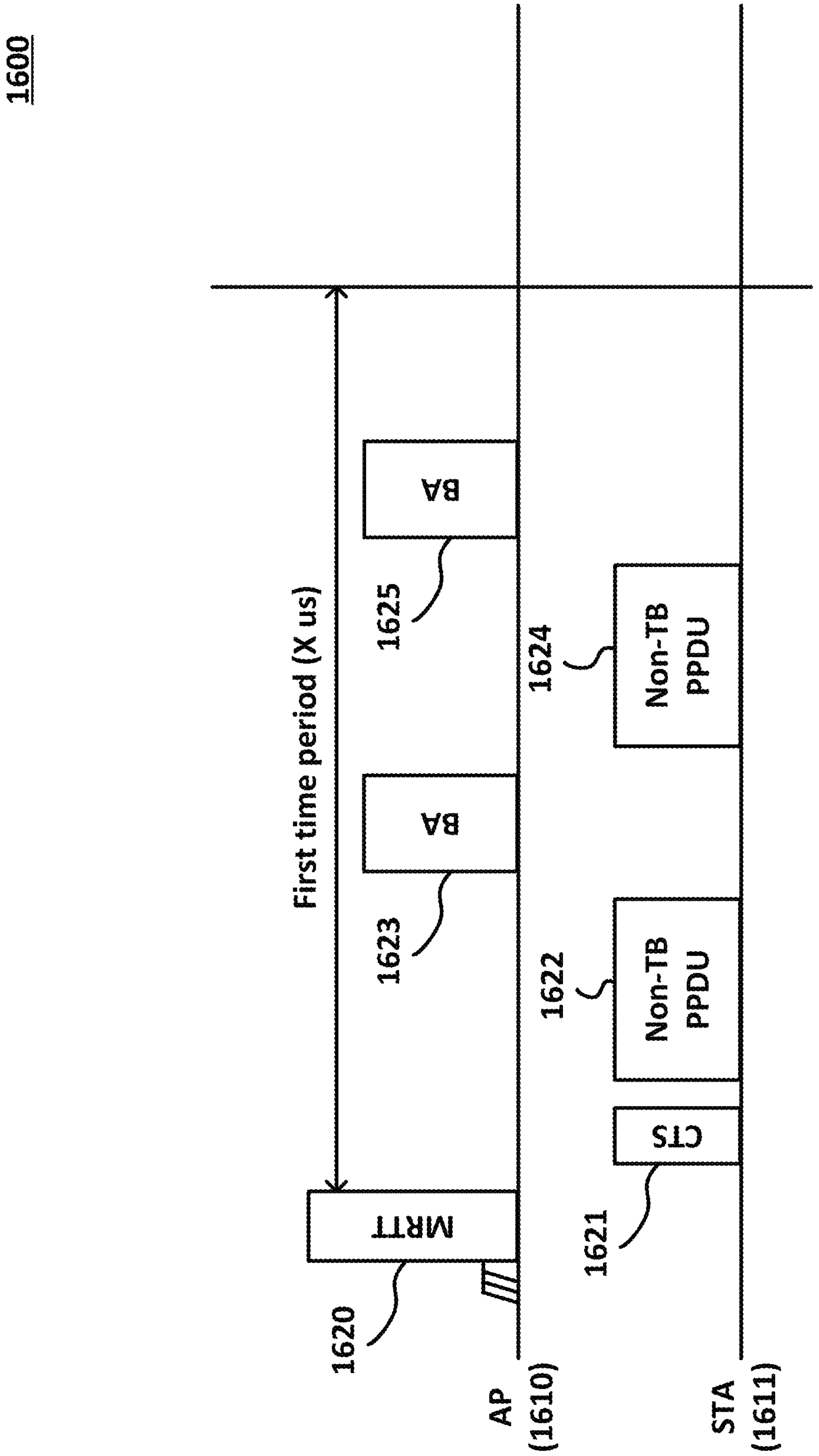
FIG. 16 illustrates an example of a TXS procedure (Mode=1).

FIG. 16 illustrates an example 1600 of a TXS procedure (Mode=1). As shown in FIG. 16, the TXS procedure may begin by an AP 1610 transmitting an MRTT frame 1620 to a STA 1611. MRTT frame 1620 may allocate a portion of a TXOP obtained by AP 1610 to STA 1611 and may indicate a TXS mode equal to 1. STA 1611 receiving MRTT frame 1620 may use the allocated time to transmit one or more non-TB PPDUs to AP 1610. The one or more non-TB PPDUs may comprise a data frame, a control frame, a management frame, or an action frame.

In an example, MRTT frame 1620 may comprise a triggered TXOP sharing mode subfield that indicates the TXS mode and/or subfield that indicates a first time period corresponding to the allocated time. In an example, the first time period may be set to a value of X microseconds (us).

STA 1611 may respond to MRTT frame 1620 by transmitting a CTS frame 1621 to AP 1610. Subsequently, STA 1611 may transmit non-TB PPDUs 1622, 1624 comprising one or more data frame to AP 1610 during the first time period indicated in MRTT frame 1620. In an example, AP 1610 may transmit one or more Block Ack (BA) frames 1623, 1625 in response to the one or more data frames contained in non-TB PPDUs 1622, 1624 received from STA 1611.

Figure 17:
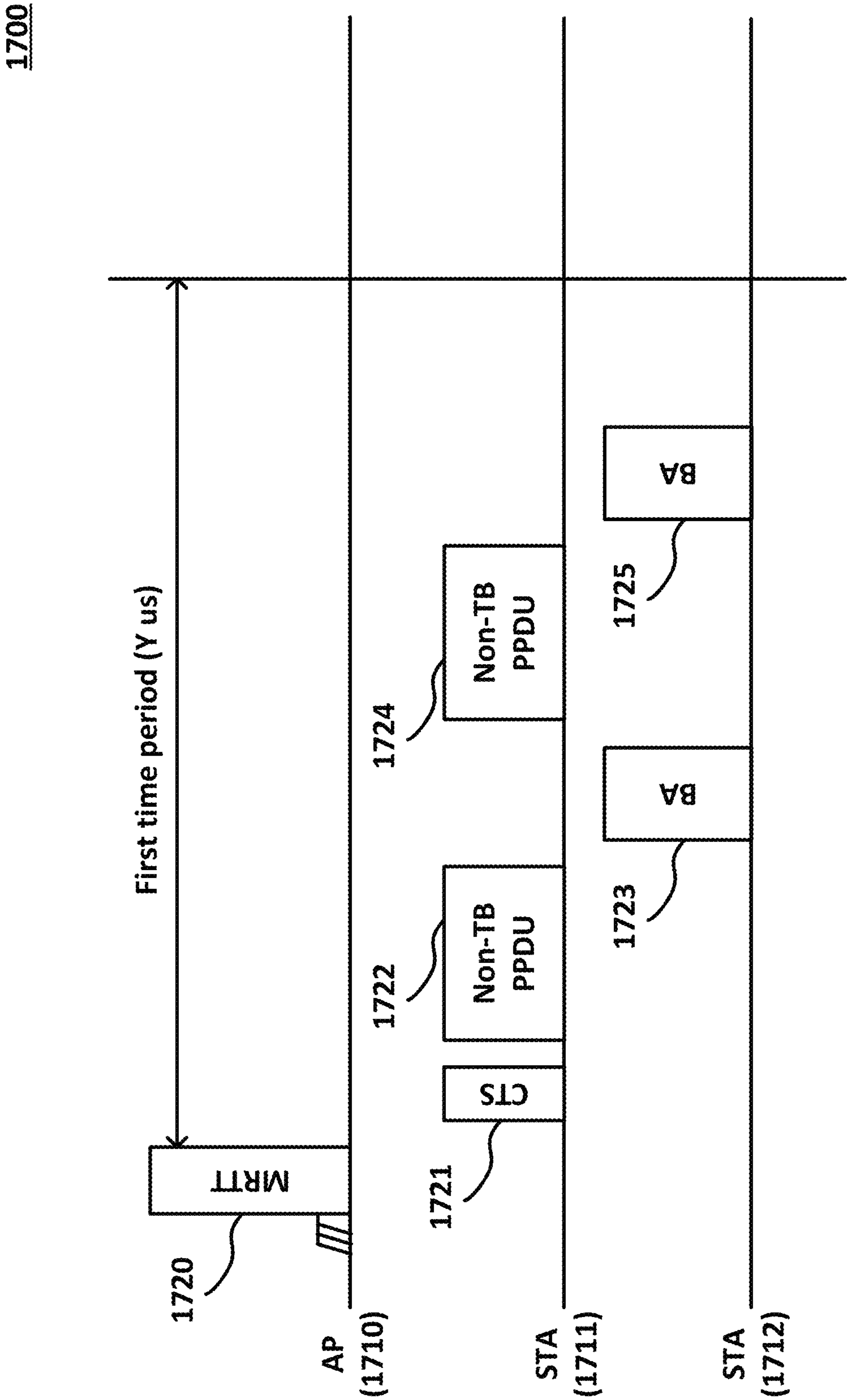
FIG. 17 illustrates an example of a TXS procedure (Mode=2).

FIG. 17 illustrates an example 1700 of a TXS procedure (Mode=2). As shown in FIG. 17, the TXS procedure may begin by an AP 1710 transmitting an MRTT frame 1720 to a STA 1711. MRTT frame 1720 may allocate a portion of a TXOP obtained by AP 1710 to STA 1711 and may indicate a TXS mode equal to 2. STA 1711 receiving MRTT frame 1720 may use the allocated time to transmit one or more non-TB PPDUs to STA 1712. The one or more non-TB PPDUs may comprise a data frame, a control frame, a management frame, or an action frame.

In an example, MRTT frame 1720 may comprise a triggered TXOP sharing mode subfield that indicates the TXS mode and/or subfield that indicates a first time period corresponding to the allocated time. In an example, the first time period may be set to a value of Y microseconds (us).

STA 1711 may respond to MRTT frame 1720 by transmitting a CTS frame 1721 to AP 1710. Subsequently, STA 1711 may transmit non-TB PPDUs 1722, 1724 comprising one or more data frame to STA 1712 during the first time period indicated in MRTT frame 1720. In an example, STA 1712 may transmit one or more BA frames 1723, 1725 in response to the one or more data frames contained in non-TB PPDUs 1722, 1724 received from STA 1711.

In CTDMA, one approach for TXOP sharing may be achieved via the TXS procedure described above. The TXS procedure may be used to allow a sharing AP, which obtains a TXOP and is the TXOP owner, to allocate a time duration within its obtained TXOP to a shared AP for downlink and/or uplink transmission between the shared AP and its associated STAs.

Figure 18:
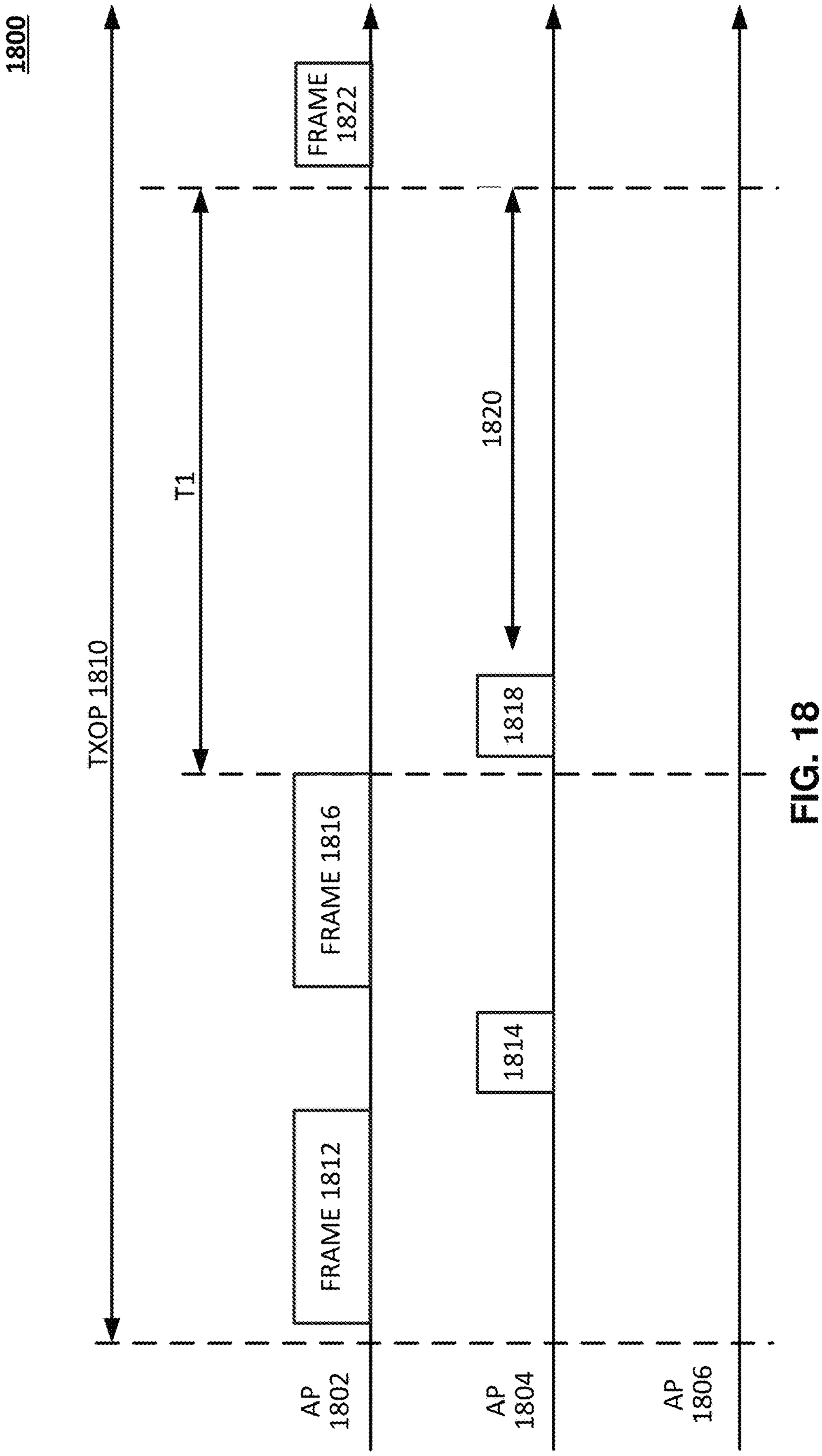
FIG. 18 illustrates an example of an existing CTDMA procedure.

FIG. 18 illustrates an example 1800 of an existing CTDMA procedure. As shown in FIG. 18, example 1800 may include APs 1802, 1804 and 1806, where each AP may serve one or more associated STAs. AP 1802, AP 1804 and AP 1806 may be members of a multi-AP group. AP 1802 may be a sharing/master AP of the multi-AP group. AP 1804 and AP 1806 may be shared/slave APs of the multi-AP group. In example 1800, it is assumed that APs 1802, 1804 and 1806 are within communication range of each other.

As shown in FIG. 18, the procedure may begin with AP 1802 transmitting a frame 1812 after obtaining a TXOP 1810. In an example, before transmitting frame 1812, AP 1802 may be configured to poll AP 1804 and AP 1806 to inquire about buffered traffic of AP 1804 and AP 1806 and the priorities of the buffered traffic (not shown in FIG. 18). In another example, AP 1802 may have information in advance regarding the buffered traffic of AP 1804 and AP 1806 and the priorities of the buffered traffic. AP 1802 may be configured to, when AP 1802 has advance information regarding buffered traffic of AP 1804 and AP 1806, not transmit a polling frame to receive updated information regarding the buffered traffic. Based on AP 1802 being configured not to transmit the polling frame, AP 1802 may not transmit a polling frame before transmitting frame 1812.

Based on the information about the buffered traffic of AP 1804 and AP 1806 and the priorities of the buffered traffic, AP 1802 may transmit frame 1812 comprising information regarding selected APs that are scheduled to communicate within TXOP 1810. In an example, the information regarding selected APs may indicate portions of TXOP 1810 allocated to respective APs of the shared APs.

In example 1800, AP 1802 may transmit frame 1812 comprising information regarding AP 1804 that is scheduled to communicate within TXOP 1810. In an example, frame 1812 may comprise a schedule announcement frame. In an example, the schedule announcement frame may comprise a trigger frame. In another example, the schedule announcement frame may comprise an MU-RTS trigger frame.

On receiving frame 1812, AP 1804 may determine its allocated duration in an upcoming TXOP allocation. In response to frame 1812, AP 1804 may transmit a frame 1814. In an example, frame 1814 may comprise a schedule announcement response frame. In another example, frame 1814 may comprise an acknowledgment frame. On receiving frame 1812, AP 1806 may determine that AP 1806 will not be allocated any duration in an upcoming TXOP allocation.

In an example, on receiving frame 1814, AP 1802 may transmit a frame 1816. In an example, frame 1816 may comprise an allocation for a shared AP. In an example, an allocation of frame 1816 may comprise an identifier of a shared AP and a duration (within the TXOP) allocated to the shared AP. In example 1800, frame 1816 may comprise an allocation for AP 1804. The allocation may comprise a first duration (denoted T1 in FIG. 18) of the TXOP allocated to AP 1804. In an example, frame 1816 may comprise an MRTT frame. In an example, the first duration may be indicated in an allocation duration subfield of a user info list field of the MRTT frame. In another example (not shown in FIG. 18), on receiving frame 1814, AP 1802 may communicate with one or more associated STAs before transmitting frame 1816.

On receiving frame 1816, AP 1804 may transmit a frame 1818 to AP 1802. In an example, frame 1818 may comprise a response frame. In an example, where frame 1816 is an MRTT frame, frame 1818 may be a CTS frame. After transmitting frame 1818, AP 1804 may communicate with one or more of its associated STAs during a time period 1820 of the first duration of the TXOP allocated to AP 1804. In an example, during time period 1820, AP 1804 may transmit to one or more of its associated STAs downlink frames and/or may trigger one or more of its associated STAs to transmit uplink frames to AP 1804.

In example 1800, AP 1804 may finish communicating with one or more associated STAs by the end of the first duration (T1) of the TXOP allocated to AP 1802.

In an example, being the TXOP holder, AP 1802 may regain the control of the TXOP a short inter-frame space (SIFS) after the end of the first duration. In another example, being the TXOP holder, AP 1802 may regain the control of the TXOP a point coordination function (PCF) IFS (PIFS) after the end of the first duration. As such, AP 1802 may transmit a frame 1822 a SIFS or a PIFS after the end of the first duration. In an example, frame 1822 may comprise a control frame, a management frame, a data frame or an action frame. After regaining control of the TXOP, in an example, AP 1802 may communicate with one or more associated STAs and/or re-share the TXOP with other shared APs.

Figure 19:
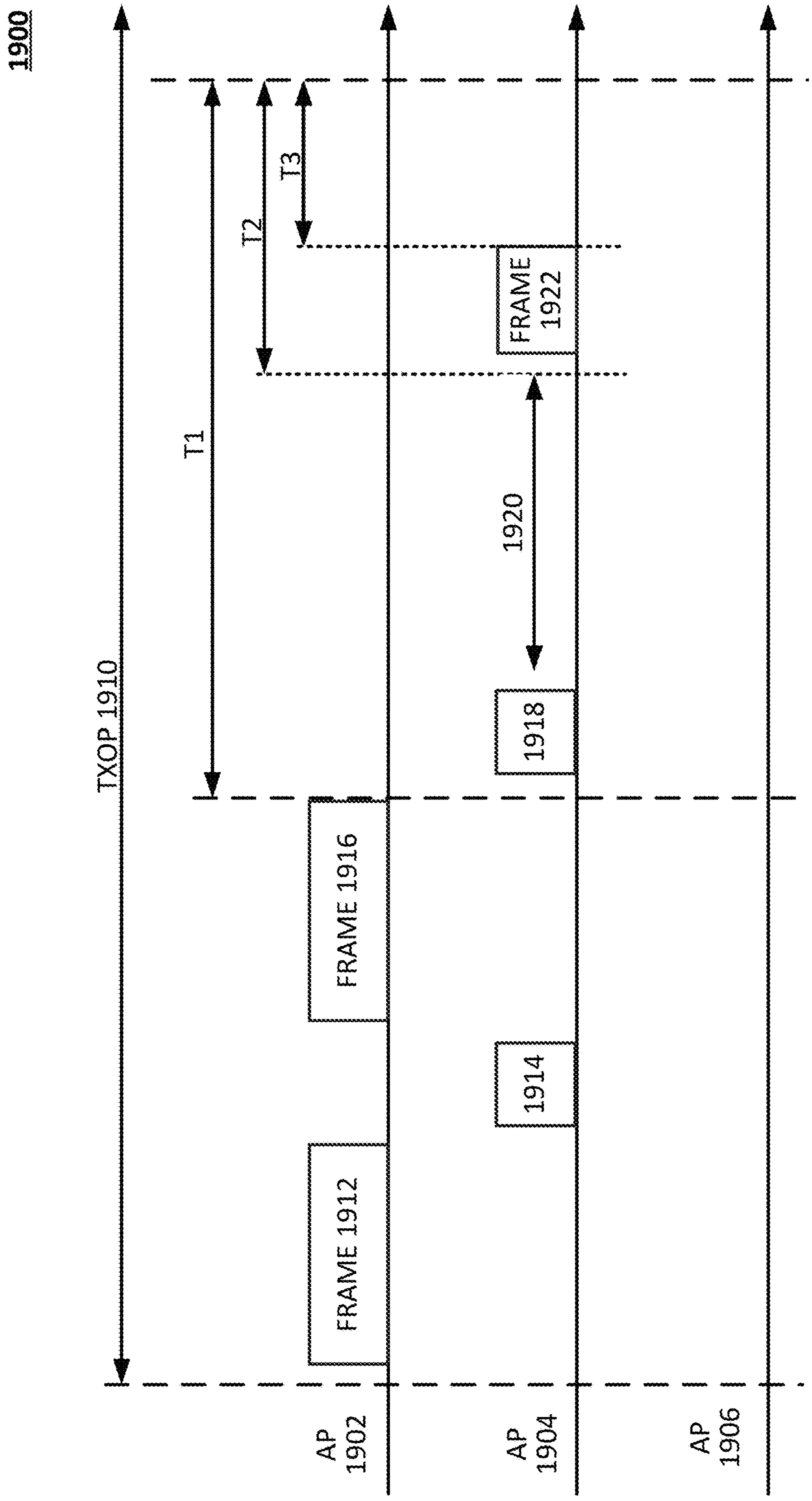
FIG. 19 illustrates an example that highlights a problem that may arise in association with an implementation of a CTDMA procedure.

FIG. 19 illustrates an example 1900 that highlights a problem that may arise in association with an implementation of a CTDMA procedure. As shown in FIG. 19, example 1900 may include APs 1902, 1904 and 1906, where each AP may serve one or more associated STAs. AP 1902, AP 1904 and AP 1906 may be members of a multi-AP group. AP 1902 may be a sharing/master AP of the multi-AP group. AP 1904 and AP 1906 may be shared/slave APs of the multi-AP group. In example 1900, it is assumed that APs 1902, 1904 and 1906 are within communication range of each other.

As shown in FIG. 19, the procedure may begin with AP 1902 transmitting a frame 1912 after obtaining a TXOP 1910. In an example, before transmitting frame 1912, AP 1902 may be configured to poll AP 1904 and AP 1906 to inquire about buffered traffic of AP 1904 and AP 1906 and the priorities of the buffered traffic (not shown in FIG. 19). In another example, AP 1902 may have information in advance regarding the buffered traffic of AP 1904 and AP 1906 and the priorities of the buffered traffic. AP 1902 may be configured to, when AP 1902 has advance information regarding buffered traffic of AP 1904 and AP 1906, not transmit a polling frame to receive updated information regarding the buffered traffic. Based on AP 1902 being configured not to transmit the polling frame, AP 1902 may not transmit a polling frame before transmitting frame 1912.

Based on the information about the buffered traffic of AP 1904 and AP 1906 and the priorities of the buffered traffic, AP 1902 may transmit frame 1912 comprising information regarding selected APs that are scheduled to communicate within TXOP 1910. In an example, the information regarding selected APs may indicate portions of TXOP 1910 allocated to respective APs of the shared APs.

In example 1900, AP 1902 may transmit frame 1912 comprising information regarding AP 1904 that is scheduled to communicate within TXOP 1910. In an example, frame 1912 may comprise a schedule announcement frame. In an example, the schedule announcement frame may comprise a trigger frame. In another example, the schedule announcement frame may comprise an MU-RTS trigger frame.

On receiving frame 1912, AP 1904 may determine its allocated duration in an upcoming TXOP allocation. In response to frame 1912, AP 1904 may transmit a frame 1914. In an example, frame 1914 may comprise a schedule announcement response frame. In another example, frame 1914 may comprise an acknowledgment frame. On receiving frame 1912, AP 1906 may determine that AP 1906 will not be allocated any duration in an upcoming TXOP allocation.

In an example, on receiving frame 1914, AP 1902 may transmit a frame 1916. In an example, frame 1916 may comprise an allocation for a shared AP. In an example, an allocation of frame 1916 may comprise an identifier of a shared AP and a duration (within the TXOP) allocated to the shared AP. In example 1900, frame 1916 may comprise an allocation for AP 1904. The allocation may comprise a first duration (denoted T1 in FIG. 19) of the TXOP allocated to AP 1904. In an example, frame 1916 may comprise an MRTT frame. In an example, the first duration may be indicated in an allocation duration subfield of a user info list field of the MRTT frame. In another example (not shown in FIG. 19), on receiving frame 1914, AP 1902 may communicate with one or more associated STAs before transmitting frame 1916.

On receiving frame 1916, AP 1904 may transmit a frame 1918 to AP 1902. In an example, frame 1918 may comprise a response frame. In an example, where frame 1916 is an MRTT frame, frame 1918 may be a CTS frame. After transmitting frame 1918, AP 1904 may communicate with one or more of its associated STAs during a time period 1920 of the first duration of the TXOP allocated to AP 1904. In an example, during time period 1920, AP 1904 may transmit to one or more of its associated STAs downlink frames and/or may trigger one or more of its associated STAs to transmit uplink frames to AP 1904.

In example 1900, AP 1904 may finish communicating with its one or more associated STAs before an end of the first duration (T1) of the TXOP allocated to AP 1904.

In an implementation, AP 1904 may be configured to return the TXOP to AP 1902, if a remaining time of the first duration of the TXOP (after AP 1904 finishes communicating with its one or more associated STAs) (e.g., second duration; denoted T2 in FIG. 19) is greater than a threshold. In an example, the threshold may comprise a duration of a physical layer (PHY) protocol data unit (PPDU) comprising a TXOP return frame. Accordingly, in example 1900, AP 1904 may transmit a frame 1922 after finishing communicating during time period 1920, based on the second duration (T2) being greater than the duration of a PPDU comprising a TXOP return frame. In an example, frame 1922 may comprise a TXOP return frame. In an example, the TXOP return frame may be addressed to AP 1902.

After receiving frame 1922, AP 1902 may or may not regain control of the TXOP. In an example, AP 1902 may have completed communications with its associated STAs and as such does not regain control of the TXOP. In another example, AP 1902 may be configured, after sharing the TXOP with a shared AP, to relinquish control of the TXOP. Therefore, A P 1902 may not use a remaining duration (of the second duration after receiving frame 1922 (e.g., third duration; denoted T3 in FIG. 19). On the other hand, on receiving frame 1922, AP 1906 may determine that frame 1922 is addressed to AP 1902 and as such AP 1906 does not contend for the channel despite having buffered data for transmission. Instead, A P 1906 may wait until the end of the first duration (T1) to invoke a backoff procedure in order to gain control of the TXOP. As such, none of APs 1902, 1904, and 1906 use the third duration (T3) for communication. Further, buffered traffic at certain APs (e.g., AP 1906) may be unnecessarily delayed and, in the event that the third duration is longer than a certain threshold, may result in the buffered traffic being discarded.

Embodiments of the present disclosure, as further described below, address the above-described problem. Accordingly, a first AP may receive from a second AP, during a TXOP obtained by the second AP, one or more first frames comprising a first indication of a portion, of the TXOP, allocated to the first AP, and a second indication of whether the first AP is to return the allocated portion of the TXOP when the first AP finishes communicating before an end of the allocated portion of the TXOP. In one aspect, based on the second indication indicating that the first AP is to return the allocated portion of the TXOP when the first AP finishes communicating before the end of the allocated portion of the TXOP and the first AP finishing communicating before the end of the allocated portion of the TXOP, the first AP may transmit to the second AP a second frame comprising a TXOP return frame. As such, the sharing AP may regain control of the TXOP before the end of the allocated portion of the TXOP and may use the remaining duration of the TXOP to communicate with its associated STAs and/or to re-share the TXOP with other shared APs. In another aspect, based on the second indication indicating that the first AP is not to return the allocated portion of the TXOP when the first AP finishes communicating before the end of the allocated portion of the TXOP and the first AP finishing communicating before the end of the allocated portion of the TXOP, the first AP may transmit a third frame comprising a TXOP truncation frame. As such, another shared AP may gain control of the TXOP before the end of the allocated portion of the TXOP.

Figure 20:
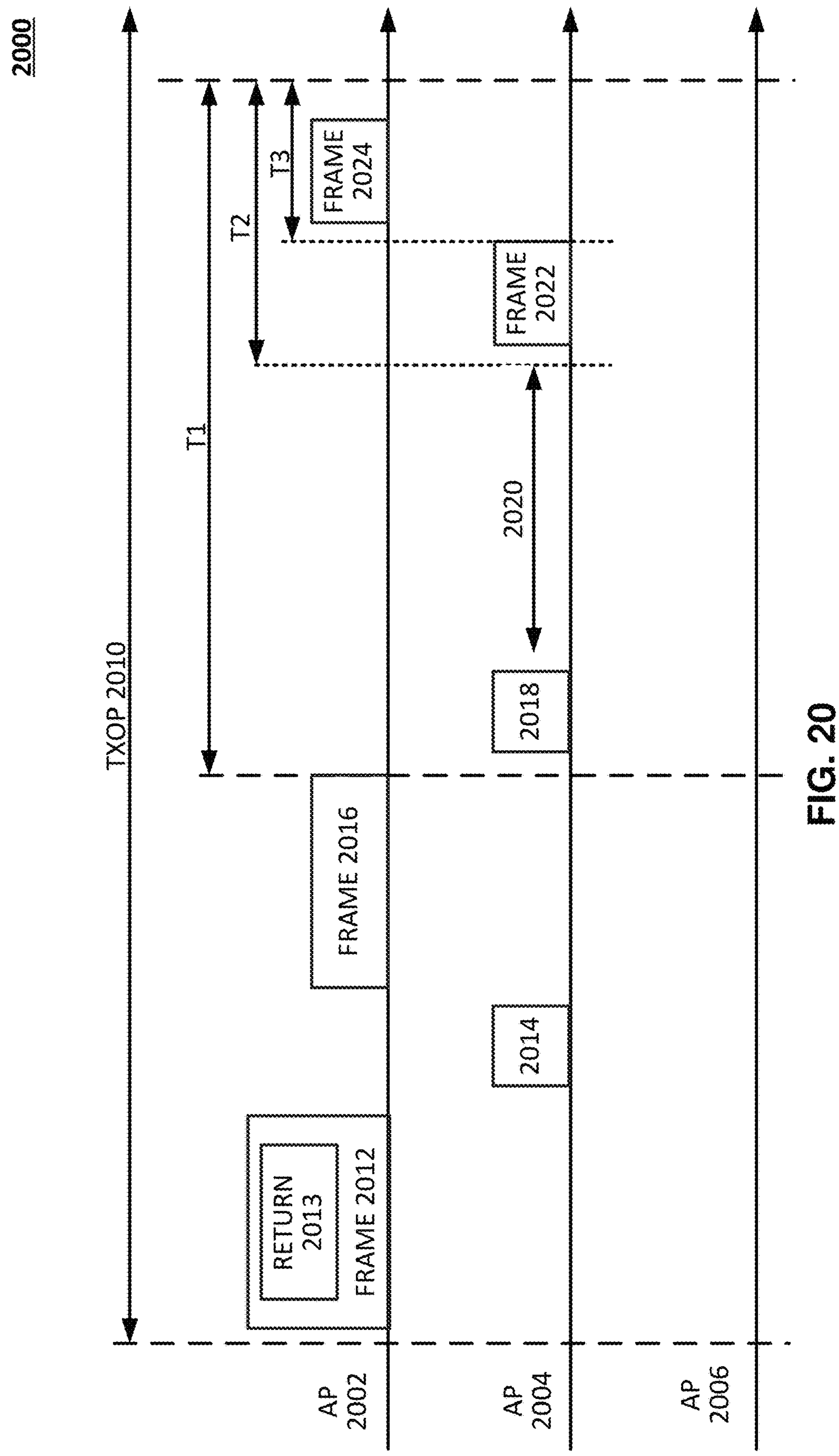
FIG. 20 illustrates an example of a procedure according to an embodiment.

FIG. 20 illustrates an example 2000 of a procedure according to an embodiment. As shown in FIG. 20, example 2000 may include APs 2002, 2004 and 2006, where each AP may serve one or more associated STAs. AP 2002, AP 2004 and AP 2006 may be members of a multi-AP group. AP 2002 may be a sharing/master AP of the multi-AP group. AP 2004 and AP 2006 may be shared/slave APs of the multi-AP group. In example 2000, it is assumed that APs 2002, 2004 and 2006 are within communication range of each other.

AP 2002 may be configured to regain control of the TXOP after an end of the TXOP portion allocation to a shared AP. In an implementation, AP 2002 may be configured to regain control of the TXOP based on having buffered data to communicate to one or more associated STAs; and to not regain control based on not having data to communicate to one or more associated STAs. In another implementation, AP 2002 may be configured to regain control of the TXOP in order to re-share the TXOP with another shared AP or may be configured to relinquish control of the TXOP after sharing it a first time with a shared AP.

As shown in FIG. 20, the procedure may begin with AP 2002 transmitting a frame 2012 after obtaining a TXOP 2010. In an example, before transmitting frame 2012, AP 2002 may be configured to poll AP 2004 and AP 2006 (e.g., to inquire about buffered traffic of AP 2004 and AP 2006 and the priorities of the buffered traffic) (not shown in FIG. 20). For example, AP 2002 may transmit a Co-TDMA trigger based (TB) initial control frame (ICF) (e.g., a BSRP trigger frame). In an example, a Co-TDMA TB ICF polls APs (e.g., AP 2004 and/or AP 2006) as part of the Co-TDMA procedure and solicits a response from a polled AP in a TB PPDU. As another example, AP 2002 may transmit a Co-TDMA non-trigger based (NTB) ICF (e.g., a BSRP NTB trigger frame). In an example, a Co-TDMA NTB ICF, as part of the Co-TDMA procedure, solicits a response from a polled AP in a non-HT PPDU or a non-HT duplicate PPDU. As noted, in one example AP 2002 may transmit a frame to poll AP 2004 and/or AP 2006 (e.g., a Co-TDMA TB ICF or Co-TDMA NTB ICF) before transmitting frame 2012. In another example, frame 2012 may poll AP 2004 and/or AP 2006 (e.g., frame 2012 may comprise a Co-TDMA TB ICF or Co-TDMA NTB ICF).

In an embodiment, AP 2004 may respond to the poll (e.g., the Co-TDMA TB ICF or Co-TDMA NTB ICF) by identifying whether TXOP sharing is solicited (e.g., in addition to, or instead of, identifying buffered traffic). For example, AP 2004 may transmit a frame (not shown in FIG. 20) with a field indicating whether TXOP sharing is solicited. In this example, a polled AP (e.g., AP 2004) may set this field to 1 if the polled AP (e.g., AP 2004) intends to receive a time allocation from the Co-TDMA sharing AP (e.g., AP 2002) during the current TXOP (e.g., TXOP 2010). As one example, the polled AP (e.g., AP 2004) may set this field to 1 if the polled AP (e.g., AP 2004) intends to receive a time allocation to exchange frames of the same or higher priority ACs compared to an AC indicated in the poll (e.g., from AP 2002). Otherwise, the polled AP (e.g., AP 2004) may set this field to 0.

In another example, AP 2002 may have information in advance regarding the buffered traffic of AP 2004 and AP 2006 and the priorities of the buffered traffic. AP 2002 may be configured to, when AP 2002 has advance information regarding buffered traffic of AP 2004 and AP 2006, not transmit a polling frame to receive updated information regarding the buffered traffic. Based on AP 2002 being configured not to transmit the polling frame, AP 2002 may not transmit a polling frame before transmitting frame 2012.

Based on the information about the buffered traffic of AP 2004 and AP 2006 and the priorities of the buffered traffic, AP 2002 may transmit frame 2012 comprising information regarding selected APs that are scheduled to communicate within TXOP 2010. In an example, the information regarding selected APs may indicate portions of TXOP 2010 allocated to respective APs of the shared APs.

In an embodiment, frame 2012 may further comprise an indication (labeled return 2013 in FIG. 20) of whether a shared AP (e.g., AP 2004 and/or AP 2006) is to return an allocated portion of the TXOP when the shared AP finishes communicating before an end of the allocated portion of the TXOP. For example, the indication (labeled return 2013 in FIG. 20) may indicate whether the Co-TDMA sharing AP (e.g., AP 2002) is soliciting a TXOP return from a Co-TDMA coordinated AP (e.g., AP 2004 and/or AP 2006). This indication may be set to 1 if the Co-TDMA sharing AP (e.g., AP 2002) is soliciting a TXOP return from a Co-TDMA coordinated AP (e.g., AP 2004 and/or AP 2006). Otherwise, this indication may be set to 0. In an embodiment, a Co-TDMA sharing AP (e.g., AP 2002) that has indicated support for TXOP return and that is soliciting a TXOP return from a Co-TDMA coordinated AP (e.g., AP 2004 and/or AP 2006) may set this indication to 1. Otherwise, the Co-TDMA sharing AP (e.g., AP 2002) may set this indication to 0. In an embodiment, a Co-TDMA coordinated AP (e.g., AP 2004 and/or AP 2006) may return (or returns) the TXOP after receiving this indication, set to 1 (e.g., if the Co-TDMA coordinated AP does not require a remaining time of the allocated portion of the TXOP).

In an embodiment, the indication may be in a separate frame (not shown in FIG. 20). In an embodiment, the indication may be transmitted before frame 2012 (not shown in FIG. 20). For example, as discussed above, AP 2002 may transmit a frame (e.g., a Co-TDMA TB ICF or a Co-TDMA NTB ICF), before frame 2012, to poll one or more of AP 2004 and AP 2006 (e.g., about buffered traffic). The indication may be included in this frame, transmitted by AP 2002 before frame 2012 to poll one or more of AP 2004 and AP 2006. In an embodiment, AP 2002 may transmit the indication before obtaining TXOP 2010 (not shown in FIG. 20). In an embodiment, AP 2002 may indicate support of TXOP return in a frame that AP 2002 transmits. In an embodiment, AP 2002 may inform AP 2004 and/or AP 2006 whether AP 2002 supports TXOP return by transmitting a frame comprising a capabilities element, where the capabilities element comprises a TXOP return support subfield. The TXOP return support subfield may be provided in a MAC capabilities information field. In an embodiment, the capabilities element may be an ultra-high reliability (UHR) capabilities element. For example, AP 2002 may set the TXOP return support subfield to one to receive a frame from AP 2004 and/or AP 2006 during an allocated portion of the TXOP to AP 2004 and/or AP 2006. In another embodiment, AP 2002 may inform AP 2004 and/or AP 2006 whether AP 2002 supports TXOP return by transmitting the indication. For example, the indication may indicate support of TXOP return by AP 2002 and enablement/disablement of TXOP return by AP 2002.

In example 2000, frame 2012 may comprise information regarding AP 2004 being scheduled to communicate within TXOP 2010 and may further comprise an indication (labeled return 2013 in FIG. 20) of whether AP 2004 is to return the allocated portion of the TXOP when AP 2004 finishes communicating before the end of the allocated portion of the TXOP. In an example, frame 2012 may comprise a schedule announcement frame. In an example, the schedule announcement frame may comprise a trigger frame. In another example, the schedule announcement frame may comprise an MU-RTS trigger frame. In another example, as noted above, frame 2012 may poll AP 2004 and/or AP 2006 (e.g., frame 2012 may comprise a Co-TDMA TB ICF or Co-TDMA NTB ICF). Further, frame 2012 may initiate the TXOP sharing procedure.

On receiving frame 2012, AP 2004 may determine its allocated duration in an upcoming TXOP allocation and may further determine whether AP 2004 is to return the allocated portion of the TXOP when AP 2004 finishes communicating before an end of the allocated portion of the TXOP. In example 2000, an indication (labeled return 2013 in FIG. 20) may indicate that AP 2004 is to return the allocated portion of the TXOP when AP 2004 finishes communicating before the end of the allocated portion of the TXOP. In response to frame 2012, AP 2004 may transmit a frame 2014. In an example, frame 2014 may comprise a schedule announcement response frame. In another example, frame 2014 may comprise an acknowledgment frame. On receiving frame 2012, AP 2006 may determine that AP 2006 will not be allocated any duration in an upcoming TXOP allocation.

In an example, on receiving frame 2014, AP 2002 may transmit a frame 2016. In an example, frame 2016 may comprise a TXOP allocation frame. In an example, frame 2016 may comprise an allocation for a shared AP. In an example, an allocation of frame 2016 may comprise an identifier of a shared AP and a duration (within the TXOP) allocated to the shared AP. In example 2000, frame 2016 may comprise an indication of a portion, of the TXOP, allocated to AP 2004. The allocation may comprise a first duration (denoted T1 in FIG. 20) of the TXOP allocated to AP 2004. In an example, frame 2016 may comprise an MRTT frame. In an example, the first duration may be indicated in an allocation duration subfield of a user info list field of the MRTT frame. In another example (not shown in FIG. 20), on receiving frame 2014, AP 2002 may communicate with one or more associated STAs before transmitting frame 2016.

On receiving frame 2016, AP 2004 determine that AP 2004 is allocated a first duration of the TXOP and may transmit a frame 2018 to AP 2002. In an example, frame 2018 may comprise a response frame. In an example, where frame 2016 is an MRTT frame, frame 2018 may be a CTS frame. After transmitting frame 2018, AP 2004 may communicate with one or more of its associated STAs during a time period 2020 of the first duration of the TXOP allocated to AP 2004. In an example, during time period 2020, AP 2004 may transmit to one or more of its associated STAs downlink frames and/or may trigger one or more of its associated STAs to transmit uplink frames to AP 2004.

In example 2000, AP 2004 may finish communicating before an end of the first duration (T1) of the TXOP allocated to AP 2004. In an embodiment, based on an indication (labeled return 2013 in FIG. 20) indicating that AP 2004 is to return the allocated portion of the TXOP when AP 2004 finishes communicating before the end of the allocated portion of the TXOP, and AP 2004 finishing communicating before the end of the allocated portion of the TXOP, AP 2004 may transmit to AP 2002 a frame 2022. In an example, the transmitting of frame 2022 may be further based on a remaining time (e.g., second duration, T2) of the allocated portion of the TXOP being greater than a threshold. In embodiment, the threshold may comprise a duration of a physical layer (PHY) protocol data unit (PPDU) comprising frame 2022. In an embodiment, frame 2022 may comprise a TXOP return frame. In an embodiment, the TXOP return frame may comprise one or more of, a management frame, an action frame, a multi-user request-to-send triggered TXOP sharing (MU-RTS TXS) trigger (MRTT) frame, a quality of service (QoS) null/data frame or a contention free-end (CF-end) frame. In an embodiment, where the TXOP return frame is a QoS null/data frame, the QoS null/data frame may comprise a command and status (CAS) control field with a reverse direction grant (RDG)/more physical layer (PHY) protocol data unit (PPDU) subfield equal to a zero value. In another embodiment, where the TXOP return frame is a CF-end frame, the CF-end frame may comprise a transmitter address (TA) indicating AP 2004 and a receiver address (RA) indicating AP 2002. As one example, the TXOP return frame may be a multi-AP coordination (MAPC) TXOP return frame. In an example, a MAPC TXOP return frame is transmitted by a Co-TDMA coordinated AP to return the TXOP back to the Co-TDMA sharing AP. As one example, the MAPC TXOP return frame includes an action field in the frame body, where the action field may include a category field (e.g., one octet) and a public action field (e.g., one octet).

On receiving frame 2022, AP 2006 may determine that AP 2004 has returned the TXOP to AP 2002 before the end of the allocated portion of the TXOP and does not try to gain control of the TXOP. On receiving frame 2022, AP 2002 may determine that AP 2004 has returned the TXOP to AP 2002 before the end of the allocated portion of the TXOP. Based on its configuration, AP 2002 may or may not regain control of the TXOP. If configured to regain control of the TXOP, AP 2002 may transmit a frame 2024 a SIFS or a PIFS after receiving frame 2022. In an example, frame 2024 may comprise a control frame, a management frame, a data frame or an action frame. In an example, frame 2024 may comprise an acknowledgment frame in response to frame 2022. After regaining control of the TXOP within the third duration (T3), in an example, AP 2002 may communicate with one or more associated STAs and/or re-share the TXOP with other shared APs.

Figure 21:
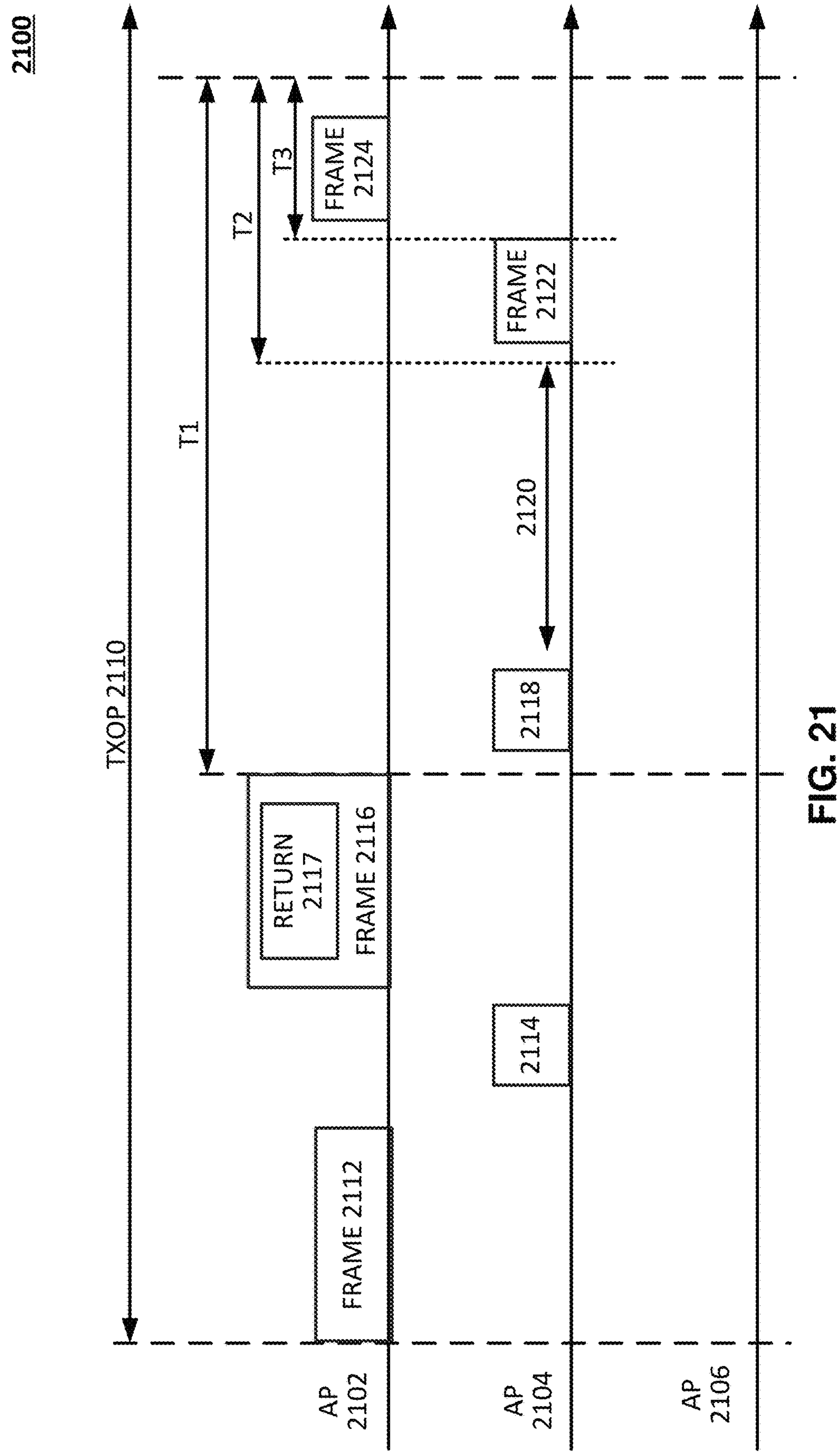
FIG. 21 illustrates another example of a procedure according to an embodiment.

FIG. 21 illustrates another example 2100 of a procedure according to an embodiment. As shown in FIG. 21, example 2100 may include APs 2102, 2104 and 2106, where each AP may serve one or more associated STAs. AP 2102, AP 2104 and AP 2106 may be members of a multi-AP group. AP 2102 may be a sharing/master AP of the multi-AP group. AP 2104 and AP 2106 may be shared/slave APs of the multi-AP group. In example 2100, it is assumed that APs 2102, 2104 and 2106 are within communication range of each other.

AP 2102 may be configured to regain control of the TXOP after an end of the TXOP portion allocation to a shared AP. In an implementation, AP 2102 may be configured to regain control of the TXOP based on having buffered data to communicate to one or more associated STAs; and to not regain control based on not having data to communicate to one or more associated STAs. In another implementation, AP 2102 may be configured to regain control of the TXOP in order to re-share the TXOP with another shared AP or may be configured to relinquish control of the TXOP after sharing it a first time with a shared AP.

As shown in FIG. 21, the procedure may begin with AP 2102 transmitting a frame 2112 after obtaining a TXOP 2110. In an example, before transmitting frame 2112, AP 2102 may be configured to poll AP 2104 and AP 2106 (e.g., to inquire about buffered traffic of AP 2104 and AP 2106 and the priorities of the buffered traffic) (not shown in FIG. 21). For example, like AP 2002 discussed above for example 2000 illustrated in FIG. 20, AP 2102 may transmit a Co-TDMA TB ICF (e.g., a BSRP trigger frame) or a Co-TDMA NTB ICF (e.g., a BSRP NTB trigger frame). As noted, in one example AP 2102 may transmit a frame to poll AP 2104 and/or AP 2106 (e.g., a Co-TDMA TB ICF or Co-TDMA NTB ICF) before transmitting frame 2112. In another example, frame 2112 may poll AP 2104 and/or AP 2106 (e.g., frame 2112 may comprise a Co-TDMA TB ICF or Co-TDMA NTB ICF). In an embodiment, like AP 2004 discussed above for example 2000 illustrated in FIG. 20, AP 2104 may respond to the poll (e.g., the Co-TDMA TB ICF or Co-TDMA NTB ICF) by identifying whether TXOP sharing is solicited (e.g., in addition to, or instead of, identifying buffered traffic).

In another example, AP 2102 may have information in advance regarding the buffered traffic of AP 2104 and AP 2106 and the priorities of the buffered traffic. AP 2102 may be configured to, when AP 2102 has advance information regarding buffered traffic of AP 2104 and AP 2106, not transmit a polling frame to receive updated information regarding the buffered traffic. Based on AP 2102 being configured not to transmit the polling frame, AP 2102 may not transmit a polling frame before transmitting frame 2112.

Based on the information about the buffered traffic of AP 2104 and AP 2106 and the priorities of the buffered traffic, AP 2102 may transmit frame 2112 comprising information regarding selected APs that are scheduled to communicate within TXOP 2110. In an example, the information regarding selected APs may indicate portions of TXOP 2110 allocated to respective APs of the shared APs.

In example 2100, frame 2112 may comprise information regarding AP 2104 being scheduled to communicate within TXOP 2110. In an example, frame 2112 may comprise a schedule announcement frame. In an example, the schedule announcement frame may comprise a trigger frame. In another example, the schedule announcement frame may comprise an MU-RTS trigger frame. In another example, as noted above, frame 2112 may poll AP 2104 and/or AP 2106 (e.g., frame 2112 may comprise a Co-TDMA TB ICF or Co-TDMA NTB ICF). Further, frame 2112 may initiate the TXOP sharing procedure.

On receiving frame 2112, AP 2104 may determine its allocated duration in an upcoming TXOP allocation. In response to frame 2112, AP 2104 may transmit a frame 2114. In an example, frame 2114 may comprise a schedule announcement response frame. In another example, frame 2114 may comprise an acknowledgment frame. On receiving frame 2112, AP 2106 may determine that AP 2106 will not be allocated any duration in an upcoming TXOP allocation.

In an example, on receiving frame 2114, AP 2102 may transmit a frame 2116. In an example, frame 2116 may comprise a TXOP allocation frame. In an example, frame 2116 may comprise an allocation for a shared AP. In an example, an allocation of frame 2116 may comprise an identifier of a shared AP and a duration (within the TXOP) allocated to the shared AP. In example 2100, frame 2116 may comprise an indication of a portion, of the TXOP, allocated to AP 2104. The allocation may comprise a first duration (denoted T1 in FIG. 21) of the TXOP allocated to AP 2104. In an example, frame 2116 may comprise an MRTT frame. In an example, the first duration may be indicated in an allocation duration subfield of a user info list field of the MRTT frame. In another example (not shown in FIG. 21), on receiving frame 2114, AP 2102 may communicate with one or more associated STAs before transmitting frame 2116.

In an embodiment, frame 2116 may further comprise an indication (labeled return 2117 in FIG. 21) of whether a shared AP (e.g., AP 2104 and/or AP 2106) is to return an allocated portion of the TXOP when the shared AP finishes communicating before an end of the allocated portion of the TXOP. In an embodiment, the indication may be provided in a common info field of the MRTT frame.

In an embodiment, the indication may be in a separate frame (not shown in FIG. 21). In an embodiment, the indication may be transmitted before frame 2112 or frame 2116 (not shown in FIG. 21). In an embodiment, AP 2102 may transmit the indication before obtaining TXOP 2110 (not shown in FIG. 21). In an embodiment, AP 2102 may indicate support of TXOP return in a frame that AP 2102 transmits. In an embodiment, AP 2102 may inform AP 2104 and/or AP 2106 whether AP 2102 supports TXOP return by transmitting a frame comprising a capabilities element, where the capabilities element comprises a TXOP return support subfield. The TXOP return support subfield may be provided in a MAC capabilities information field. In an embodiment, the capabilities element may be an ultra-high reliability (UHR) capabilities element. For example, AP 2102 may set the TXOP return support subfield to one to receive a frame from AP 2104 and/or AP 2106 during an allocated portion of the TXOP to AP 2104 and/or AP 2106. In another embodiment, AP 2102 may inform AP 2104 and/or AP 2106 whether AP 2102 supports TXOP return by transmitting the indication. For example, the indication may indicate support of TXOP return by AP 2102 and enablement/disablement of TXOP return by AP 2102.

On receiving frame 2116, AP 2104 may determine that AP 2104 is allocated a first duration of the TXOP. AP 2104 may further determine whether AP 2104 is to return the allocated portion of the TXOP when AP 2104 finishes communicating before an end of the allocated portion of the TXOP. In example 2100, an indication (labeled return 2117 in FIG. 21) may indicate that AP 2104 is to return the allocated portion of the TXOP when AP 2104 finishes communicating before the end of the allocated portion of the TXOP. In response to frame 2116, AP 2104 may transmit a frame 2118 to AP 2102. In an example, frame 2118 may comprise a response frame. In an example, where frame 2116 is an MRTT frame, frame 2118 may be a CTS frame. After transmitting frame 2118, AP 2104 may communicate with one or more of its associated STAs during a time period 2120 of the first duration of the TXOP allocated to AP 2104. In an example, during time period 2120, AP 2104 may transmit to one or more of its associated STAs downlink frames and/or may trigger one or more of its associated STAs to transmit uplink frames to AP 2104.

In example 2100, AP 2104 may finish communicating before an end of the first duration (T1) of the TXOP allocated to AP 2104. In an embodiment, based on an indication (labeled return 2117 in FIG. 21) indicating that AP 2104 is to return the allocated portion of the TXOP when AP 2104 finishes communicating before the end of the allocated portion of the TXOP, and AP 2104 finishing communicating before the end of the allocated portion of the TXOP, AP 2104 may transmit to AP 2102 a frame 2122. In an example, the transmitting of frame 2122 may be further based on a remaining time (e.g., second duration, T2) of the allocated portion of the TXOP being greater than a threshold. In embodiment, the threshold may comprise a duration of a physical layer (PHY) protocol data unit (PPDU) comprising frame 2122. In an embodiment, frame 2122 may comprise a TXOP return frame. In an embodiment, the TXOP return frame may comprise one or more of, a management frame, an action frame, a multi-user request-to-send triggered TXOP sharing (MU-RTS TXS) trigger (MRTT) frame, a quality of service (QoS) null/data frame or a contention free-end (CF-end) frame. In an embodiment, where the TXOP return frame is a QoS null/data frame, the QoS null/data frame may comprise a command and status (CAS) control field with a reverse direction grant (RDG)/more physical layer (PHY) protocol data unit (PPDU) subfield equal to a zero value. In another embodiment, where the TXOP return frame is a CF-end frame, the CF-end frame may comprise a transmitter address (TA) indicating AP 2104 and a receiver address (RA) indicating AP 2102. As one example, the TXOP return frame may be a MAPC TXOP return frame, as discussed above for example 2000 illustrated in FIG. 20.

On receiving frame 2122, AP 2106 may determine that AP 2104 has returned the TXOP to AP 2102 before the end of the allocated portion of the TXOP and does not try to gain control of the TXOP. On receiving frame 2122, AP 2102 may determine that AP 2104 has returned the TXOP to AP 2102 before the end of the allocated portion of the TXOP. Based on its configuration, AP 2102 may or may not regain control of the TXOP. If configured to regain control of the TXOP, AP 2102 may transmit a frame 2124 a SIFS or a PIFS after receiving frame 2122. In an example, frame 2124 may comprise a control frame, a management frame, a data frame or an action frame. In an example, frame 2124 may comprise an acknowledgment frame in response to frame 2122. After regaining control of the TXOP within the third duration (T3), in an example, AP 2102 may communicate with one or more associated STAs and/or re-share the TXOP with other shared APs.

Figure 22:
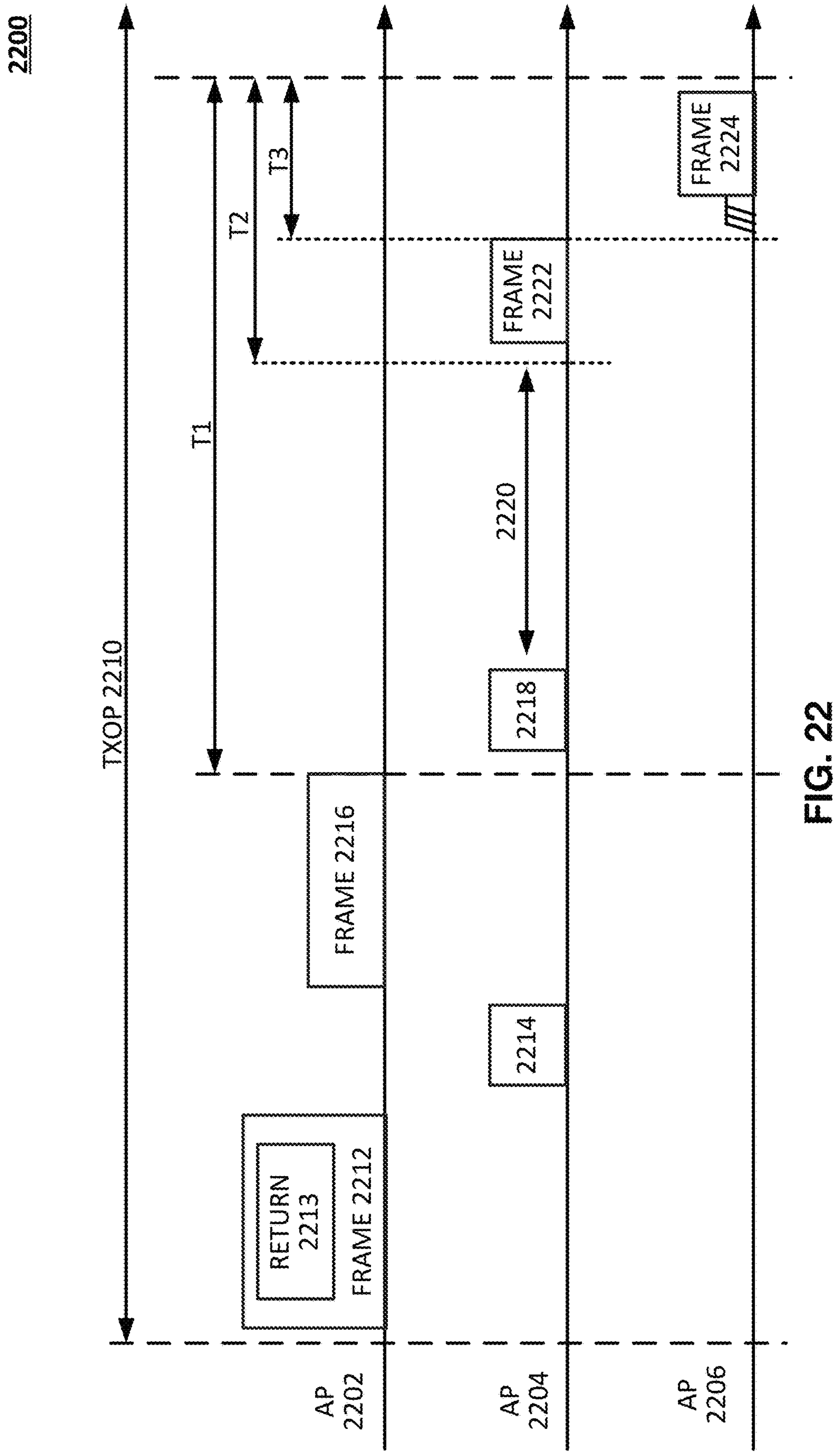
FIG. 22 illustrates another example of a procedure according to an embodiment.

FIG. 22 illustrates another example 2200 of a procedure according to an embodiment. As shown in FIG. 22, example 2200 may include APs 2202, 2204 and 2206, where each AP may serve one or more associated STAs. AP 2202, AP 2204 and AP 2206 may be members of a multi-AP group. AP 2202 may be a sharing/master AP of the multi-AP group. AP 2204 and AP 2206 may be shared/slave APs of the multi-AP group. In example 2200, it is assumed that APs 2202, 2204 and 2206 are within communication range of each other.

AP 2202 may be configured to regain control of the TXOP after an end of the TXOP portion allocation to a shared AP. In an implementation, AP 2202 may be configured to regain control of the TXOP based on having buffered data to communicate to one or more associated STAs; and to not regain control based on not having data to communicate to one or more associated STAs. In another implementation, AP 2202 may be configured to regain control of the TXOP in order to re-share the TXOP with another shared AP or may be configured to relinquish control of the TXOP after sharing it a first time with a shared AP.

As shown in FIG. 22, the procedure may begin with AP 2202 transmitting a frame 2212 after obtaining a TXOP 2210. In an example, before transmitting frame 2212, AP 2202 may be configured to poll AP 2204 and AP 2206 (e.g., to inquire about buffered traffic of AP 2204 and AP 2206 and the priorities of the buffered traffic) (not shown in FIG. 22). For example, like AP 2002 discussed above for example 2000 illustrated in FIG. 20, AP 2202 may transmit a Co-TDMA TB ICF (e.g., a BSRP trigger frame) or a Co-TDMA NTB ICF (e.g., a BSRP NTB trigger frame). As noted, in one example AP 2202 may transmit a frame to poll AP 2204 and/or AP 2206 (e.g., a Co-TDMA TB ICF or Co-TDMA NTB ICF) before transmitting frame 2212. In another example, frame 2212 may poll AP 2204 and/or AP 2206 (e.g., frame 2212 may comprise a Co-TDMA TB ICF or Co-TDMA NTB ICF). In an embodiment, like AP 2004 discussed above for example 2000 illustrated in FIG. 20, AP 2204 may respond to the poll (e.g., the Co-TDMA TB ICF or Co-TDMA NTB ICF) by identifying whether TXOP sharing is solicited (e.g., in addition to, or instead of, identifying buffered traffic).

In another example, AP 2202 may have information in advance regarding the buffered traffic of AP 2204 and AP 2206 and the priorities of the buffered traffic. AP 2202 may be configured to, when AP 2202 has advance information regarding buffered traffic of AP 2204 and AP 2206, not transmit a polling frame to receive updated information regarding the buffered traffic. Based on AP 2202 being configured not to transmit the polling frame, AP 2202 may not transmit a polling frame before transmitting frame 2212.

Based on the information about the buffered traffic of AP 2204 and AP 2206 and the priorities of the buffered traffic, AP 2202 may transmit frame 2212 comprising information regarding selected APs that are scheduled to communicate within TXOP 2210. In an example, the information regarding selected APs may indicate portions of TXOP 2210 allocated to respective APs of the shared APs.

In an embodiment, frame 2212 may further comprise an indication (labeled return 2213 in FIG. 22) of whether a shared AP (e.g., AP 2204 and/or AP 2206) is to return an allocated portion of the TXOP when the shared AP finishes communicating before an end of the allocated portion of the TXOP. For example, the indication (labeled return 2213 in FIG. 22) may indicate whether the Co-TDMA sharing AP (e.g., AP 2202) is soliciting a TXOP return from a Co-TDMA coordinated AP (e.g., AP 2204 and/or AP 2206). This indication may be set to 1 if the Co-TDMA sharing AP (e.g., AP 2202) is soliciting a TXOP return from a Co-TDMA coordinated AP (e.g., AP 2204 and/or AP 2206). Otherwise, this indication may be set to 0. In an embodiment, a Co-TDMA sharing AP (e.g., AP 2202) that has indicated support for TXOP return and that is soliciting a TXOP return from a Co-TDMA coordinated AP (e.g., AP 2204 and/or AP 2206) may set this indication to 1. Otherwise, the Co-TDMA sharing AP (e.g., AP 2202) may set this indication to 0. In an embodiment, a Co-TDMA coordinated AP (e.g., AP 2204 and/or AP 2206) may return (or returns) the TXOP after receiving this indication, set to 1 (e.g., if the Co-TDMA coordinated AP does not require a remaining time of the allocated portion of the TXOP).

In an embodiment, the indication may be in a separate frame (not shown in FIG. 22). In an embodiment, the indication may be transmitted before frame 2212 (not shown in FIG. 22). For example, as discussed above, AP 2202 may transmit a frame (e.g., a Co-TDMA TB ICF or a Co-TDMA NTB ICF), before frame 2212, to poll one or more of AP 2204 and AP 2206 (e.g., about buffered traffic). The indication may be included in this frame, transmitted by AP 2202 before frame 2212 to poll one or more of AP 2204 and AP 2206. In an embodiment, AP 2202 may transmit the indication before obtaining TXOP 2210 (not shown in FIG. 22). In an embodiment, AP 2202 may indicate support of TXOP return in a frame that AP 2202 transmits. In an embodiment, AP 2202 may inform AP 2204 and/or AP 2206 whether AP 2202 supports TXOP return by transmitting a frame comprising a capabilities element, where the capabilities element comprises a TXOP return support subfield. The TXOP return support subfield may be provided in a MAC capabilities information field. In an embodiment, the capabilities element may be an ultra-high reliability (UHR) capabilities element. For example, AP 2202 may set the TXOP return support subfield to one to receive a frame from AP 2204 and/or AP 2206 during an allocated portion of the TXOP to AP 2204 and/or AP 2206. In another embodiment, AP 2202 may inform AP 2204 and/or AP 2206 whether AP 2202 supports TXOP return by transmitting the indication. For example, the indication may indicate support of TXOP return by AP 2202 and enablement/disablement of TXOP return by AP 2202.

In example 2200, frame 2212 may comprise information regarding AP 2204 being scheduled to communicate within TXOP 2010 and may further comprise an indication (labeled return 2213) that may indicate whether AP 2204 is to return the allocated portion of the TXOP when AP 2204 finishes communicating before the end of the allocated portion of the TXOP. In an example, frame 2212 may comprise a schedule announcement frame. In an example, the schedule announcement frame may comprise a trigger frame. In another example, the schedule announcement frame may comprise an MU-RTS trigger frame. In another example, as noted above, frame 2212 may poll AP 2204 and/or AP 2206 (e.g., frame 2212 may comprise a Co-TDMA TB ICF or Co-TDMA NTB ICF). Further, frame 2212 may initiate the TXOP sharing procedure.

On receiving frame 2212, AP 2204 may determine its allocated duration in an upcoming TXOP allocation and may further determine whether AP 2204 is to return the allocated portion of the TXOP when AP 2204 finishes communicating before an end of the allocated portion of the TXOP. In example 2200, an indication (labeled return 2213) may indicate that AP 2204 is not to return the allocated portion of the TXOP when AP 2204 finishes communicating before the end of the allocated portion of the TXOP. In response to frame 2212, AP 2204 may transmit a frame 2214. In an example, frame 2214 may comprise a schedule announcement response frame. In another example, frame 2214 may comprise an acknowledgment frame. On receiving frame 2212, AP 2206 may determine that AP 2206 will not be allocated any duration in an upcoming TXOP allocation.

In an example, on receiving frame 2214, AP 2202 may transmit a frame 2216. In an example, frame 2216 may comprise a TXOP allocation frame. In an example, frame 2216 may comprise an allocation for a shared AP. In an example, an allocation of frame 2216 may comprise an identifier of a shared AP and a duration (within the TXOP) allocated to the shared AP. In example 2200, frame 2216 may comprise an indication of a portion, of the TXOP, allocated to AP 2204. The allocation may comprise a first duration (denoted T1 in FIG. 22) of the TXOP allocated to AP 2204. In an example, frame 2216 may comprise an MRTT frame. In an example, the first duration may be indicated in an allocation duration subfield of a user info list field of the MRTT frame. In another example (not shown in FIG. 22), on receiving frame 2214, AP 2202 may communicate with one or more associated STAs before transmitting frame 2216.

On receiving frame 2216, AP 2204 determine that AP 2204 is allocated a first duration of the TXOP and may transmit a frame 2218 to AP 2202. In an example, frame 2218 may comprise a response frame. In an example, where frame 2216 is an MRTT frame, frame 2218 may be a CTS frame. After transmitting frame 2218, AP 2204 may perform communicate with one or more of its associated STAs during a time period 2220 of the first duration of the TXOP allocated to AP 2204. In an example, during time period 2220, AP 2204 may transmit to one or more of its associated STAs downlink frames and/or may trigger one or more of its associated STAs to transmit uplink frames to AP 2204.

In example 2200, AP 2204 may finish communicating before an end of the first duration (T1) of the TXOP allocated to AP 2204. In an embodiment, based on an indication (labeled return 2213) indicating that AP 2204 is not to return the allocated portion of the TXOP when AP 2204 finishes communicating before the end of the allocated portion of the TXOP, and AP 2204 finishing communicating before the end of the allocated portion of the TXOP, AP 2204 may transmit a frame 2222. In an example, the transmitting of frame 2222 may be further based on a remaining time (e.g., second duration, T2) of the allocated portion of the TXOP being greater than a threshold. In embodiment, the threshold may comprise a duration of a physical layer (PHY) protocol data unit (PPDU) comprising frame 2222. In an embodiment, frame 2222 may comprise a TXOP truncation frame. In an embodiment, the TXOP truncation frame may comprise a contention free-end (CF-end) frame. In an embodiment, the CF-end frame may comprise a transmitter address (TA) indicating AP 2204 and a receiver address (RA) indicating a broadcast address. Alternatively, in an embodiment, AP 2204 may not transmit frame 2222 and may wait for the end of the first duration (T1). In another embodiment, AP 2204 may not transmit frame 2222 and may wait for the end of TXOP 2210.

On receiving frame 2222, AP 2202 may determine that AP 2204 has truncated the TXOP before the end of the allocated portion of the TXOP. In this example, because an indication (labeled return 2213) indicates that AP 2204 is not to return the allocated portion of the TXOP (e.g., when AP 2204 finishes communicating before the end of the allocated portion of the TXOP), AP 2202 is configured to not regain control of the TXOP, and may truncate TXOP 2210 (not shown in FIG. 22). On receiving frame 2222, AP 2206 may determine that AP 2204 has truncated the TXOP before the end of the allocated portion of the TXOP. In this example, when AP 2206 has buffered data for transmission, AP 2206 may be configured to invoke a backoff procedure in order to gain control of the TXOP. As depicted in FIG. 22, AP 2206 may invoke a backoff procedure a PIFS after receiving frame 2222. Upon gaining control of the TXOP, AP 2206 may transmit a frame 2224. In an example, frame 2224 may comprise a control frame, a management frame, a data frame or an action frame. After gaining control of the TXOP within the third duration (T3), in an example, AP 2206 may communicate with one or more associated STAs.

Figure 23:
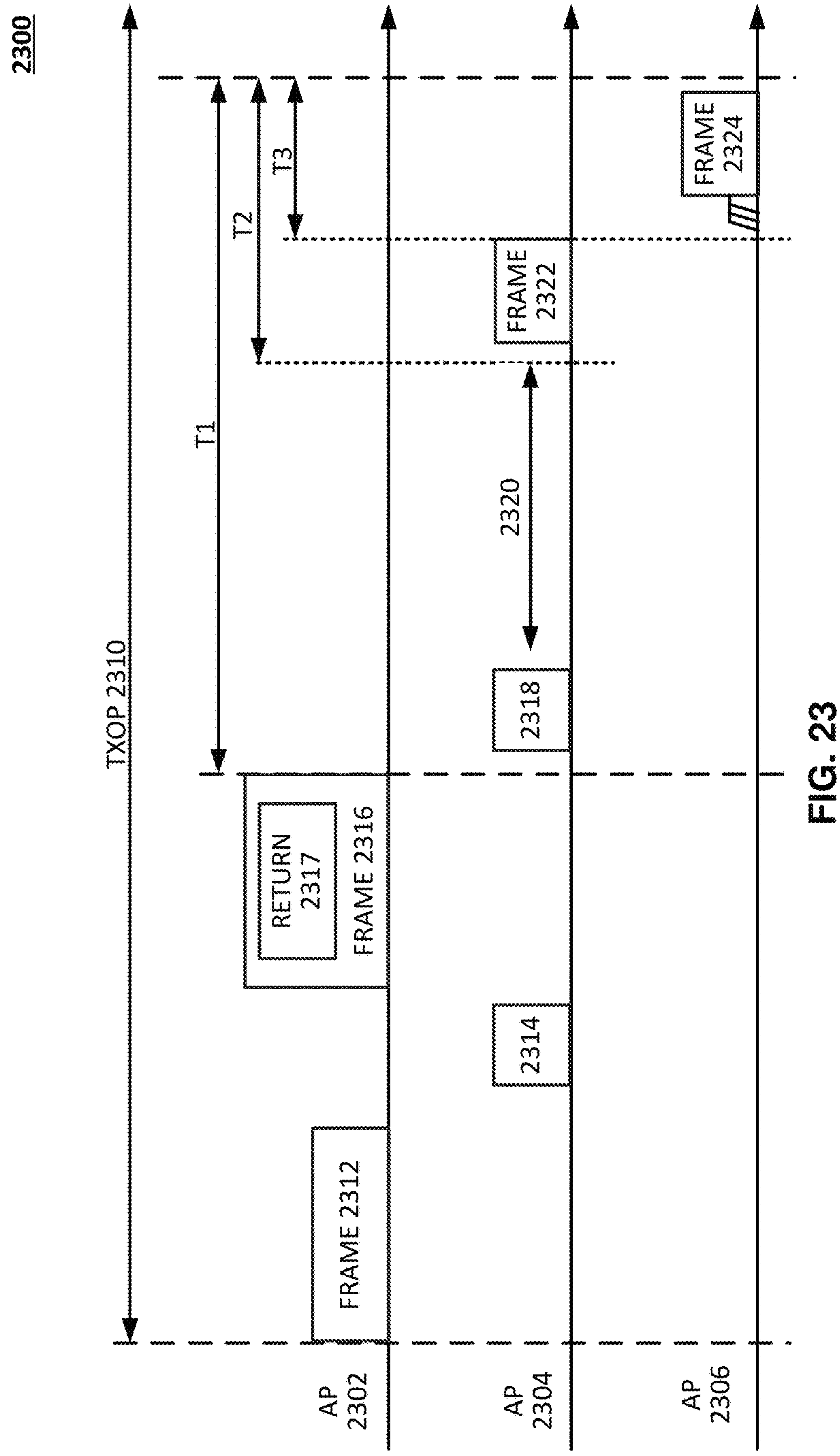
FIG. 23 illustrates another example of a procedure according to an embodiment.

FIG. 23 illustrates another example 2300 of a procedure according to an embodiment. As shown in FIG. 23, example 2300 may include APs 2302, 2304 and 2306, where each AP may serve one or more associated STAs. AP 2302, AP 2304 and AP 2306 may be members of a multi-AP group. AP 2302 may be a sharing/master AP of the multi-AP group. AP 2304 and AP 2306 may be shared/slave APs of the multi-AP group. In example 2300, it is assumed that APs 2302, 2304 and 2306 are within communication range of each other.

AP 2302 may be configured to regain control of the TXOP after an end of the TXOP portion allocation to a shared AP. In an implementation, AP 2302 may be configured to regain control of the TXOP based on having buffered data to communicate to one or more associated STAs; and to not regain control based on not having data to communicate to one or more associated STAs. In another implementation, AP 2302 may be configured to regain control of the TXOP in order to re-share the TXOP with another shared AP or may be configured to relinquish control of the TXOP after sharing it a first time with a shared AP.

As shown in FIG. 23, the procedure may begin with AP 2302 transmitting a frame 2312 after obtaining a TXOP 2310. In an example, before transmitting frame 2312, AP 2302 may be configured to poll AP 2304 and AP 2306 (e.g., to inquire about buffered traffic of AP 2304 and AP 2306 and the priorities of the buffered traffic) (not shown in FIG. 23). For example, like AP 2002 discussed above for example 2000 illustrated in FIG. 20, AP 2302 may transmit a Co-TDMA TB ICF (e.g., a BSRP trigger frame) or a Co-TDMA NTB ICF (e.g., a BSRP NTB trigger frame). As noted, in one example AP 2302 may transmit a frame to poll AP 2304 and/or AP 2306 (e.g., a Co-TDMA TB ICF or Co-TDMA NTB ICF) before transmitting frame 2312. In another example, frame 2312 may poll AP 2304 and/or AP 2306 (e.g., frame 2312 may comprise a Co-TDMA TB ICF or Co-TDMA NTB ICF). In an embodiment, like AP 2004 discussed above for example 2000 illustrated in FIG. 20, AP 2304 may respond to the poll (e.g., the Co-TDMA TB ICF or Co-TDMA NTB ICF) by identifying whether TXOP sharing is solicited (e.g., in addition to, or instead of, identifying buffered traffic).

In another example, AP 2302 may have information in advance regarding the buffered traffic of AP 2304 and AP 2306 and the priorities of the buffered traffic. AP 2302 may be configured to, when AP 2302 has advance information regarding buffered traffic of AP 2304 and AP 2306, not transmit a polling frame to receive updated information regarding the buffered traffic. Based on AP 2302 being configured not to transmit the polling frame, AP 2302 may not transmit a polling frame before transmitting frame 2312.

Based on the information about the buffered traffic of AP 2304 and AP 2306 and the priorities of the buffered traffic, AP 2302 may transmit frame 2312 comprising information regarding selected APs that are scheduled to communicate within TXOP 2310. In an example, the information regarding selected APs may indicate portions of TXOP 2310 allocated to respective APs of the shared APs.

In example 2300, frame 2312 may comprise information regarding AP 2304 being scheduled to communicate within TXOP 2310. In an example, frame 2312 may comprise a schedule announcement frame. In an example, the schedule announcement frame may comprise a trigger frame. In another example, the schedule announcement frame may comprise an MU-RTS trigger frame. In another example, as noted above, frame 2312 may poll AP 2304 and/or AP 2306 (e.g., frame 2312 may comprise a Co-TDMA TB ICF or Co-TDMA NTB ICF). Further, frame 2312 may initiate the TXOP sharing procedure.

On receiving frame 2312, AP 2304 may determine its allocated duration in an upcoming TXOP allocation. In response to frame 2312, AP 2304 may transmit a frame 2314. In an example, frame 2314 may comprise a schedule announcement response frame. In another example, frame 2314 may comprise an acknowledgment frame. On receiving frame 2312, AP 2306 may determine that AP 2306 will not be allocated any duration in an upcoming TXOP allocation.

In an example, on receiving frame 2314, AP 2302 may transmit a frame 2316. In an example, frame 2316 may comprise a TXOP allocation frame. In an example, frame 2316 may comprise an allocation for a shared AP. In an example, an allocation of frame 2316 may comprise an identifier of a shared AP and a duration (within the TXOP) allocated to the shared AP. In example 2300, frame 2316 may comprise an indication of a portion, of the TXOP, allocated to AP 2304. The allocation may comprise a first duration (denoted T1 in FIG. 23) of the TXOP allocated to AP 2304. In an example, frame 2316 may comprise an MRTT frame. In an example, the first duration may be indicated in an allocation duration subfield of a user info list field of the MRTT frame. In another example (not shown in FIG. 23), on receiving frame 2314, AP 2302 may communicate with one or more associated STAs before transmitting frame 2316.

In an embodiment, frame 2316 may further comprise an indication (denoted RETURN in FIG. 23) of whether a shared AP (e.g., AP 2304 and/or AP 2306) is to return an allocated portion of the TXOP when the shared AP finishes communicating before an end of the allocated portion of the TXOP. In an embodiment, the indication may be provided in a common info field of the MRTT frame.

In an embodiment, the indication may be in a separate frame (not shown in FIG. 23). In an embodiment, the indication may be transmitted before frame 2312 or frame 2316 (not shown in FIG. 23). In an embodiment, AP 2302 may transmit the indication before obtaining TXOP 2310 (not shown in FIG. 23). In an embodiment, AP 2302 may indicate support of TXOP return in a frame that AP 2302 transmits. In an embodiment, AP 2302 may inform AP 2304 and/or AP 2306 whether AP 2302 supports TXOP return by transmitting a frame comprising a capabilities element, where the capabilities element comprises a TXOP return support subfield. The TXOP return support subfield may be provided in a MAC capabilities information field. In an embodiment, the capabilities element may be an ultra-high reliability (UHR) capabilities element. For example, AP 2302 may set the TXOP return support subfield to one to receive a frame from AP 2304 and/or AP 2306 during an allocated portion of the TXOP to AP 2304 and/or AP 2306. In another embodiment, AP 2302 may inform AP 2304 and/or AP 2306 whether AP 2302 supports TXOP return by transmitting the indication. For example, the indication may indicate support of TXOP return by AP 2302 and enablement/disablement of TXOP return by AP 2302.

On receiving frame 2316, AP 2304 determine that AP 2304 is allocated a first duration of the TXOP. AP 2304 may further determine whether AP 2304 is to return the allocated portion of the TXOP when AP 2304 finishes communicating before an end of the allocated portion of the TXOP. In example 2300, an indication (labeled return 2317 in FIG. 23) may indicate that AP 2304 is not to return the allocated portion of the TXOP when AP 2304 finishes communicating before the end of the allocated portion of the TXOP. In response to frame 2316, AP 2304 may transmit a frame 2318 to AP 2302. In an example, frame 2318 may comprise a response frame. In an example, where frame 2316 is an MRTT frame, frame 2318 may be a CTS frame. After transmitting frame 2318, AP 2304 may communicate with one or more of its associated STAs during a time period 2320 of the first duration of the TXOP allocated to AP 2304. In an example, during time period 2320, AP 2304 may transmit to one or more of its associated STAs downlink frames and/or may trigger one or more of its associated STAs to transmit uplink frames to AP 2304.

In example 2300, AP 2304 may finish communicating before an end of the first duration (T1) of the TXOP allocated to AP 2304. In an embodiment, based on an indication (labeled return 2317 in FIG. 23) indicating that AP 2304 is not to return the allocated portion of the TXOP when AP 2304 finishes communicating before the end of the allocated portion of the TXOP, and AP 2304 finishing communicating before the end of the allocated portion of the TXOP, AP 2304 may transmit a frame 2322. In an example, the transmitting of frame 2322 may be further based on a remaining time (e.g., second duration, T2) of the allocated portion of the TXOP being greater than a threshold. In embodiment, the threshold may comprise a duration of a physical layer (PHY) protocol data unit (PPDU) comprising frame 2322. In an embodiment, frame 2322 may comprise a TXOP truncation frame. In an embodiment, the TXOP truncation frame may comprise a contention free-end (CF-end) frame. In an embodiment, the CF-end frame may comprise a transmitter address (TA) indicating AP 2304 and a receiver address (RA) indicating a broadcast address. Alternatively, in an embodiment, AP 2304 may not transmit frame 2322 and may wait for the end of the first duration (T1). In another embodiment, AP 2304 may not transmit frame 2322 and may wait for the end of TXOP 2310.

On receiving frame 2322, AP 2302 may determine that AP 2304 has truncated the TXOP before the end of the allocated portion of the TXOP. As an indication (labeled return 2317 in FIG. 23) indicates that AP 2304 is not to return the allocated portion of the TXOP when AP 2304 finishes communicating before the end of the allocated portion of the TXOP, AP 2302 may not try to gain control of the TXOP and may truncate TXOP 2310 (not shown in FIG. 23). On receiving frame 2322, AP 2306 may determine that AP 2304 has truncated the TXOP before the end of the allocated portion of the TXOP. If AP 2306 has buffered data for transmission, AP 2306 may invoke a backoff procedure in order to gain control of the TXOP. In an example, AP 2306 may invoke a backoff procedure a PIFS after receiving frame 2322. If AP 2306 gains control of the TXOP, AP 2306 may transmit a frame 2324. In an example, frame 2324 may comprise a control frame, a management frame, a data frame or an action frame. After gaining control of the TXOP within the third duration (T3), in an example, AP 2306 may communicate with one or more associated STAs.

Figure 24:
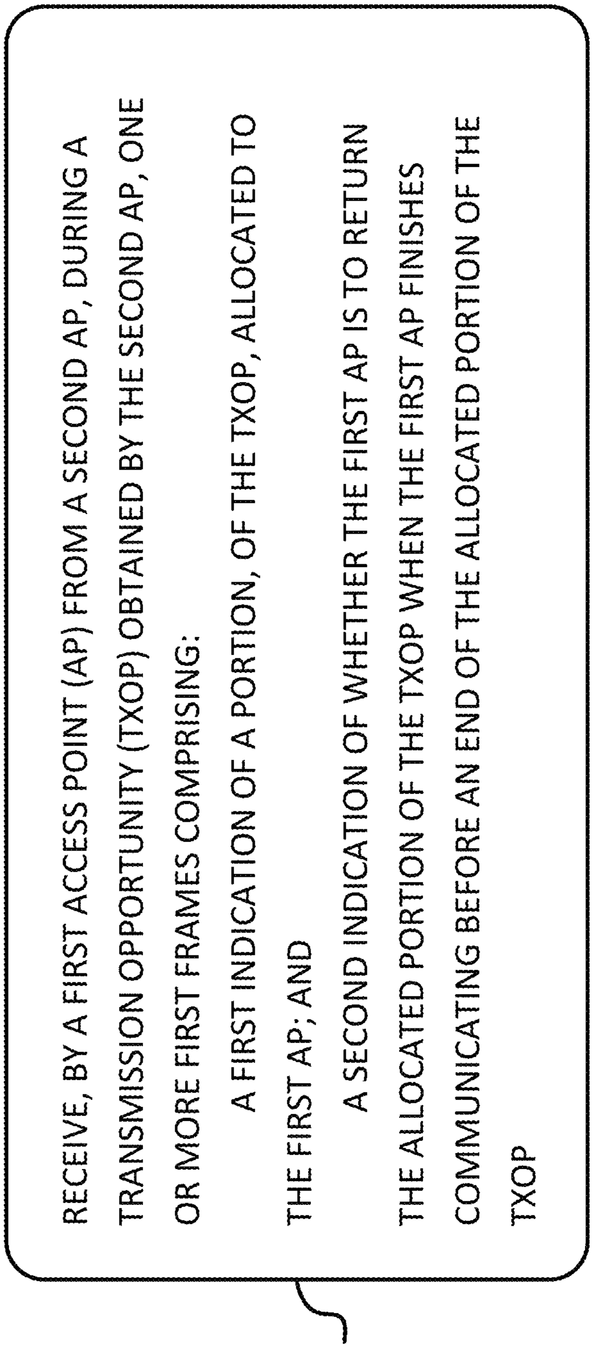
FIG. 24 illustrates an example process according to an embodiment.

FIG. 24 illustrates an example process 2400 according to an embodiment. Example process 2400 is provided for the purpose of illustration only and is not limiting. Example process 2400 may be performed by a first AP, such as AP 2004, AP 2104, AP 2204 or AP 2304 for example.

As shown in FIG. 24, process 2400 may include, in step 2410, receiving, by a first access point (AP) from a second AP, during a transmission opportunity (TXOP) obtained by the second AP, one or more first frames comprising: a first indication of a portion, of the TXOP, allocated to the first AP; and a second indication of whether the first AP is to return the allocated portion of the TXOP when the first AP finishes communicating before an end of the allocated portion of the TXOP.

In an embodiment, process 2400 may further comprise transmitting, by the first AP to the second AP, a second frame based on: the second indication indicating that the first AP is to return the allocated portion of the TXOP when the first AP finishes communicating before the end of the allocated portion of the TXOP; and the first AP finishing communicating before the end of the allocated portion of the TXOP. In another embodiment, the transmitting of the second frame may be further based on a remaining time of the allocated portion of the TXOP being greater than a threshold. In an embodiment, the threshold may comprise a duration of a physical layer (PHY) protocol data unit (PPDU) comprising the second frame. In an embodiment, the second frame may comprise a TXOP return frame. In an embodiment, the TXOP return frame may comprise one or more of, a management frame, an action frame, a multi-user request-to-send triggered TXOP sharing (MU-RTS TXS) trigger (MRTT) frame, a quality of service (QoS) null/data frame or a contention free-end (CF-end) frame. In an embodiment, the QoS null/data frame may comprise a command and status (CAS) control field with a reverse direction grant (RDG)/more physical layer (PHY) protocol data unit (PPDU) subfield equal to a zero value. In another embodiment, the CF-end frame may comprise a transmitter address (TA) indicating the first AP and a receiver address (RA) indicating the second AP.

In another embodiment, process 2400 may further comprise transmitting, by the first AP, a third frame based on: the second indication indicating that the first AP is not to return the allocated portion of the TXOP when the first AP finishes communicating before the end of the allocated portion of the TXOP; and the first AP finishing communicating before the end of the allocated portion of the TXOP. In another embodiment, the transmitting of the third frame may be further based on a remaining time of the allocated portion of the TXOP being greater than a threshold. In an embodiment, the threshold may comprise a duration of a physical layer (PHY) protocol data unit (PPDU) comprising the third frame. In an embodiment, the third frame may comprise a TXOP truncation frame. In an embodiment, the TXOP truncation frame may comprise a contention free-end (CF-end) frame. In an embodiment, the CF-end frame may comprise a transmitter address (TA) indicating the first AP and a receiver address (RA) indicating a broadcast address.

In an embodiment, the one or more first frames may comprise a fourth frame and a fifth frame, with the fourth frame comprising a schedule announcement frame and the fifth frame comprises a TXOP allocation frame. In an embodiment, the fourth frame may comprise the second indication. In an embodiment, the fourth frame may comprise a trigger frame. In an embodiment, process 2400 may further comprise transmitting, by the first AP to the second AP, a first response frame in response to the fourth frame. In an embodiment, the fifth frame may comprise the first indication.

In another embodiment, the one or more first frames may comprise a TXOP allocation frame. In an embodiment, the TXOP allocation frame may comprise the first indication. In an embodiment, the TXOP allocation frame may further comprise the second indication. In an embodiment, the TXOP allocation frame may comprise a multi-user request-to-send triggered TXOP sharing (MU-RTS TXS) trigger (MRTT) frame. In an embodiment, the second indication may be provided in a common info field of the MRTT frame.

In an embodiment, process 2400 may further comprise transmitting, by the first AP to the second AP, a second response frame in response to the TXOP allocation frame. In an embodiment, process 2400 may further comprise exchanging, by the first AP with its associated stations (STAs), one or more downlink frames or uplink frames, after transmitting the second response frame.

In an embodiment, the one or more first frames comprise a sixth frame indicating polling of the first AP regarding buffered traffic of the first AP.

In an embodiment, the sixth frame comprises the second indication of whether the first AP is to return the allocated portion of the TXOP when the first AP finishes communicating before an end of the allocated portion of the TXOP.

FIG. 25 illustrates another example process 2500 according to an embodiment. Example process 2500 is provided for the purpose of illustration only and is not limiting. Example process 2500 may be performed by a first AP, such as AP 2002, AP 2102, AP 2202 or AP 2302 for example.

As shown in FIG. 25, process 2500 may include, in step 2510, transmitting, by a first access point (AP) to a second AP, during a transmission opportunity (TXOP) obtained by the first AP, one or more first frames comprising: a first indication of a portion, of the TXOP, allocated to the second AP; and a second indication of whether the second AP is to return the allocated portion of the TXOP when the second AP finishes communicating before an end of the allocated portion of the TXOP.

In an embodiment, process 2500 may further comprise receiving, by the first AP from the second AP, a second frame based on: the second indication indicating that the second AP is to return the allocated portion of the TXOP when the second AP finishes communicating before the end of the allocated portion of the TXOP; and the second AP finishing communicating before the end of the allocated portion of the TXOP. In another embodiment, the receiving of the second frame may be further based on a remaining time of the allocated portion of the TXOP being greater than a threshold. In an embodiment, the threshold may comprise a duration of a physical layer (PHY) protocol data unit (PPDU) comprising the second frame. In an embodiment, the second frame may comprise a TXOP return frame. In an embodiment, the TXOP return frame may comprise one or more of, a management frame, an action frame, a multi-user request-to-send triggered TXOP sharing (MU-RTS TXS) trigger (MRTT) frame, a quality of service (QoS) null/data frame or a contention free-end (CF-end) frame. In an embodiment, the QoS null/data frame may comprise a command and status (CAS) control field with a reverse direction grant (RDG)/more physical layer (PHY) protocol data unit (PPDU) subfield equal to a zero value. In another embodiment, the CF-end frame may comprise a transmitter address (TA) indicating the first AP and a receiver address (RA) indicating the second AP.

In another embodiment, process 2500 may further comprise receiving, by the first AP from the second AP, a third frame based on: the second indication indicating that the second AP is not to return the allocated portion of the TXOP when the second AP finishes communicating before the end of the allocated portion of the TXOP; and the second AP finishing communicating before the end of the allocated portion of the TXOP. In another embodiment, the receiving of the third frame may be further based on a remaining time of the allocated portion of the TXOP being greater than a threshold. In an embodiment, the threshold may comprise a duration of a physical layer (PHY) protocol data unit (PPDU) comprising the third frame. In an embodiment, the third frame may comprise a TXOP truncation frame. In an embodiment, the TXOP truncation frame may comprise a contention free-end (CF-end) frame. In an embodiment, the CF-end frame may comprise a transmitter address (TA) indicating the first AP and a receiver address (RA) indicating a broadcast address.

In an embodiment, the one or more first frames may comprise a fourth frame and a fifth frame, where the fourth frame comprises a schedule announcement frame and the fifth frame comprises a TXOP allocation frame. In additional or alternative embodiments, the fourth frame may comprise the second indication. In an embodiment, the fourth frame may comprise a trigger frame. In an embodiment, process 2400 may further comprise receiving, by the first AP from the second AP, a first response frame in response to the fourth frame. In an embodiment, the fifth frame may comprise the first indication.

In another embodiment, the one or more frames may comprise a TXOP allocation frame. In an embodiment, the TXOP allocation frame may comprise the first indication. In an embodiment, the TXOP allocation frame may further comprise the second indication. In an embodiment, the TXOP allocation frame may comprise a multi-user request-to-send triggered TXOP sharing (MU-RTS TXS) trigger (MRTT) frame. In an embodiment, the second indication may be provided in a common info field of the MRTT frame.

In an embodiment, process 2500 may further comprise receiving, by the first AP from the second AP, a second response frame in response to the TXOP allocation frame.

In an embodiment, the one or more first frames comprise a sixth frame indicating polling of the second AP regarding buffered traffic of the second AP.

In an embodiment, the sixth frame comprises the second indication of whether the second AP is to return the allocated portion of the TXOP when the second AP finishes communicating before an end of the allocated portion of the TXOP.

The invention claimed is:

1. A method, comprising:

receiving, by a first access point (AP) from a second AP and during a transmission opportunity (TXOP) obtained by the second AP, a first trigger frame comprising a first indication of whether the first AP is to return a portion, of the TXOP, allocated to the first AP when the first AP finishes communicating before an end of the portion of the TXOP;

transmitting, by the first AP to the second AP and during the TXOP, a first acknowledgment frame in response to the first trigger frame;

receiving, by the first AP from the second AP and during the TXOP, a second trigger frame comprising a second indication of the portion of the TXOP allocated to the first AP;

transmitting, by the first AP to the second AP and during the TXOP, a clear to send (CTS) frame in response to the second trigger frame; and transmitting, by the first AP to the second AP and during the TXOP, a TXOP return frame based on:

the first indication indicating that the first AP is to return the portion of the TXOP allocated to the first AP when the first AP finishes communicating before the end of the portion of the TXOP allocated to the first AP; and the first AP finishing communicating before the end of the allocated portion of the TXOP.

2. The method of claim 1, wherein the transmitting of the TXOP return frame is further based on a remaining time of the allocated portion of the TXOP being greater than a threshold.

3. The method of claim 1, wherein the TXOP return frame comprises an action frame.

4. The method of claim 3, wherein the TXOP return frame comprises a command and status (CAS) control field with a reverse direction grant (RDG)/more physical layer (PHY) protocol data unit (PPDU) subfield equal to a zero value.

5. The method of claim 1, further comprising transmitting, by the first AP, a TXOP truncation frame based on:

the second indication indicating that the first AP is not to return the allocated portion of the TXOP when the first AP finishes communicating before the end of the allocated portion of the TXOP; and the first AP finishing communicating before the end of the allocated portion of the TXOP.

6. The method of claim 5, wherein the TXOP truncation frame comprises a contention free-end (CF-end) frame.

7. The method of claim 1, wherein the second trigger frame comprises a multi-user request-to-send triggered TXOP sharing (MU-RTS TXS) trigger frame and wherein the second indication of the portion of the TXOP allocated to the first AP is comprised in an allocation duration field in the MU-RTS TXS trigger frame.

8. A first access point (AP) comprising:

one or more processors; and memory storing instructions that, when executed by the one or more processors, cause the first AP to:

receive, from a second AP and during a transmission opportunity (TXOP) obtained by the second AP, a first trigger frame comprising a first indication of whether the first AP is to return a portion, of the TXOP, allocated to the first AP when the first AP finishes communicating before an end of the portion of the TXOP;

transmit, to the second AP and during the TXOP, a first acknowledgment frame in response to the first trigger frame;

receive, from the second AP and during the TXOP, a second trigger frame comprising a second indication of the portion of the TXOP allocated to the first AP;

transmit, to the second AP and during the TXOP, a clear to send (CTS) frame in response to the second trigger frame; and transmit, to the second AP and during the TXOP, a TXOP return frame based on:

the first indication indicating that the first AP is to return the portion of the TXOP allocated to the first AP when the first AP finishes communicating before the end of the portion of the TXOP allocated to the first AP; and the first AP finishing communicating before the end of the allocated portion of the TXOP.

9. The first AP of claim 8, wherein the transmitting of the TXOP return frame is further based on a remaining time of the allocated portion of the TXOP being greater than a threshold.

10. The first AP of claim 8, wherein the TXOP return frame comprises an action frame.

11. The first AP of claim 10, wherein the TXOP return frame comprises a command and status (CAS) control field with a reverse direction grant (RDG)/more physical layer (PHY) protocol data unit (PPDU) subfield equal to a zero value.

12. The first AP of claim 8, wherein the instructions further cause the first AP to transmit a TXOP truncation frame based on:

the second indication indicating that the first AP is not to return the allocated portion of the TXOP when the first AP finishes communicating before the end of the allocated portion of the TXOP; and the first AP finishing communicating before the end of the allocated portion of the TXOP.

13. The first AP of claim 12 wherein the TXOP truncation frame comprises a contention free-end (CF-end) frame.

14. The first AP of claim 8, wherein the second trigger frame comprises a multi-user request-to-send triggered TXOP sharing (MU-RTS TXS) trigger frame and wherein the second indication of the portion of the TXOP allocated to the first AP is comprised in an allocation duration field in the MU-RTS TXS trigger frame.

15. A non-transitory computer-readable medium comprising instructions that, when executed by one or more processors of a first access point (AP), cause the first AP to:

receive, from a second AP and during a transmission opportunity (TXOP) obtained by the second AP, a first trigger frame comprising a first indication of whether the first AP is to return a portion, of the TXOP, allocated to the first AP when the first AP finishes communicating before an end of the portion of the TXOP;

transmit, to the second AP and during the TXOP, a first acknowledgment frame in response to the first trigger frame;

receive, from the second AP and during the TXOP, a second trigger frame comprising a second indication of the portion of the TXOP allocated to the first AP;

transmit, to the second AP and during the TXOP, a clear to send (CTS) frame in response to the second trigger frame; and transmit, to the second AP and during the TXOP, a TXOP return frame based on:

the first indication indicating that the first AP is to return the portion of the TXOP allocated to the first AP when the first AP finishes communicating before the end of the portion of the TXOP allocated to the first AP; and the first AP finishing communicating before the end of the allocated portion of the TXOP.

16. The non-transitory computer-readable medium of claim 15, wherein the transmitting of the TXOP return frame is further based on a remaining time of the allocated portion of the TXOP being greater than a threshold.

17. The non-transitory computer-readable medium of claim 15, wherein the TXOP return frame comprises an action frame.

18. The non-transitory computer-readable medium of claim 17, wherein the TXOP return frame comprises a command and status (CAS) control field with a reverse direction grant (RDG)/more physical layer (PHY) protocol data unit (PPDU) subfield equal to a zero value.

19. The non-transitory computer-readable medium of claim 15, wherein the instructions further cause the first AP to transmit a contention free-end (CF-end) frame based on:

the second indication indicating that the first AP is not to return the allocated portion of the TXOP when the first AP finishes communicating before the end of the allocated portion of the TXOP; and the first AP finishing communicating before the end of the allocated portion of the TXOP.

20. The non-transitory computer-readable medium of claim 15, wherein the second trigger frame comprises a multi-user request-to-send triggered TXOP sharing (MU-RTS TXS) trigger frame and wherein the second indication of the portion of the TXOP allocated to the first AP is comprised in an allocation duration field in the MU-RTS TXS trigger frame.

* * * * *